US011975231B2

(12) United States Patent
Hulbert et al.

(10) Patent No.: US 11,975,231 B2
(45) **Date of Patent: *May 7, 2024**

(54) LONG-TERM FIRE RETARDANT WITH CORROSION INHIBITORS AND METHODS FOR MAKING AND USING SAME

(71) Applicant: FRS Group, LLC, Rocklin, CA (US)

(72) Inventors: Dennis Hulbert, Corvallis, MT (US); Robert J. Burnham, Stevensville, MT (US); Michael S. Schnarr, Roseville, CA (US); Gerald Geissler, Kailua-Kona, HI (US); David W. Wilkening, Ronan, MT (US); Joseph McLellan, Rocklin, CA (US); Michael White, Roseville, CA (US); Gerald S. Frankel, Bexley, OH (US)

(73) Assignee: FRS Group, LLC, Rocklin, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/061,542

(22) Filed: Dec. 5, 2022

(65) Prior Publication Data

US 2023/0310917 A1 Oct. 5, 2023

Related U.S. Application Data

(60) Provisional application No. 63/325,876, filed on Mar. 31, 2022.

(51) Int. Cl.
*A62D 1/00* (2006.01)

(52) U.S. Cl.
CPC .................................. *A62D 1/0042* (2013.01)

(58) Field of Classification Search
CPC .................................................... A62D 1/0042
See application file for complete search history.

(56) References Cited

U.S. PATENT DOCUMENTS

| | | | |
|---|---|---|---|
| 2,759,924 | A | 8/1956 | Touey |
| 2,990,233 | A | 6/1961 | Eugene et al. |

(Continued)

FOREIGN PATENT DOCUMENTS

| | | | |
|---|---|---|---|
| AU | 2018435573 | A1 | 3/2021 |
| CA | 2494914 | A1 | 2/2004 |

(Continued)

OTHER PUBLICATIONS

Àgueda Costafreda, Effects of long-term forest fire retardants on fire intensity, heat of combustion of the fuel and flame emissivity. Universitat Politècnica de Catalunya, 2009. 239 pages.

(Continued)

*Primary Examiner* — Andrew J. Oyer
(74) *Attorney, Agent, or Firm* — Smith Baluch LLP

(57) ABSTRACT

A forest fire retardant composition contains a retardant compound that includes a potassium salt. The potassium salt may include a potassium salt of an organic acid, a potassium salt of an inorganic acid, or mixtures thereof. The organic acid may include formic acid, acetic acid, propanoic acid, butanoic acid, lactic acid, oxalic acid, malic acid, gluconic acid, tartaric acid, uric acid, malic acid, or citric acid. The inorganic acid may include sulfuric acid, phosphoric acid, carbonic acid, or hydrochloric acid. The composition may be in the form of a dry concentrate, a liquid concentrate, or a final diluted product. The final diluted product is effective in suppressing, retarding, and controlling forest fires while exhibiting corrosion resistance and low toxicity.

30 Claims, 2 Drawing Sheets

(56) References Cited

U.S. PATENT DOCUMENTS

| | | | |
|---|---|---|---|
| 3,223,649 | A | 12/1965 | Langguth |
| 3,274,105 | A | 9/1966 | Norbert |
| 3,275,566 | A | 9/1966 | Langguth |
| 3,293,189 | A | 12/1966 | Morgenthaler |
| 3,338,829 | A | 8/1967 | Langguth et al. |
| 3,342,749 | A | 9/1967 | Handleman et al. |
| 3,350,305 | A | 10/1967 | Langguth et al. |
| 3,364,149 | A | 1/1968 | Morgenthaler |
| 3,382,186 | A | 5/1968 | Silverstein |
| 3,409,550 | A | 11/1968 | Gould |
| 3,585,135 | A | 6/1971 | Smith et al. |
| 3,843,525 | A | 10/1974 | Hattori et al. |
| 4,134,876 | A | 1/1979 | Horner et al. |
| 4,134,959 | A | 1/1979 | Menke et al. |
| 4,145,296 | A | 3/1979 | Fox et al. |
| 4,168,239 | A | 9/1979 | Mertz et al. |
| 4,176,071 | A | 11/1979 | Crouch |
| 4,343,854 | A | 8/1982 | Moorman |
| 4,374,171 | A | 2/1983 | McCarter |
| 4,392,994 | A | 7/1983 | Wagener |
| 4,770,794 | A | 9/1988 | Cundasawmy et al. |
| 4,950,410 | A | 8/1990 | Pennartz |
| 4,983,326 | A | 1/1991 | Vandersall |
| 5,009,710 | A | 4/1991 | Bewsey |
| 5,596,029 | A | 1/1997 | Goebelbecker et al. |
| 5,849,210 | A | 12/1998 | Pascente et al. |
| 5,985,013 | A | 11/1999 | Kofler et al. |
| 6,019,176 | A | 2/2000 | Crouch |
| 6,162,375 | A | 12/2000 | Crouch et al. |
| 6,296,781 | B1 | 10/2001 | Amiran |
| 6,447,697 | B1 | 9/2002 | Vandersall |
| 6,517,747 | B2 | 2/2003 | Vandersall |
| 6,802,994 | B1 | 10/2004 | Kegeler et al. |
| 6,858,567 | B2 | 2/2005 | Akao |
| 7,115,677 | B2 | 10/2006 | Harashina et al. |
| 7,794,688 | B2 | 9/2010 | Caine et al. |
| 8,212,073 | B2 | 7/2012 | Kasowski |
| 8,366,955 | B2 | 2/2013 | Thomas et al. |
| 8,871,058 | B2 | 10/2014 | Sealey et al. |
| 9,919,174 | B2 | 3/2018 | Vellmar |
| 9,982,195 | B2 | 5/2018 | Matsui |
| 10,550,483 | B2 | 2/2020 | Khosla et al. |
| 10,590,257 | B2 | 3/2020 | Appel et al. |
| 10,752,840 | B2 | 8/2020 | Cha et al. |
| 10,960,249 | B2 | 3/2021 | Hulbert et al. |
| 10,960,250 | B2 | 3/2021 | Hulbert et al. |
| 10,960,251 | B1 | 3/2021 | Hulbert et al. |
| 11,041,063 | B2 | 6/2021 | Hulbert et al. |
| 11,344,760 | B2 | 5/2022 | Hulbert et al. |
| 11,395,934 | B2 | 7/2022 | Hulbert et al. |
| 11,420,084 | B2 | 8/2022 | Hulbert et al. |
| 11,534,643 | B2 | 12/2022 | Hulbert et al. |
| 11,554,279 | B2 | 1/2023 | Hubert et al. |
| 11,554,280 | B2 | 1/2023 | Hulbert et al. |
| 11,602,658 | B2 | 3/2023 | Hulbert et al. |
| 11,607,570 | B2 | 3/2023 | Hulbert et al. |
| 11,628,324 | B2 | 4/2023 | Hulbert et al. |
| 2002/0013403 | A1 | 1/2002 | Vandersall |
| 2002/0096668 | A1 | 7/2002 | Vandersall et al. |
| 2003/0010507 | A1 | 1/2003 | Greiner et al. |
| 2004/0074650 | A1 | 4/2004 | Shiga |
| 2004/0124403 | A1 | 7/2004 | Parker et al. |
| 2005/0001197 | A1 | 1/2005 | Clark |
| 2006/0113513 | A1 | 6/2006 | Nilsson |
| 2008/0196908 | A1 | 8/2008 | Schaefer |
| 2010/0063180 | A1 | 3/2010 | Kang et al. |
| 2011/0089386 | A1 | 4/2011 | Berry et al. |
| 2011/0105649 | A1 | 5/2011 | Harada et al. |
| 2011/0213065 | A1 | 9/2011 | Giesselbach et al. |
| 2012/0219947 | A1 | 8/2012 | Yurkovetsky et al. |
| 2012/0292551 | A1 | 11/2012 | Klaffmo |
| 2013/0180738 | A1 | 7/2013 | Kim et al. |
| 2013/0264509 | A1 | 10/2013 | Shalev et al. |
| 2015/0352744 | A1 | 12/2015 | Zhang et al. |
| 2015/0368560 | A1 | 12/2015 | Pascal et al. |
| 2016/0030789 | A1* | 2/2016 | Cordani ............... A62D 1/0064 252/2 |
| 2016/0264687 | A1 | 9/2016 | Tran |
| 2017/0056698 | A1 | 3/2017 | Pai et al. |
| 2018/0037998 | A1 | 2/2018 | Khosla et al. |
| 2018/0282218 | A1 | 10/2018 | Mabey |
| 2019/0153321 | A1 | 5/2019 | Simonovic |
| 2019/0322939 | A1 | 10/2019 | Kennedy et al. |
| 2020/0109253 | A1 | 4/2020 | Appel et al. |
| 2020/0254290 | A1 | 8/2020 | Robles et al. |
| 2020/0384298 | A1 | 12/2020 | Hulbert et al. |
| 2020/0384299 | A1 | 12/2020 | Hulbert et al. |
| 2021/0009787 | A1 | 1/2021 | Hulbert et al. |
| 2021/0213318 | A1 | 7/2021 | Hulbert et al. |
| 2021/0220687 | A1 | 7/2021 | Hulbert et al. |
| 2021/0309830 | A1 | 10/2021 | Hulbert et al. |
| 2022/0008773 | A1 | 1/2022 | Conboy |
| 2022/0072355 | A1 | 3/2022 | Hulbert et al. |
| 2022/0080242 | A1 | 3/2022 | Hulbert et al. |
| 2022/0323809 | A1 | 10/2022 | Hulbert et al. |
| 2023/0001250 | A1 | 1/2023 | Hulbert et al. |
| 2023/0132525 | A1 | 5/2023 | Hulbert et al. |

FOREIGN PATENT DOCUMENTS

| | | | |
|---|---|---|---|
| CA | 2494914 | C | 1/2013 |
| CN | 1225344 | A | 8/1999 |
| CN | 1446993 | A | 10/2003 |
| CN | 102417196 | A | 4/2012 |
| CN | 104277607 | A | 1/2015 |
| CN | 105586527 | A | 5/2016 |
| CN | 107789783 | A | 3/2018 |
| CN | 107880857 | A | 4/2018 |
| CN | 110064159 | A | 7/2019 |
| CN | 112391176 | A | 2/2021 |
| EP | 1546286 | B1 | 7/2013 |
| EP | 2617474 | A1 | 7/2013 |
| FR | 2019890 | A1 | 7/1970 |
| GB | 2561610 | B | 8/2022 |
| KR | 20170037417 | A | 4/2017 |
| KR | 20210074474 | A | 6/2021 |
| RO | 101017 | B1 | 3/1991 |
| WO | 2006132568 | A2 | 12/2006 |
| WO | 2010059508 | A1 | 5/2010 |
| WO | 2010077493 | A1 | 7/2010 |
| WO | 2011088666 | A1 | 7/2011 |
| WO | 2013124638 | A2 | 8/2013 |
| WO | 2013141367 | A1 | 9/2013 |
| WO | 2014153154 | A1 | 9/2014 |
| WO | 2019163839 | A1 | 8/2019 |
| WO | 2019193919 | A1 | 10/2019 |
| WO | 2020247775 | A2 | 12/2020 |
| WO | 2020247780 | A1 | 12/2020 |
| WO | 2020254869 | A1 | 12/2020 |
| WO | 2022132246 | A1 | 6/2022 |
| WO | 2022132962 | A1 | 6/2022 |
| WO | 2024006255 | A2 | 1/2024 |

OTHER PUBLICATIONS

Agueda et al. "Different scales for studying the effectiveness of long-term forest fire retardants." Progress in Energy and Combustion Science 34.6 (2008): 782-796.

Ai et al. "Research into the super-absorbent polymers on agricultural water." Agricultural Water Management 245 (2021): 106513. 7 pages.

Batista et al. Evaluation of the efficiency of a long-term retardant, based on ammonium polyphosphate, in controlled burns under laboratory conditions Assessment of efficiency of polyphosphate ammonium fire retardant, in control burnings under laboratory conditions Scientia Forestalis, vol. 36, Issue 79, 2008, p. 223-229.

Blakely, "Laboratory method for evaluating forest fire retardant chemicals." (1970). 150 pages.

Byrd et al., "Characterizing short-wave infrared fluorescence of conventional near-infrared fluorophores." Journal of biomedical optics 24.3 (2019): 035004. 6 pages.

(56) References Cited

OTHER PUBLICATIONS

Cavdar et al. "Ammonium zeolite and ammonium phosphate applied as fire retardants for microcrystalline cellulose filled thermoplastic composites." Fire Safety Journal 107 (2019): 202-209.
Cellulose. Wikipedia Dec. 6, 2018. Accessed at https://en.wikipedia.org/w/index.php?title=Cellulose&oldid=872356598 on Aug. 19, 2020. 12 pages.
Di Blasi et al. "Effects of diammonium phosphate on the yields and composition of products from wood pyrolysis." Industrial & engineering chemistry research 46.2 (2007): 430-438.
Di Blasi et al. "Thermal and catalytic decomposition of wood impregnated with sulfur-and phosphorus-containing ammonium salts." Polymer Degradation and Stability 93.2 (2008): 335-346.
Ding et al., "Recent advances in near-infrared II fluorophores for multifunctional biomedical imaging." Chemical science 9.19 (2018): 4370-4380.
Ecological Risk Assessment of Wildland Fire-Fighting Chemicals: Long-Term Fire Retardants. United States Forest Service Sep. 2017. Accessed at https://www.fs.fed.us/rm/fire/wfcs/documents/EcoRA-Retardants-ExecSummary_2017.pdf. 3 pages.
Evaluation of Wildland Fire Chemicals Standard Test Procedures STP 1.5—Fish Toxicity. USFS May 7, 2007. Accessed at https://www.fs.fed.us/rm/fire/wfcs/tests/documents/stp_01_5.pdf. 2 pages.
Examination Report No. 1 in Australian Application No. 2020203746 dated May 10, 2023, 6 pages.
Extended European Search Report in European Application No. 20817923.4 dated May 16, 2023, 8 pages.
Fischel, "Evaluation of selected deicers based on a review of the literature." The SeaCrest Group, Report No. CDOT-DTD-R-2001-15 (Oct. 2001). 170 pages.
Fish Toxicity. US Forest Service Revised Sep. 6, 2017. Accessed at https://www.fs.fed.us/rm/fire/wfcs/performance/documents/FishTox_Foam.pdf. 2 pages.
Fiss et al., "Mechanochemical phosphorylation of polymers and synthesis of flame-retardant cellulose nanocrystals." ACS Sustainable Chemistry & Engineering 7.8 (2019): 7951-7959.
Gimenez et al. "Long-term forest fire retardants: a review of quality, effectiveness, application and environmental considerations." International Journal of Wildland Fire 13.1 (2004): 1-15.
Grevel et al., "Experimentally determined standard thermodynamic properties of synthetic MgSO4• 4H2O (starkeyite) and MgSO4• 3H2O: A revised internally consistent thermodynamic data set for magnesium sulfate hydrates." Astrobiology 12.11 (2012): 1042-1054.
Grevel et al., "Internally consistent thermodynamic data for magnesium sulfate hydrates." Geochimica et Cosmochimica Acta 73.22 (2009): 6805-6815.
Hobbs, "Recent advances in bio-based flame retardant additives for synthetic polymeric materials." Polymers 11.2 (2019): 224. 31 pages.
Hollingbery et al., "The fire retardant behaviour of huntite and hydromagnesite—A review." Polymer degradation and stability 95.12 (2010): 2213-2225.
Huang et al., "Study on EPS thermal insulation mortar prepared by magnesium oxychloride cement." E3S Web of Conferences. vol. 198. EDP Sciences, 2020. 4 pages.
International Search Report and Written Opinion in International Patent Application No. PCT/US2020/036360 dated Nov. 30, 2020, 43 pages.
International Search Report and Written Opinion in International Patent Application No. PCT/US2020/036367 dated Sep. 9, 2020, 23 pages.
International Search Report and Written Opinion in PCT/US21/63598 dated Mar. 2, 2022 27 pages.
International Search Report in International Patent Application No. PCT/US2021/047726 dated Feb. 3, 2022, 21 pages.
International Search Report in International Patent Application No. PCT/US2022/080881 dated May 8, 2023, 20 pages.
Invitation to Pay Additional Fees, and where Applicable, Protest Fee in International Patent Application No. PCT/US2020/036360 dated Aug. 24, 2020, 6 pages.
Invitation to Pay Additional Fees, and where Applicable, Protest Fee in International Patent Application No. PCT/US2021/047726 dated Nov. 9, 2021, 4 pages.
Invitation to Pay Additional Fees, and where Applicable, Protest Fee in International Patent Application No. PCT/US2022/080881 dated Mar. 3, 3023, 2 pages.
Jin et al. "Flame retardant properties of laminated bamboo lumber treated with monoammonium phosphate (MAP) and boric acid/borax (SBX) compounds." BioResources 12.3 (2017): 5071-5085.
Lamaka et al. "Comprehensive screening of Mg corrosion inhibitors." Corrosion Science 128 (2017): 224-240.
Like et al., "Handheld fire extinguisher development." Halon Options Technical Working Conference (HOTWC). 2000. 3 pages.
Liodakis et al., "Testing the retardancy effect of various inorganic chemicals on smoldering combustion of Pinus halepensis needles", Thermochimica Acta, 444.2, 2006, pp. 157-165.
Liodakis et al. "Evaluating the fire retardation efficiency of diammonium phosphate, ammonium sulphate and magnesium carbonate minerals on *Pistacia lentiscus* L." 2006 First International Symposium on Environment Identities and Mediterranean Area. IEEE, 2006, pp. 35-39.
Liodakis et al. "Evaluating the use of minerals as forest fire retardants." Fire Safety Journal 45.2 (2010): 98-105.
Liodakis et al. "The effect of (NH4) 2HPO4 and (NH4) 2SO4 on the spontaneous ignition properties of Pinus halepensis pine needles." Fire safety journal 37.5 (2002): 481-494.
Long-Term Retardants Fact Sheet. United States Forest Service Updated May 2017. Accessed at https://www.fs.usda.gov/rm/fire/wfcs/documents/Ret_FactSheet_2017-0503.pdf. 1 page.
Mostashari et al., "Thermal decomposition pathway of a cellulosic fabric impregnated by magnesium chloride hexahydrate as a flame-retardant." Journal of thermal analysis and calorimetry 93.2 (2008): 589-594.
Mostashari et al., "XRD characterization of the ashes from a burned cellulosic fabric impregnated with magnesium bromide hexahydrate as flame-retardant." Journal of thermal analysis and calorimetry 92.3 (2008): 845-849.
Patent Examination Report in New Zealand Application No. 782860, dated May 10, 2023, 3 pages.
Perimeter Solutions, "Myth vs. Reality: Understanding the Chemistry of Wildfire Suppression" (Jun. 17, 2021), available at https://www.perimeter-solutions.com/wildfire-suppression-webinar/. 30 pages.
Qu et al., "The synergism of MgCO3 and 2ZnCO3• 3ZnO• 4H2O as flame retardants and smoke suppressants for flexible poly (vinyl chloride)(PVC)." e-Polymers 11.1 (2011). 9 pages.
Specification for Long Term Retardant, Wildland Fire, Aircraft or Ground Application. US Department of Agriculture Forest Service Specification 5100-304b. Jan. 2000. Accessed at https://www.fs.fed.us/rm/fire/documents/304_b.pdf. 24 pages.
Specification for Long Term Retardant, Wildland Firefighting. US Department of Agriculture Forest Service Specification 5100-304d. Jan. 7, 2020. Accessed at https://www.fs.fed.us/rm/fire/wfcs/documents/5100-304d_LTR_Final%20Draft_010720.pdf. 32 pages.
Specification for Long Term Retardant, Wildland Firefighting. US Department of Agriculture Forest Service Specification 5100-304c. Jun. 1, 2007. https://www.fs.fed.us/rm/fire/wfcs/documents/304c.pdf. 30 pages.
Specification for Long Term Retardant, Wildland Firefighting. US Department of Agriculture Forest Service Specification 5100-304d. Jan. 7, 2020. Amended May 6, 2021. Accessed at https://www.fs.usda.gov/rm/fire/wfcs/documents/5100-304d_LTR_Final_010720_with%20Amendment%201.pdf. 32 pages.
Water Enhancers Fact Sheet. United States Forest Service. Updated Mar. 2017. Accessed at https://www.fs.usda.gov/rm/fire/wfcs/documents/WE_FactSheet_2017-0328.pdf. 1 page.
U.S. Appl. No. 16/894,231, filed Jun. 5, 2020, Hulbert et al.
U.S. Appl. No. 17/215,091, filed Mar. 29, 2021, Hulbert et al.
U.S. Appl. No. 16/894,214, filed Jun. 5, 2020, Hulbert et al.
U.S. Appl. No. 17/105,019, filed Nov. 25, 2020, Hulbert et al.
U.S. Appl. No. 17/213,770, filed Mar. 26, 2021, Hulbert et al.

(56) References Cited

OTHER PUBLICATIONS

U.S. Appl. No. 17/213,780, filed Mar. 26, 2021, Hulbert et al.
U.S. Appl. No. 17/531,269, filed Nov. 19, 2021, Hulbert et al.
U.S. Appl. No. 18/060,943, filed Dec. 1, 2022, Hulbert et al.
U.S. Appl. No. 17/031,024, filed Sep. 24, 2020, Hulbert et al.
U.S. Appl. No. 17/349,336, filed Jun. 16, 2021, Hulbert et al.
U.S. Appl. No. 17/214,266, filed Mar. 26, 2021, Hulbert et al.
U.S. Appl. No. 17/531,295, filed Nov. 19, 2021, Hulbert et al.
U.S. Appl. No. 18/060,941, filed Dec. 1, 2022, Hulbert et al.
U.S. Appl. No. 17/458,002, filed Aug. 26, 2021, Hulbert et al.
U.S. Appl. No. 17/845,569, filed Jun. 21, 2022, Hulbert et al.
U.S. Appl. No. 18/182,198, filed Mar. 10, 2023, Hulbert et al.
U.S. Appl. No. 17/552,196, filed Dec. 15, 2021, Hulbert et al.
U.S. Appl. No. 17/821,060, filed Aug. 19, 2022, Hulbert et al.
U.S. Appl. No. 18/060,946, filed Dec. 1, 2022, Hulbert et al.
U.S. Appl. No. 18/299,525, filed Apr. 12, 2023, Hulbert et al.
Van Der Veen et al. "Phosphorus flame retardants: properties, production, environmental occurrence, toxicity and analysis." Chemosphere 88.10 (2012): 1119-1153.
Walter et al., "Overview of flame retardants including magnesium hydroxide." Martin Marietta Magnesia Specialties (2015). 9 pages.
Wu et al., "Comparative performance of three magnesium compounds on thermal degradation behavior of red gum wood." Materials 7.2 (2014): 637-652.
Wu et al., "Flame retardancy and thermal degradation behavior of red gum wood treated with hydrate magnesium chloride." Journal of Industrial and Engineering Chemistry 20.5 (2014): 3536-3542.
Zhang et al., "Flame Retardancy of High-Density Polyethylene Composites with P, N-Doped Cellulose Fibrils." Polymers 12.2 (Feb. 5, 2020): 336. 15 pages.
Zhao et al. "Salt-tolerant superabsorbent polymer with high capacity of water-nutrient retention derived from sulfamic acid-modified starch." ACS omega 4.3 (2019): 5923-5930.
Zhu et al. "Effect of ionic crosslinking on the swelling and mechanical response of model superabsorbent polymer hydrogels for internally cured concrete." Materials and Structures 48 (2015): 2261-2276.

* cited by examiner

LONG-TERM FIRE RETARDANT WITH CORROSION INHIBITORS AND METHODS FOR MAKING AND USING SAME

CROSS-REFERENCE TO RELATED APPLICATIONS

The present application claims a priority benefit to U.S. provisional application Ser. No. 63/325,876 filed on Mar. 31, 2022, which is incorporated herein by reference in its entirety.

Incorporated herein by reference in their entirety are: U.S. provisional application Ser. No. 62/858,640 filed on Jun. 7, 2019; 62/989,350 filed on Mar. 13, 2020; 63/024,040 filed on May 13, 2020; 63/028,765 filed on May 22, 2020; 63/125,693 filed on Dec. 15, 2020; 63/289,992 filed on Dec. 15, 2021; and 63/140,657 filed on Jan. 22, 2021 and U.S. non-provisional application numbers: Ser. No. 16/894,231 filed Jun. 5, 2020, Ser. No. 16/894,214 filed Jun. 5, 2020, Ser. No. 17/031,024 filed Sep. 24, 2020, Ser. No. 17/214,266 filed Mar. 26, 2021, Ser. No. 17/458,002 filed Aug. 26, 2021, or Ser. No. 17/552,196 filed Dec. 15, 2021, which are hereby incorporated by reference in their entirety.

BACKGROUND

Long-term retardants contain retardant salts that alter the way a forest fire burns, decrease the fire intensity, and slow the advance of the forest fire. Long-term retardants may be available as wet or dry concentrates that are mixed with water thereby improving water's effectiveness and ability to cling to fuels, over a long period of time. Long-term retardants may be colored with iron oxide, fugitive pigments, or remain uncolored.

In the "Ecological Risk Assessment of Wildland Fire-Fighting Chemicals: Long-Term Fire Retardants" (September 2017), hereby incorporated by reference in its entirety, the United States Forest Service ("USFS") has established a chemical toxicity risk assessment for fire-fighting chemicals currently approved for use by the USFS. The USFS uses a variety of fire-fighting chemicals to aid in the suppression of fire in wildlands. These products can be categorized as long-term retardants, foams, and water enhancers. This chemical toxicity risk assessment of the long-term retardants examines their potential impacts on terrestrial wildlife, plant, and aquatic species.

Further, in Specification 5100-304d (Jan. 7, 2020), Superseding Specification 5100-304c (June 2007), Superseding Specification 5100-304b (July 1999), Superseding Specification 5100-00304a (February 1986), entitled "Specification for Long Term Retardant, Wildland Fire, Aircraft or Ground Application," hereby incorporated by reference in its entirety, the United States Department of Agriculture ("USDA") Forest Service has established the maximum allowable corrosion rates for 2024T3 aluminum, 4130 steel, yellow brass and Az-31-B magnesium. The corrosivity of forest fire retardants, in concentrate, to aluminum, steel, yellow brass and magnesium must not exceed 5.0 milli-inches ("mils") per year as determined by the "Uniform Corrosion" test set forth in Section 4.3.5.1 of the USDA Forest Service Specifications. The Forest Service Specifications identify the maximum amount of corrosion acceptable when both the retardant concentrate and its diluted solutions are exposed to each metal indicated above at temperatures of 700 Fahrenheit ("F") and 120° F. in both totally and partially immersed configurations. The maximum allowable corrosivity of aerially applied fire-retardant diluted solutions to aluminum is 2.0 mils per year ("mpy") and the maximum corrosivity to brass and steel is 2.0 mpy when partially immersed and 5.0 when tested in the partially immersed condition. In the partially immersed configurations, one-half of the coupon is within the solution and one-half is exposed to the vapors in the air space over the solution.

Potassium salts have been used in fire extinguishers (WO2019193919A1, WO2020254869A1), fire extinguishing containers or devices (WO2013124638A2, EP2617474B1), fire suppression systems for vehicles (U.S. Pat. No. 8,366,955B2), fire-fighting foam (US20060113513A1), and surface protection (US20220008773A1). However, these references do not teach or suggest that potassium salts would be suitable as a long-term fire retardant capable of aerial and/or ground application, after being mixed with water from a concentrate, and meeting various of the requirements specified by the Forest Service for long-term fire retardants.

SUMMARY

The invention relates generally to fire retardant compositions and more particularly to long-term fire retardants suitable for use in direct or indirect attack of forest fires.

In one embodiment, a forest fire retardant composition includes a retardant compound and a thickening agent. The forest fire retardant may optionally include a corrosion inhibitor and/or a colorant. The retardant compound includes a potassium salt of an acid. The acid may be an organic acid, such as formic acid, acetic acid, propanoic acid, butanoic acid, lactic acid, oxalic acid, malic acid, gluconic acid, tartaric acid, uric acid, malic acid, or citric acid. The acid may also be an inorganic acid, such as sulfuric acid, phosphoric acid, carbonic acid, or hydrochloric acid. The corrosion inhibitor may include a corrosion inhibitor for at least one of iron, brass, aluminum, or magnesium.

In another embodiment, the forest fire retardant composition includes a retardant compound including potassium bicarbonate; a corrosion inhibitor for at least one of iron, brass, aluminum, or magnesium present in the composition in an amount having a weight percent of about 0.05% to about 25% relative to the weight of the retardant compound in the composition; a thickening agent, present in the composition in an amount having a weight percent of about 0.4% to about 25% relative to the weight of the retardant compound in the composition; and a colorant, present in the composition in an amount having a weight percent of about 0.3% to about 10% relative to the weight of the retardant compound in the composition. In another embodiment, the retardant compound includes at least one of dipotassium phosphate, diammonium phosphate, diammonium orthophosphate, disodium phosphate, disodium phosphate hydrate, sodium tripolyphosphate, or trisodium phosphate. In another embodiment, the retardant compound includes at least one of potassium acetate or potassium acetate hydrate.

In another embodiment, the forest fire retardant composition includes a retardant compound including potassium acetate; a corrosion inhibitor for at least one of iron, brass, aluminum, or magnesium present in the composition in an amount having a weight percent of about 0.05% to about 25% relative to the weight of the retardant compound in the composition; a thickening agent, present in the composition in an amount having a weight percent of about 0.4% to about 25% relative to the weight of the retardant compound in the composition; optionally a colorant, present in the composition in an amount having a weight percent of about 0.3% to about 10% relative to the weight of the retardant compound in the composition. The corrosion inhibitor may include at least one of an alkyl amine, an azole, iron pyrropyhosphate, disodium molybdate, sodium lauryl sulfate or sodium stearate. In another embodiment, the retardant compound includes at least one of potassium formate ($HCO_2K$), potassium acetate hydrate ($CH_3COOK(H_2O)_x$), potassium propanoate ($C_3H_5KO_2$), potassium butanoate ($C_4H_7KO_2$), potassium lactate ($KC_3H_5O_3$), potassium oxalate ($C_2K_2O_4$), potassium oxalate monohydrate ($C_2K_2O_4(H_2O)_l$), monopotassium malate ($C_4H_5KO_5$), potassium glutamate ($C_5H_8KNO_4$), potassium glutamate monohydrate ($C_5H_8KNO_4(H_2O)_l$), potassium L-glutamate monohydrate ($KOOCCH_2CH_2CH(NH_2)COOH(H_2O)_l$), monopotassium tartrate ($C_4H_5KO_6$), potassium urate ($C_5H_3KN_4O_3$), dipotassium malate ($C_4H_4K_2O_5$), dipotassium tartrate ($C_4H_4K_2O_6$), monopotassium citrate ($KH_2C_6H_5O_7$), potassium gluconate ($C_6H_{11}KO_7$), dipotassium citrate ($C_6H_6K_2O_7$), tripotassium citrate ($K_3C_6H_5O_7$), or tripotassium citrate monohydrate ($K_3C_6H_5O_7(H_2O)_l$). The $CH_3COOK(H_2O)_x$ includes at least one of $CH_3COOK(H_2O)_l$, $CH_3COOK(H_2O)_3$, or mixtures thereof. In another embodiment, the retardant compound includes at least one of potassium bicarbonate ($KHCO_3$), potassium carbonate ($K_2CO_3$), monopotassium phosphate ($KH_2PO_4$), potassium ammonium phosphate ($K_2NH_4PO_4$), dipotassium phosphate ($K_2HPO_4$), dipotassium phosphate hydrate ($K_2HPO_4(H_2O)_x$), tripotassium phosphate ($K_3PO_4$), tripotassium phosphate hydrate ($K_3PO_4(H_2O)_x$), tetrapotassium pyrophosphate ($K_4P_2O_7$), potassium bisulfate ($KHSO_4$), potassium ammonium sulfate ($H_4KNO_4S$), potassium sulfate ($K_2SO_4$), diammonium phosphate, or diammonium orthophosphate. The $K_2HPO_4(H_2O)_x$ includes at least one of $K_2HPO_4(H_2O)_3$, $K_2HPO_4(H_2O)_6$, or mixtures thereof and the $K_3PO_4(H_2O)_x$ includes at least one of $K_3PO_4(H_2O)_3$, $K_3PO_4(H_2O)_7$, $K_3PO_4(H_2O)_9$, or mixtures thereof.

In another embodiment, the forest fire retardant composition is a dry concentrate having no more than about 3% by weight of water relative to the total weight of the dry concentrate. In another embodiment, the forest fire retardant composition is a liquid concentrate further including water, and the retardant compound is present in the liquid concentrate in an amount having a weight percent of about 15% to about 85% relative to the total weight of the liquid concentrate.

In another embodiment, the fire retardant composition is a final diluted product intended for use to suppress, retard, or contain forest fires, and the retardant compound is present in the final diluted product in an amount having a weight percent of about 6% to about 23% relative to the total weight of the final diluted product. In another embodiment, the final diluted product is a long-term fire retardant. The long-term fire retardant has a viscosity between 150 cP and 1500 cP, and the long-term fire retardant does not exceed a corrosion rates of 2.0 mils-per-year for aluminum, 5.0 mils-per-year for iron, and 5.0 mils-per-year for brass. In another embodiment, the long-term fire retardant does not exceed a corrosion rate of 4.0 mils-per-year for magnesium.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

In General

Figure 1:
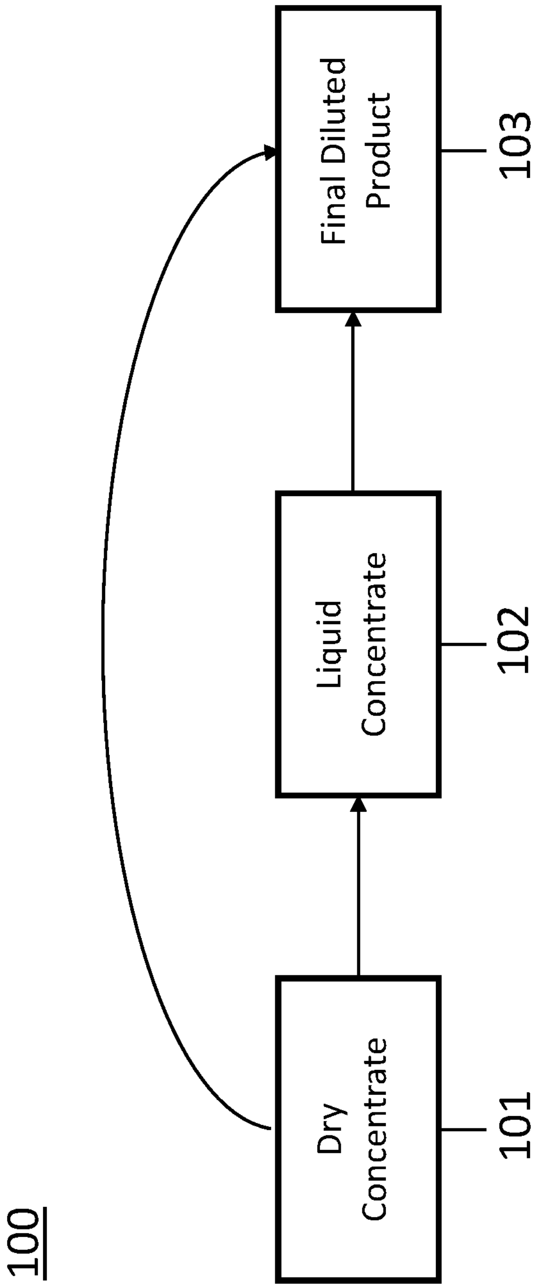
FIG. 1 is a flow chart diagram showing the process of making a forest fire retardant composition from a dry concentrate.

Referring to FIG. 1, a forest fire retardant composition 100 can be provided in various forms. The composition 100 can be provided as a dry concentrate 101 substantially free of water. Alternatively, the composition 100 can be provided as a liquid concentrate 102. The liquid concentrate 102 can be formed by adding water or other solvent(s) to the dry concentrate 101. Alternatively, liquid concentrate 102 is formed when the dry concentrate 101 is deliquescent, hygroscopic, and absorbs moisture from the air or other moisture source. The composition 100 can also be provided as a final diluted product 103 in a form suitable to fight forest fires via aerial- or ground-based application. The final diluted product 103 is formed either by diluting the dry concentrate 101 with water or by diluting the liquid concentrate 102 with water.

Figure 2:
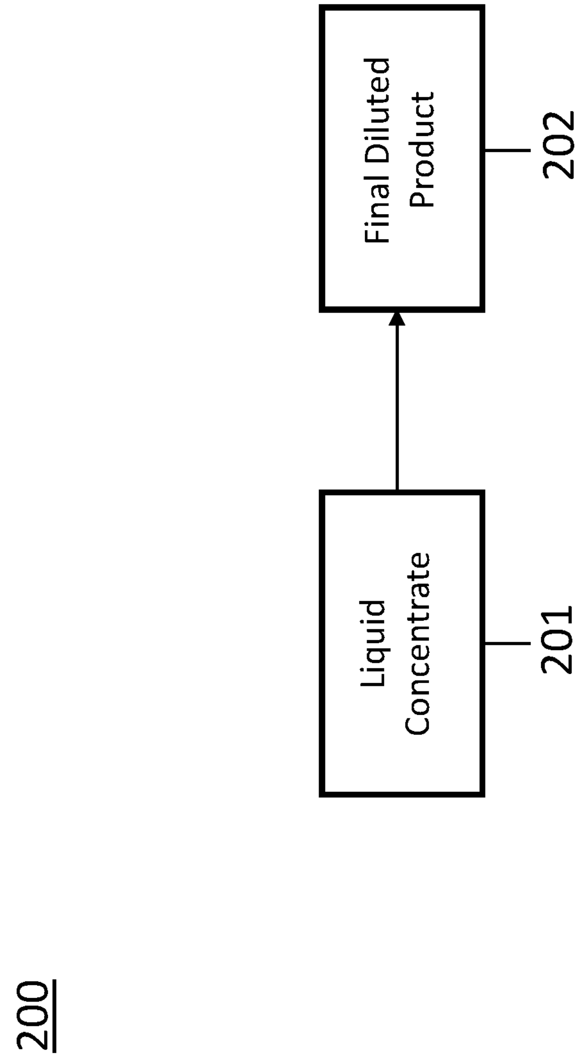
FIG. 2 is a flow chart diagram showing the process of making a forest fire retardant composition from a liquid concentrate.

Referring to FIG. 2, a forest fire retardant composition 200 can be provided in various liquid forms. The composition 200 can be provided as a liquid concentrate 201. The composition 200 can also be provided as a final diluted product 202 in a form suitable to fight forest fires via aerial- or ground-based application. The final diluted product 202 is formed by diluting the liquid concentrate 201 with water in one or more diluting steps.

Components of the Compositions 100 and 200

The forest fire retardant compositions 100 and 200 include one or more retardant compounds. The retardant compounds preferably include an inorganic compound(s). Instead of (or in addition to) an inorganic compound(s), the retardant compounds may include an organic compound(s). Table 1 below illustrates exemplary compounds, any one or more of which may be used, alone or in combination, as a retardant compound in the compositions 100 and 200.

TABLE 1

| Exemplary Retardant Compounds | | | | |
|---|---|---|---|---|
| Halide Salts | Non-Halide Salts | Other inorganic retardants | Organic retardants | Potassium Retardants |
| $MgCl_2$ | $MgCO_3$ | MgO | $C_2H_7NO_2$ | KCl |
| $MgCl_2(H_2O)_x$ where x is 1, 2, 4, 6, 8, or 12 | $Mg_3(PO_4)_2$ | CaO | $C_6H_{11}NO_7$ | $HCO_2K$ |

TABLE 1-continued

| Exemplary Retardant Compounds | | | | |
|---|---|---|---|---|
| Halide Salts | Non-Halide Salts | Other inorganic retardants | Organic retardants | Potassium Retardants |
| $CaCl_2$ | $Mg_5(CO_3)_4(OH)_2(H_2O)_4$ | $Na_2O$ | | $CH_3COOK$ |
| $CaCl_2(H_2O)_x$ where x is 1, 2, 4, or 6 | $Mg_3(PO_4)_2(H_2O)_8$ | $Li_2O$ | | $CH_3COOK(H_2O)_x$ where x = 1 or 3 |
| $MgBr_2$ | $CaCO_3$ | BaO | | $KHCO_3$ |
| $CaBr_2$ | $Ca_3(PO_4)_2$ | $Mg(OH)_2$ | | $C_3H_5KO_2$ |
| $NH_4Cl$ | $Mg_3Ca(CO_3)_4$ | $Ca(OH)_2$ | | $C_4H_7KO_2$ |
| | $Ca_3(PO_4)_2(H_2O)_2$ | NaOH | | $KC_3H_5O_3$ |
| | DAP | LiOH | | $KHSO_4$ |
| | MAP | $Ba(OH)_2$ | | $K_2CO_3$ |
| | APP | KOH | | $K_2NH_4PO_4$ |
| | $(NH_4)_2SO_4$ | $P_2O_5$ | | $H_4KNO_4S$ |
| | $K_2SO_4$ | | | $C_2K_2O_4$ |
| | $MgSO_4$ | | | $C_2K_2O_4(H_2O)_x$ where x = 1 |
| | $MgSO_4(H_2O)_x$ where x is 1, 2, 3, 4, 5, 6, 7, 9, 10 or 11 | | | $C_4H_5KO_5$ |
| | $K_2Mg(SO_4)_2(H_2O)_x$ where x is 4 or 6 | | | $C_5H_8KNO_4$ |
| | $Na_2SO_4$ | | | $C_5H_8KNO_4(H_2O)_x$ where x = 1 |
| | $Na_2SO_4(H_2O)_x$ where x is 7 or 10 | | | $C_4H_5KO_6$ |
| | $MgCO_3(H_2O)_x$ where x is 2, 3, or 5 | | | $KOOCCH_2CH_2CH(NH_2)COOH(H_2O)_x$ where x = 1 |
| | $Mg(PO_4HNH_4)_2$ | | | $C_5H_3KN_4O_3$ |
| | $NaPO_4HNH_4$ | | | $C_4H_4K_2O_5$ |
| | $NaPO_4HNH_4(H_2O)_x$, where x = 1, 2, 3, or 4 | | | $C_4H_4K_2O_6$ |
| | $Na_2HPO_4$ | | | $KH_2C_6H_5O_7$ |
| | $Na_2HPO_4(H_2O)_x$, where x = 2, 7, 8, or 12 | | | $C_6H_{11}KO_7$ |
| | $NaH_2PO_4$ | | | $C_6H_6K_2O_7$ |
| | $NaH_2PO_4(H_2O)_x$, where x = 1 or 2 | | | $K_3C_6H_5O_7$ |
| | $Na_3PO_4$ | | | $K_3C_6H_5O_7(H_2O)_x$ where x = 1 |
| | $Na_5P_3O_{10}$ | | | $HOC(COOK)(CH_2COOK)_2(H_2O)_x$ where x = 1 |
| | $Na_5P_3O_{10}(H_2O)_6$ | | | $K_4P_2O_7$ |
| | $Ca(H_2PO_4)_2$ | | | $K_2SO_4$ |
| | $Ca(H_2PO_4)_2(H_2O)_x$, where x = 1 | | | $KH_2PO_4$ |
| | $CaHPO_4$ | | | $K_2HPO_4$ |
| | $CaHPO_4(H_2O)_x$, where x = 1 or 2 | | | $K_2HPO_4(H_2O)_x$, where x = 3 or 6 |
| | $Ca_3(PO_4)_2$ | | | $K_3PO_4$ |
| | $Ca_8H_2(PO_4)_6 \bullet 5H_2O$ | | | $K_3PO_4(H_2O)_x$, where x = 3, 7, or 9 |
| | $Ca_2P_2O_7$ | | | |
| | $Ca_2P_2O_7(H_2O)_x$, where x = 2 or 4 | | | |
| | $Ca_5(P_3O_{10})_2$ | | | |
| | $Ca_5(PO_4)_3(OH)$ | | | |
| | $Ca_{10}(PO_4)_6(OH, F, Cl, Br)_2$ | | | |
| | $Ca_4(PO_4)_2 \bullet O$ | | | |
| | $KH_2PO_4$ | | | |
| | $K_2HPO_4$ | | | |
| | $K_2HPO_4(H_2O)_x$, where x = 3 or 6 | | | |
| | $K_3PO_4$ | | | |
| | $K_3PO_4(H_2O)_x$, where x = 3, 7, or 9 | | | |

The retardant compound may be a salt. The salt may be a potassium salt. The potassium salt may be a potassium salt of an organic acid. The organic acid may include formic acid, acetic acid, propanoic acid, butanoic acid, lactic acid, oxalic acid, malic acid, gluconic acid, tartaric acid, uric acid, malic acid, or citric acid. The potassium salt of an organic acid in the forest fire retardant composition 100 and/or 200 may include one or more of the following: potassium formate ($HCO_2K$), potassium acetate ($CH_3COOK$), potassium acetate hydrate ($CH_3COOK(H_2O)_x$, where x is about 1 to about 3), potassium propanoate ($C_3H_5KO_2$), potassium butanoate ($C_4H_7KO_2$), potassium lactate ($KC_3H_{503}$), potassium oxalate ($C_2K_2O_4$), potassium oxalate monohydrate ($C_2K_2O_4(H_2O)_l$), monopotassium malate ($C_4H_5KO_5$), potassium glutamate ($C_5H_8KNO_4$), potassium glutamate monohydrate ($C_5H_8KNO_4(H_2O)_l$), potassium L-glutamate monohydrate ($KOOCCH_2CH_2CH(NH_2)COOH(H_2O)_l$), monopotassium tartrate ($C_4H_5KO_6$), potassium urate ($C_5H_3KN_4O_3$), dipotassium malate ($C_4H_4K_2O_5$), dipotassium tartrate ($C_4H_4K_2O_6$), monopotassium citrate ($KH_2C_6H_5O_7$), potassium gluconate ($C_6H_{11}KO_7$), dipotassium citrate ($C_6H_6K_2O_7$), tripotassium citrate ($K_3C_6H_5O_7$), tripotassium citrate monohydrate ($K_3C_6H_5O_7(H_2O)_l$), and mixtures thereof. The potassium acetate can be anhydrous, substantially free of any hydrate. Alternatively, or in combination with the anhydrous potassium acetate, the potassium acetate can be a hydrate, substantially free of any anhydrous. The hydrate may have the formula $CH_3COOK(H_2O)_x$, where x is about 1 to about 3. For example, x may be equal to at least one of 1 or 3. The potassium acetate may contain a mixture of multiple different hydrates $CH_3COOK(H_2O)_y$, such that when measured, y constitutes an average weighted number of hydrates in the mixture, and thus y is not necessarily a whole number. For example, the average weighted value of y may be about 1.0 to about 3.0, preferably about 1.1 to about 2.9, more preferably about 1.2 to about 2.8, and more preferably about 1.5 to about 2.5. The potassium acetate anhydrous and the potassium acetate hydrate may be present in the forest fire retardant composition 100 in a weight ratio (anhydrous:hydrate) from about 0%:100% to about 100%:0%, including about 5%:95%, 10%:90%, 15%:85%, 20%:80%, 25%:75%, 30%:70%, 35%:65%, 40%:60%, 45%:55%, 50%:50%, 55%:45%, 60%:40%, 65%:35%, 70%:30%, 75%:25%, 80%:20%, 85%:15%, 90%:10%, 95%:5%, and any range between any two such ratios.

Instead of (or in addition to) potassium salts of an organic acid, the potassium salt may be a potassium salt of an inorganic acid. The inorganic acid may include sulfuric acid, phosphoric acid, carbonic acid, or hydrochloric acid. The potassium salt of an inorganic acid in the forest fire retardant composition 100 and/or 200 may include one or more of the following: potassium bicarbonate ($KHCO_3$), potassium carbonate ($K_2CO_3$), monopotassium phosphate (MKP) ($KH_2PO_4$), potassium ammonium phosphate ($K_2NH_4PO_4$), dipotassium phosphate (DKP) ($K_2HPO_4$), dipotassium phosphate hydrate ($K_2HPO_4(H_2O)_x$, where x is about 3 to about 6), tripotassium phosphate ($K_3PO_4$), tripotassium phosphate hydrate ($K_3PO_4(H_2O)_x$, where x=3, 7, or 9), tetrapotassium pyrophosphate ($K_4P_2O_7$), potassium bisulfate ($KHSO_4$), potassium ammonium sulfate ($H_4KNO_4S$), potassium sulfate ($K_2SO_4$), and mixtures thereof. The dipotassium phosphate can be anhydrous, substantially free of any hydrate. Alternatively, or in combination with the anhydrous dipotassium phosphate, the dipotassium phosphate can be a hydrate, substantially free of any anhydrous. The hydrate may have the formula $K_2HPO_4(H_2O)_x$, where x is about 3 to about 6. For example, x may be equal to at least one of 3 or 6. The dipotassium phosphate may contain a mixture of multiple different hydrates $K_2HPO_4(H_2O)_y$, such that when measured, y constitutes an average weighted number of hydrates in the mixture, and thus y is not necessarily a whole number. For example, the average weighted value of y may be about 3.0 to about 6.0, preferably about 3.2 to about 5.8, more preferably about 3.5 to about 5.5, and more preferably about 4.0 to about 5.0. The dipotassium phosphate anhydrous and the dipotassium phosphate hydrate may be present in the forest fire retardant composition 100 in a weight ratio (anhydrous:hydrate) from about 0%:100% to about 100%:0%, including about 5%:95%, 10%:90%, 15%:85%, 20%:80%, 25%:75%, 30%:70%, 35%:65%, 40%:60%, 45%:55%, 50%:50%, 55%:45%, 60%:40%, 65%:35%, 70%:30%, 75%:25%, 80%:20%, 85%:15%, 90%:10%, 95%:5%, and any range between any two such ratios. The tripotassium phosphate can be anhydrous, substantially free of any hydrate. Alternatively, or in combination with the anhydrous tripotassium phosphate, the tripotassium phosphate can be a hydrate, substantially free of any anhydrous. The hydrate may have the formula $K_3PO_4(H_2O)_x$, where x is about 3 to about 9). For example, x may be equal to at least one of 3, 7, or 9. The tripotassium phosphate may contain a mixture of multiple different hydrates $K_3PO_4(H_2O)_y$, such that when measured, y constitutes an average weighted number of hydrates in the mixture, and thus y is not necessarily a whole number. For example, the average weighted value of y may be about 3.0 to about 9.0, preferably about 3.5 to about 8.5, more preferably about 4.0 to about 8.0, and more preferably about 4.5 to about 7.5. The tripotassium phosphate anhydrous and the tripotassium phosphate hydrate may be present in the forest fire retardant composition 100 in a weight ratio (anhydrous:hydrate) from about 0%:100% to about 100%:0%, including about 5%:95%, 10%:90%, 15%:85%, 20%:80%, 25%:75%, 30%:70%, 35%:65%, 40%:60%, 45%:55%, 50%:50%, 55%:45%, 60%:40%, 65%:35%, 70%:30%, 75%:25%, 80%:20%, 85%:15%, 90%:10%, 95%:5%, and any range between any two such ratios.

Referring to FIG. 1, the composition 100 may begin as a dry concentrate 101 substantially free of water. As used herein, "substantially free of water," when referring to the dry concentrate 101, does not refer to the water of crystallization or water of hydration of the potassium salt (i.e., the hydrate potassium salt). Additionally, as used herein, "substantially free of water," when referring to the dry concentrate 101, does not prohibit the addition of minimal amounts of water (e.g., less than 2% weight percent relative to the amount of the retardant compound in the composition 100) to the dry concentrate 101 to assist with mixing the components.

In the dry concentrate 101, the weight percent of the retardant compound relative to the total weight of the dry concentrate 101 is about 60% to about 99.5%, preferably about 62% to about 99%, more preferably about 64% to about 98.5%, and particularly about 66% to about 98%.

In the final diluted product 103, the weight percent of the retardant compound relative to the total weight of the final diluted product 103 is about 4% to about 30%, preferably about 5% to about 25%, more preferably about 6% to about 23%, and particularly about 7% to about 20%.

Preferably, the potassium salt may be present in the composition 200 in an aqueous solution including a potassium salt and water. The water may be tap water, sea water, or water from other convenient water sources. Prior to the addition of any water used to make the potassium salt solution, the potassium salt may be an anhydrous potassium salt and/or a potassium salt hydrate. For example, the aqueous solution including a potassium salt and water may include but is not limited to an aqueous solution of potassium formate ($HCO_2K$), potassium acetate ($CH_3COOK$), potassium acetate hydrate ($CH_3COOK(H_2O)_x$, where x is about 1 to about 3), potassium lactate ($KC_3H_{503}$), monopotassium citrate ($KH_2C_6H_5O_7$), dipotassium citrate ($C_6H_6K_2O_7$), tripotassium citrate ($K_3C_6H_5O_7$), and/or tripotassium citrate monohydrate ($K_3C_6H_5O_7(H_2O)_l$). Alternatively, the aqueous potassium salt solution may include any of the potassium salts disclosed herein and water. The aqueous potassium salt solution may be formed by the addition of water or other solvent to one of the potassium salts disclosed herein. In the liquid concentrate 201, the aqueous potassium salt solution is about 10% to about 90% potassium salt by weight, more preferably 15% to 85%, and particularly about 20% to about 80%. For example, the aqueous potassium salt solution in the liquid concentrate 201 is about 25% to about 75% by weight.

In the liquid concentrate 201, the weight percent of the retardant compound relative to the total weight of the liquid concentrate 201 is about 15% to about 85%, preferably about 20% to about 80%, more preferably about 30% to about 75%, and particularly about 35% to about 70%.

In the final diluted product 202, the weight percent of the retardant compound relative to the total weight of the final diluted product 202 is about 4% to about 30%, preferably about 5% to about 25%, more preferably about 6% to about 23%, and particularly about 7% to about 20%.

Instead of (or in addition to) a potassium salt, the salt of the forest fire retardant composition 100 and/or 200 may include a non-potassium salt. The non-potassium salt may include any of the retardant compounds listed in Table 1. The potassium salt may also be used in combination with any of the retardant compounds listed in Table 1. For example, the potassium salt may also be used in combination with any of the retardant compounds disclosed in U.S. non-provisional application Ser. No. 16/894,231 filed Jun. 5, 2020, Ser. No. 16/894,214 filed Jun. 5, 2020, Ser. No. 17/031,024 filed Sep. 24, 2020, Ser. No. 17/214,266 filed Mar. 26, 2021, Ser. No. 17/458,002 filed Aug. 26, 2021, or Ser. No. 17/552,196 filed Dec. 15, 2021, which are hereby incorporated by reference in their entirety. In the forest fire retardant composition 100 and/or 200, the weight percent of potassium salt (including both anhydrous and hydrate): non-potassium salt (including both anhydrous and hydrate) may be about 0%:100% to about 100%:0%, including about 5%:95%, 10%:90%, 15%:85%, 20%:80%, 25%:75%, 30%:70%, 35%:65%, 40%:60%, 45%:55%, 50%:50%, 55%:45%, 60%:40%, 65%:35%, 70%:30%, 75%:25%, 80%:20%, 85%:15%, 90%:10%, 95%:5%, and any range between any two such ratios.

For example, the non-potassium salt may include a halide salt including at least one of a magnesium halide salt or a calcium halide salt. The magnesium halide salt may include magnesium chloride. The magnesium chloride can be anhydrous, substantially free of any hydrate. Alternatively, or in combination with the anhydrous magnesium chloride, the magnesium chloride can be a hydrate, substantially free of any anhydrous. The hydrate may have the formula $MgCl_2(H_2O)_x$, where x is about 1 to about 12. For example, x may be equal to at least one of 1, 2, 4, 6, 8, or 12. The magnesium chloride may contain a mixture of multiple different hydrates $MgCl_2(H_2O)_y$, such that when measured, y constitutes an average number of hydrates in the mixture, and thus y is not necessarily a whole number. For example, y may be about 1.0 to about 12.0, preferably about 1.5 to about 10.5, more preferably about 2.5 to about 9.5, and more preferably about 3.5 to about 8.5. The magnesium chloride may be present in the composition 200 in an aqueous solution including magnesium chloride and water. The water may be tap water, sea water, or water from other convenient water sources. Prior to the addition of any water used to make the magnesium chloride solution, the magnesium chloride may be magnesium chloride anhydrous and/or magnesium chloride hydrate. The magnesium chloride solution may be a corrosion inhibited magnesium chloride solution or a non-corrosion inhibited magnesium chloride solution. The magnesium chloride is a corrosion inhibited magnesium chloride solution when it includes a corrosion inhibitor in the magnesium chloride solution. The non-corrosion inhibited magnesium chloride solution does not include a corrosion inhibitor in the magnesium chloride solution. The magnesium chloride solution (corrosion inhibited or non-corrosion inhibited) may include, but is not limited to, magnesium chloride solution (CAS Number: 7786-30-3) or magnesium chloride hexahydrate (CAS Number: 7791-18-6) from Sigma Aldrich, or FreezGard Lite CI Plus, FreezGard Zero CI Plus, FreezGard Zero CI Plus LS, FreezGard CI Plus Sub Zero, FreezGard CI Plus, DustGuard, DustGard Plus, FreezGard Zero, FreezGard Lite, or MagnaPro from Compass Minerals or Hydro-Melt Green or HydroMelt Liquid Deicer from Cargill, or Iceban 200, Caliber M1000 AP, Meltdown with Shield AP, Meltdown APEX with Shield AP, FreezGard CI Plus, Ice B'Gone II HF, Ice Ban 305, FreezGard 0 CCI, Meltdown Apex, Meltdown Inhibited, ProMelt MAG 30 INH, ProMelt Ultra 1000 INH, NexGen Torch, or NexGen Liquid De-Icer. The magnesium chloride can be extracted from brine or sea water and may also contains small amounts of other salts and impurities.

Alternatively, the magnesium chloride solution may be formed by the addition of water or other solvent to solid magnesium chloride anhydrous and/or magnesium chloride hydrate. The magnesium halide salt may also include one or more different phases, including but not limited to, Bischofite ($MgCl_2(H_2O)_6$) and/or magnesium chloride anhydrous ($MgCl_2$). For example, the potassium salt and magnesium halide salt may include potassium acetate and magnesium chloride anhydrous ($MgCl_2$). A mixture of potassium acetate and magnesium chloride anhydrous in the forest fire retardant composition 100 and/or 200 may have a weight ratio of the total amount of salt (potassium acetate: magnesium chloride) from about 0%:100% to about 100%:0%, preferably about 0.5%:99.5% to about 99.5%:0.5%, more preferably about 2%:98% to about 98%:2%, for example about 5%:95% to about 95%:5%.

Instead of (or in addition to) chlorine, the magnesium halide salt may include bromine as the halogen which forms a magnesium bromide salt. The bromine may be used alone in the magnesium halide salt; alternatively, the bromine may be used in combination with chlorine, thereby forming a mixture of magnesium bromide and magnesium chloride salts. The bromine salt, when used as a bromine flame retardant, has a mechanism that is similar to chlorine and may be used as a long-term fire retardant alone or in combination with chlorine. Halogens or other compounds that liberate stable radicals in the thermal environment of the flame front also operate with a mechanism that is similar to chlorine and may be used as a long-term fire retardant.

Instead of (or in addition to) magnesium chloride, the halide salt may be calcium chloride. The calcium chloride can be anhydrous, substantially free of any hydrate. Alternatively, or in addition to the anhydrous calcium chloride, the calcium chloride can be a hydrate, substantially free of any anhydrous. The hydrate may have the formula $CaCl_2)(H_2O)_x$, where x is about 1 to about 6. For example, x may be equal to at least one of 1, 2, 4, or 6. The calcium chloride may contain a mixture of multiple different hydrates $CaCl_2)(H_2O)_y$, such that when measured, y constitutes an average number of hydrates in the mixture, and thus y is not necessarily a whole number. For example, x may be about 1.0 to about 6.0, preferably about 1.5 to about 6.0, more preferably about 2.5 to about 9.5, and more preferably about 3.5 to about 8.5.

Preferably, the calcium chloride is present in the composition 100 in a combination of both calcium chloride anhydrous and calcium chloride hydrate. The calcium chloride forest fire retardant composition may be used for a liquid concentrate. The calcium halide salt in the forest fire retardant composition 100 may include bromine as the halogen which forms a calcium bromide salt. The bromine may be used alone in the calcium halide salt; alternatively, the bromine may be used in combination with chlorine, thereby forming a mixture of calcium bromide and calcium chloride salts. Preferably, the calcium chloride is present in the composition 200 in an aqueous solution including calcium chloride solution and water. Prior to the addition of any water used to make the calcium chloride solution, the calcium chloride may be calcium chloride anhydrous or calcium chloride hydrate. The calcium chloride solution may be a corrosion inhibited calcium chloride solution or a non-corrosion inhibited calcium chloride solution. The calcium chloride is a corrosion inhibited calcium chloride solution when it includes a corrosion inhibitor in the calcium chloride solution. The non-corrosion inhibited calcium chloride solution does not include a corrosion inhibitor in the calcium chloride solution. The calcium chloride solution (corrosion inhibited or non-corrosion inhibited) may include, but is not limited to, calcium chloride (CAS Number: 10043-52-4) from Sigma Aldrich, Liquid Dow Armor, Winter Thaw DI, Corguard TG, Road Guard Plus, Calcium Chloride with Boost (CCB), MeltDown Apex-C, or C1000 Pro. The calcium chloride can be extracted from brine or sea water and may also contains small amounts of other salts and impurities. Alternatively, the calcium chloride solution may be formed by the addition of water or other solvent to solid calcium chloride anhydrous and/or calcium chloride hydrate. The calcium halide salt in the forest fire retardant composition 200 may include bromine as the halogen which forms a calcium bromide salt. The bromine may be used alone in the calcium salt; alternatively, the bromine may be used in combination with chlorine, thereby forming a mixture of calcium bromide and calcium chloride salts.

In the forest fire retardant composition 100 and/or 200, the weight percent of potassium salt (including both anhydrous and hydrate):halide salt (including both anhydrous and hydrate) may be about 0%:100% to about 100%:0%, including about 5%:95%, 10%:90%, 15%:85%, 20%:80%, 25%:75%, 30%:70%, 35%:65%, 40%:60%, 45%:55%, 50%:50%, 55%:45%, 60%:40%, 65%:35%, 70%:30%, 75%:25%, 80%:20%, 85%:15%, 90%:10%, 95%:5%, and any range between any two such ratios.

The non-potassium salt may also salt may further include ammonium salts of ortho, pyro, tripoly, or tetrapoly phosphoric acid. The ammonium salts of ortho, pyro, tripoly, or tetrapoly phosphoric acid in the forest fire retardant composition 100 and/or 200 may include one or more of the following: ammonium orthophosphates, ammonium pyrophosphates, ammonium polyphosphates having an average chain length of less than 20 phosphorus atoms. For example, the phosphate salt may include at least one of diammonium phosphate (DAP), diammonium orthophosphate (DAP), monoammonium phosphate (MAP), monoammonium orthophosphate (MAP), ammonium polyphosphate (APP), and mixtures thereof. A mixture of ammonium phosphates in the forest fire retardant composition 100 and/or 200 may include MAP containing from about 10% to about 12% ammoniacal nitrogen by weight and from about 40% to about 61% phosphorus pentoxide by weight, and DAP containing from about 16% to about 21% ammoniacal nitrogen by weight and from about 40% to about 54% phosphorus pentoxide by weight. A mixture of MAP and DAP in the forest fire retardant composition 100 and/or 200 may have a weight ratio of the total ammonium phosphate (MAP:DAP) from about 5%:95% to about 60%:40%, preferably about 40%:60% to about 60%:40%, for example about 50%:50% to about 60%:40%. The potassium salt may also be used in combination with ammonium salts of ortho, pyro, tripoly, or tetrapoly phosphoric acid. A mixture of potassium salt(s) and ammonium salt(s) in the fire retardant composition 100 and/or 200 may have a weight ratio of the total amount of salt (potassium salt:ammonium salt) from about 0%:100% to about 100%:0%, including about 5%:95%, 10%:90%, 15%:85%, 20%:80%, 25%:75%, 30%:70%, 35%:65%, 40%:60%, 45%:55%, 50%:50%, 55%:45%, 60%:40%, 65%:35%, 70%:30%, 75%:25%, 80%:20%, 85%:15%, 90%:10%, 95%:5%, and any range between any two such ratios. For example, a mixture of tripotassium citrate and MAP in the forest fire retardant composition 100 and/or 200 may have a weight ratio of the total amount of salt (tripotassium citrate:MAP) from about 0%:100% to about 100%:0%, preferably about 0.5%:99.5% to about 99.5%:0.5%, more preferably about 2%:98% to about 98%:2%, for example about 5%:95% to about 95%:5%. For example, a mixture of DKP, MAP, and DAP in the forest fire retardant composition 100 and/or 200 may have a weight ratio of the total amount of salt (DKP:MAP:DAP) from about 0%:100%:0% to about 100%:0%:0%, preferably about 5%:95%:0% to about 95%:5%:0%, more preferably about 10%:90%:0% to about 90%:10%:0%, for example about 15%:85%:0% to about 50%:35%:15%.

Instead of (or in addition to) ammonium salts of ortho, pyro, tripoly, or tetrapoly phosphoric acid, the non-potassium salt may include a sodium phosphate salt. The sodium phosphate salt may include sodium salts of mono-, di-, tri-, tetra, and polyphosphates. The sodium phosphate salt in the forest fire retardant composition 100 and/or 200 may include one or more of the following: monosodium phosphate (MSP), disodium phosphate (DSP), disodium phosphate hydrate, sodium ammonium phosphate (SAP), sodium ammonium phosphate hydrate (SAP-H), sodium tripolyphosphate (STPP), trisodium phosphate (TSP), and mixtures thereof.

The disodium phosphate can be anhydrous, substantially free of any hydrate. Alternatively, or in combination with the anhydrous disodium phosphate, the disodium phosphate can be a hydrate, substantially free of any anhydrous. The hydrate may have the formula $Na_2HPO_4(H_2O)_x$, where x is about 1 to about 12. For example, x may be equal to at least one of 2, 7, 8, or 12. The disodium phosphate may contain a mixture of multiple different hydrates $Na_2HPO_4(H_2O)_y$, such that when measured, y constitutes an average weighted number of hydrates in the mixture, and thus y is not necessarily a whole number. For example, the average weighted value of y may be about 2.0 to about 12.0, preferably about 1.5 to about 11.5, more preferably about 2.5 to about 10.5, and more preferably about 3.5 to about 9.5. The sodium ammonium phosphate can be anhydrous, substantially free of any hydrate. Alternatively, or in combination with the anhydrous sodium ammonium phosphate, the sodium ammonium phosphate can be a hydrate. The hydrate may have the formula $NaPO_4HNH_4(H_2O)_x$, where x is about 1 to about 4. For example, x may be equal to at least one of 1, 2, 3, or 4. The disodium phosphate may also contain a mixture of multiple different hydrates $NaPO_4HNH_4(H_2O)_y$, such that when measured, y constitutes an average weighted number of hydrates in the mixture, and thus y is not necessarily a whole number. For example, the average weighted value of y may be about 1.0 to about 4.0, preferably about 1.2 to about 3.9, more preferably about 1.4 to about 3.8, and more preferably about 1.6 to about 3.6. The sodium ammonium phosphate hydrate is preferably sodium ammonium phosphate tetrahydrate (SAP-TH) having the formula $NaPO_4HNH_4(H_2O)_4$. The potassium salt may also be used in combination with the sodium phosphate salt. A mixture of potassium salt(s) and sodium phosphate salt(s) in the fire retardant composition 100 and/or 200 may have a weight ratio of the total amount of salt (potassium salt: sodium phosphate salt) from about 0%:100% to about 100%:0%, including about 5%:95%, 10%:90%, 15%:85%, 20%:80%, 25%:75%, 30%:70%, 35%:65%, 40%:60%, 45%:55%, 50%:50%, 55%:45%, 60%:40%, 65%:35%, 70%:30%, 75%:25%, 80%:20%, 85%:15%, 90%:10%, 95%:5%, and any range between any two such ratios.

Instead of (or in addition to) ammonium salts of ortho, pyro, tripoly, or tetrapoly phosphoric acid and/or sodium phosphate salt(s), the non-potassium salt may be a calcium phosphate salt. The calcium phosphate salt may include calcium salts of orthophosphates, di- and monohydrogen phosphates, and/or di- and polyphosphates. The calcium phosphate salt in the forest fire retardant composition 100 and/or 200 may include one or more of the following: monocalcium phosphate (MCP), dicalcium phosphate (DCP), tricalcium phosphate (TCP), octacalcium phosphate (OCP), dicalcium diphosphate, calcium triphosphate, hydroxyapatite, Apatite, or tetracalcium phosphate (TTCP). The potassium salt may also be used in combination with the calcium phosphate salt. A mixture of potassium salt(s) and calcium phosphate salt(s) in the fire retardant composition 100 and/or 200 may have a weight ratio of the total amount of salt (potassium salt:calcium phosphate salt) from about 0%:100% to about 100%:0%, including about 5%:95%, 10%:90%, 15%:85%, 20%:80%, 25%:75%, 30%:70%, 35%:65%, 40%:60%, 45%:55%, 50%:50%, 55%:45%, 60%:40%, 65%:35%, 70%:30%, 75%:25%, 80%:20%, 85%:15%, 90%:10%, 95%:5%, and any range between any two such ratios.

The forest fire retardant composition 100 and/or 200 may further include a corrosion inhibitor. The corrosion inhibitor may include an inhibitor for brass, iron, aluminum, steel, copper, and/or magnesium. The corrosion inhibitor may also include an inhibitor for any of the compounds listed in Table 1. The corrosion inhibitor for magnesium may include any corrosion inhibitors disclosed in Lamaka, S. V., et al. "Comprehensive screening of Mg corrosion inhibitors." *Corrosion Science* 128 (2017), hereby incorporated by reference in its entirety. The corrosion inhibitor may include an alkyl (such as an alkyl amine) and/or one or more azoles. The corrosion inhibitor may include COBRATEC 928, Denatonium benzoate, benzoic acid, diammonium phosphate, monoammonium phosphate, Wintrol SB 25Na, or a combination of the above. The corrosion inhibitor may include one or more azoles. The corrosion inhibitor may be a Wintrol® Super Azole Mix (Wintrol® SAM-H90 from Wincom, Inc). The Wintrol® SAM-H90 is designed for aqueous application. Wintrol® SAM-H90 provides corrosion resistance in highly corrosive environments caused by halogens, such chloride. Optionally, Wintrol® SAM-H38Na may be used as the corrosion inhibitor, alone or in combination with Wintrol® SAM-H90. The corrosion inhibitor may include but is not limited to, sodium selenite, sodium stearate, sodium lauryl sulfate, stearic acid, sodium benzoate, sodium fluoride, sodium phosphate, monosodium phosphate (MSP), disodium phosphate (DSP), disodium phosphate hydrate(s) ($Na_2HPO_4(H_2O)_x$, where x is about 1 to about 12), trisodium phosphate (TSP), monopotassium phosphate (MKP), dipotassium phosphate (DKP), dipotassium phosphate hydrate(s) ($K_2HPO_4(H_2O)_x$, where x is about 3 to about 6), tripotassium phosphate, tripotassium phosphate hydrate(s) ($K_3PO_4(H_2O)_x$, where x is about 3 to about 9), monoammonium phosphate (MAP), diammonium phosphate (DAP), triammonium phosphate, triammonium phosphate hydrate(s), iron pyrophosphate, sodium fumarate dibasic, sodium fumarate, magnesium phosphate, benzotriazole derivatives, sodium salts of benzotriazole and derivatives, aqueous mixtures of benzotriazole and derivatives, benzotriazole-5-carboxcylic acid, benzotriazole, butyl benzotriazole, sodium butyl benzotriazole, tolytriazole derivatives, sodium salts of tolytriazole and derivatives, aqueous mixtures of tolytriazole and derivatives, tetrathydro tolytriazole, tolytriazole, hydrogenated tolyltriazole and mixtures thereof, sodium tolytriazole, sodium tolytriazole (50% solution), 3-hydroxyphenyl-4-phenyl-5-mercapto-1,2,4-triazole (HPMT), 3-aminophenyl-4-phenyl-5-mercapto-1,2,4-triazole (APMT), 3,4-diphenyl-5-mercapto-1,2,4-triazole (DPMT), 3-cinnamyl-4-phenyl-5-mercapto-1,2,4-triazole (CPMT), 1,8-napthalaldehydic acid, octadecylphosphonic acid, sodium dodecyl sulfonate (SDBS), Wintrol® BBT-25Na, Wintrol® BBT, Wintrol® THT-T, Wintrol® THT-35PG, Wintrol® THT-50K, Wintrol® SAM-H90, Wintrol SB 25Na, Wintrol® SAM-H38Na, Wintrol® SAM-H40(OS), Wintrol® SAM-B90, berberine, pyrrolidine benzylic, catechin, lysergic acid, carmine, fast green, aniline, vanillin, triethanolamine, low freeze grade triethanolamine (85% TEA and 15% water), N,N,N',N'-Tetrakis(2-hydroxyethyl) ethylenediamine, tris(hydroxymethyl)aminomethane (TRIS), Tris(hydroxymethyl)aminomethane hydrochloride (TRIS-HCl), p-chloroaniline, p-nitroaniline, p-methoxyaniline, p-methylaniline, p-cumate Na, sodium silicate, sodium molybdate, sodium molybdate dihydrate, disodium molbdate, disodium molybdate dihydrate, a biopolymer (such as rhamsan gum, xanthan gum, diutan gum, or welan gum), sodium silicofluoride (SSF), and dimercaptothiadiazole (DMTD), or a combination of the above.

The weight percent of the corrosion inhibitor, relative to the amount of the retardant compound in the composition 100, is about 0.025% to about 30.0%, for example about 0.05% to about 25.0%, or about 0.075% to about 20.0%, preferably about 0.1% to about 15.0%. For example, the weight percent of the corrosion inhibitor, relative to the amount of the retardant compound in the composition 100, is about 0.2% to about 12.0%.

The weight percent of the corrosion inhibitor, relative to the amount of the retardant compound in the composition 200, is about 0.025% to about 30.0%, for example about 0.05% to about 25.0%, or about 0.075% to about 20.0%, preferably about 0.1% to about 15.0%. For example, the weight percent of the corrosion inhibitor, relative to the amount of the retardant compound in the composition 200, is about 0.2% to about 12.0%.

To control the viscosity of the composition 100 and/or 200, the composition 100 and/or 200 may also include at least one thickening agent. The thickening agent may be a polyurethane, a polyvinyl alcohol, an acrylic polymer, a gum, a cellulosic, a sulfonate, a saccharide, a clay, an organosilicone, or a protein, including but not limited to latex, styrene, butadiene, polyvinyl alcohol, attapulgite, bentonite, montmorillonite, algin, collagen, casein, albumin, castor oil, cornstarch, arrowroot, yuca starch, carrageenan, pullulan, konjac, alginate, gelatin, agar, pectin, carrageenan, chitosan, xanthan gum, food grade xanthan gum, guar gum, rhamsan gum, diutan gum, welan gum, cellulose gum, acacia guar gum, locust bean gum, acacia gum, gum tragacanth, glucomannan polysaccharide gum, alginic acid, sodium alginate, potassium alginate, ammonium alginate, calcium alginate, carboxymethyl cellulose (CMC), methyl cellulose, hydroxyethyl cellulose (HEC), hydroxymethyl cellulose (HMC), hydroxypropyl methylcellulose (HPMC), ethylhydroxymethyl cellulose, hypromellose (INN), cetyl alcohol, cetearyl alcohol, polyethylene glycol (PEG), monoethylene glycol, acrylic microgel, acrylic amide wax, a crystalline silica clay (i.e., Opigel-WX from BYK), or a sepiolite clay (i.e., Pangel S9 from Tolsa group). A combination of thickeners may provide a similar viscosity profile of the composition 100 and/or 200 with a varying weight percent of the thickening agent(s). For example, two or more of the above viscosity modifiers may be combined to provide a low viscosity (e.g., 150-400 cP), or a medium viscosity (e.g., 401-800 cP), or a high viscosity (e.g., 801-1500 cP).

The weight percent of the thickening agent(s), relative to the amount of the retardant compound in the composition 100, is about 0.2% to about 30.0%, preferably about 0.4% to about 25.0%, preferably about 0.6% to about 20.0%, more preferably about 0.8% to about 18.0%, and specifically about 1.0% to about 15.0%. For example, the weight percent of the thickening agent(s), relative to the amount of the retardant compound in the composition 100, is about 1.2% to about 12.0%.

The weight percent of the thickening agent(s), relative to the amount of the retardant compound in the composition 200, is about 0.2% to about 30.0%, preferably about 0.4% to about 25.0%, preferably about 0.6% to about 20.0%, more preferably about 0.8% to about 18.0%, and specifically about 1.0% to about 15.0%. For example, the weight percent of the thickening agent(s), relative to the amount of the retardant compound in the composition 200, is about 1.2% to about 12.0%.

To control the pH of the composition 100 and/or 200, the composition 100 and/or 200 may also include buffering agents such as organic amines including but not limited to triethanolamine ($C_6H_{15}NO_3$), low freeze grade triethanolamine (85% TEA and 15% water), diethanolamine, monoethanolamine, tris(hydroxymethyl)aminomethane, N,N,N',N'-Tetrakis(2-hydroxyethyl)ethylenediamine, tris (hydroxymethyl)aminomethane (TRIS), Tris(hydroxymethyl)aminomethane hydrochloride (TRIS-HCl), ethylenediamine tetraacetic acid, ethylene diamine, piperidine, pyrrolidine, DABCO, N-methyl pyrrolidine, N-methylpyrrolidone, quinuclidine, diisoropryopylamine, diisopropylmethylamine, methyl piperidine, N-[tris(hydroxymethyl) methyl]glycine, 3-dimethylamino-1-propanol, or 3-(diethylamino)-1,2, propanediol. The buffering agent may include one or more of the phosphate, potassium, sodium, and/or ammonium salts disclosed in Table 1. For example, the buffering agent may include salts of potassium, sodium, ammonium, phosphate, or citric acid disclosed herein, including but not limited to, monosodium phosphate (MSP), disodium phosphate (DSP), disodium phosphate hydrate(s), trisodium phosphate (TSP), monopotassium phosphate (MKP), dipotassium phosphate (DKP), dipotassium phosphate hydrate(s), tripotassium phosphate, tripotassium phosphate hydrate(s), monoammonium phosphate (MAP), diammonium phosphate (DAP), triammonium phosphate, triammonium phosphate hydrate(s) ($(NH_4)_3PO_4(H_2O)_x$ where x is about 3), sodium ammonium phosphate (SAP), sodium ammonium phosphate hydrate (SAP-H), monopotassium citrate ($KH_2C_6H_5O_7$), potassium gluconate ($C_6H_{11}KO_7$), dipotassium citrate ($C_6H_6K_2O_7$), tripotassium citrate ($K_3C_6H_5O_7$), or tripotassium citrate monohydrate ($K_3C_6H_5O_7(H_2O)_l$). The buffering agent may also be a strong acid, a weak acid, a strong base, or a weak base.

The weight percent of the buffering agent(s), relative to the amount of the retardant compound in the composition 100, is about 0.1% to about 50.0%, preferably about 0.2% to about 45.0%, more preferably about 0.3% to about 40.0%, and specifically about 0.4% to about 35.0%. For example, the weight percent of the buffering agent(s), relative to the amount of the retardant compound in the composition 100, is about 0.5% to about 30.0%.

The weight percent of the buffering agent (s), relative to the amount of the retardant compound in the composition 200, is about 0.1% to about 50.0%, preferably about 0.2% to about 45.0%, more preferably about 0.3% to about 40.0%, and specifically about 0.4% to about 35.0%. For example, the weight percent of the buffering agent(s), relative to the amount of the retardant compound in the composition 200, is about 0.5% to about 30.0%.

The strong acid and/or weak acid may include but is not limited to monosodium phosphate (MSP), sodium bicarbonate, sodium bisulfate, monosodium dihydrogen orthophosphate, disodium hydrogen phosphate, potassium bisulfite, ammonium chloride, ammonium sulfate, sulfurous acid, sulfuric acid, hyposulfurous acid, persulfuric acid, pyrosulfuric acid, disulfurous acid, dithionous acid, tetrathionic acid, thiosulfurous acid, hydrosulfuric acid, peroxydisulfuric acid, perchloric acid, hydrochloric acid, hypochlorous acid, chlorous acid, chloric acid, hyponitrous acid, nitrous acid, nitric acid, pernitric acid, carbonous acid, carbonic acid, hypocarbonous acid, percarbonic acid, oxalic acid, acetic acid, pyrophosphoric acid, hydrophosphoric acid, hydrobromic acid, bromous acid, bromic acid, hypobromous acid, hypoiodous acid, iodous acid, iodic acid, periodic acid, hydroiodic acid, hydroselenic acid, selenic acid, selenous acid, hydronitric acid, boric acid, molybdic acid, perxenic acid, silicofluoric acid, telluric acid, tellurous acid, tungstic acid, xenic acid, citric acid, formic acid, pyroantimonic acid, antimonic acid, antimonous acid, silicic acid, titanic acid, arsenic acid, pertechnetic acid, hydroarsenic acid, tetraboric acid, metastannic acid, hypooxalous acid, silicous acid, uranic acid, diuranic acid, malonic acid, tartartic acid, glutamic acid, phthalic acid, azelaic acid, barbituric acid, benzilic acid, cinnamic acid, fumaric acid, glutaric acid, gluconic acid, hexanoic acid, lactic acid, malic acid, oleic acid, folic acid, propiolic acid, propionic acid, rosolic acid, stearic acid, tannic acid, trifluoroacetic acid, uric acid, ascorbic acid, gallic acid, acetylsalicylic acid, acetic acid, or an acidic organic amine.

The weight percent of the strong acid and/or weak acid, relative to the amount of the retardant compound in the composition 100, is about 0.5% to about 10.0%, preferably about 0.75% to about 8.5%, more preferably about 1.0% to about 8.0%, and specifically about 1.25% to about 7.5%. For example, the weight percent of the strong acid and/or weak acid, relative to the amount of the retardant compound in the composition 100, is about 1.5% to about 5.0%.

The weight percent of the strong acid and/or weak acid, relative to the amount of the retardant compound in the composition 200, is about 0.1% to about 10.0%, preferably about 0.2% to about 8.5%, more preferably about 0.3% to about 8.0%, and specifically about 0.4% to about 7.5%. For example, the weight percent of the strong acid and/or weak acid, relative to the amount of the retardant compound in the composition 200, is about 0.5% to about 5.0%.

The strong base and/or weak base may include but is not limited to disodium phosphate (DSP), diammonium phosphate (DAP), disodium phosphate hydrate, dipotassium phosphate, sodium tripolyphosphate, trisodium phosphate, sodium carbonate, sodium bicarbonate, potassium carbonate, potassium bicarbonate, ammonium carbonate, ammonium bicarbonate, calcium carbonate, sodium acetate, trisodium citrate, trisodium phosphate, tripotassium phosphate, diammonium citrate, sodium borate, sodium N-Cyclohexyl-2-aminoethanesulfonate, sodium 4-(2-hydroxyethyl)-1-piperazineethanesulfonate, sodium N-(2-Acetamido)-2-aminoethanesulfonate, sodium N-cyclohexyl-3-aminopropanesulfonate, sodium 3-(N-morpholino) propanesulfonate, sodium 3-[4-(2-Hydroxyethyl)piperazin-1-yl]propane-1-sulfonate, sodium sulfide, zinc chloride hydroxide, magnesium oxychloride, aluminum hydroxide, bismuth oxychloride, beryllium hydroxide, boron hydroxide, calcium hydroxide, cesium hydroxide, cobalt(III) hydroxide, copper(II) hydroxide, gallium(III) hydroxide, gold(III) hydroxide, indium(II) hydroxide, iridium(III) hydroxide, iron(III) hydroxide, lithium hydroxide, molybdenum hydroxide, nickel oxo-hydroxide, nickel(III) hydroxide, osmium(IV) hydroxide, silver hydroxide, strontium hydroxide, technetium(II) hydroxide, thorium hydroxide, tin(IV) hydroxide, titanium(III) hydroxide, tungsten(II) hydroxide, yttrium hydroxide, zirconium hydroxide, ammonium hydroxide, barium hydroxide, bismuth(III) hydroxide, cerium(III) hydroxide, chromium(II) hydroxide, cobalt(II) hydroxide, copper(I) hydroxide, gallium(II) hydroxide, gold (I) hydroxide, indium(I) hydroxide, indium(III) hydroxide, iron(II) hydroxide, lanthanum hydroxide, magnesium hydroxide, neodymium hydroxide, nickel(II) hydroxide, niobium hydroxide, palladium(II) hydroxide, potassium hydroxide, sodium hydroxide, tantalum(V) hydroxide, tetramethylammonium hydroxide, thallium(III) hydroxide, tin(II) hydroxide, titanium(II) hydroxide, titanium(IV) hydroxide, uranyl hydroxide, vanadium(III) hydroxide, ytterbium hydroxide, zinc hydroxide, or a basic organic amine.

The weight percent of the strong base and/or weak base, relative to the amount of the retardant compound in the composition 100, is about 0.5% to about 10.0%, preferably about 0.75% to about 8.5%, more preferably about 1.0% to about 8.0%, and specifically about 1.25% to about 7.5%. For example, the weight percent of the strong base and/or weak base, relative to the amount of the retardant compound in the composition 100, is about 1.5% to about 5.0%.

The weight percent of the strong base and/or weak base, relative to the amount of the retardant compound in the composition 200, is about 0.1% to about 10.0%, preferably about 0.2% to about 8.5%, more preferably about 0.3% to about 8.0%, and specifically about 0.4% to about 7.5%. For example, the weight percent of the strong base and/or weak base, relative to the amount of the retardant compound in the composition 200, is about 0.5% to about 5.0%.

In one embodiment, the forest fire retardant composition 100 and/or 200 has a pH of about 4.0 to about 10.0, preferably about 4.5 to about 9.8, more preferably about 5.0 to about 9.5, and more preferably about 5.5 to about 9.0. For example, the pH of the forest fire retardant composition 100 and/or 200 may be about 5.5, about 5.6, about 5.7, about 5.8, about 5.9, about 6.0, about 6.1, about 6.2, about 6.3, about 6.4, about 6.5, about 6.6, about 6.7, about 6.8, about 6.9, about 7.0, about 7.1, about 7.2, about 7.3, about 7.4, about 7.5, about 7.6, about 7.7, about 7.8, about 7.9, about 8.0, about 8.1, about 8.2, about 8.3, about 8.4, about 8.5, about 8.6, about 8.7, about 8.8, about 8.9, about 9.0, or any value in between 5.5 and 9.0.

The composition 100 and/or 200 may also include surfactant components including but not limited to a sodium dodecyl sulfate (SDS), sodium lauryl sulfate (SLS), sodium 4-dodecylbenzenesulfonate (SDBS), modified silicones and emulsions thereof such as, a food grade foam control agent from Ivanhoe Industries Inc. including but not limited to a hydrophobic dispersion in oil (e.g., XFO-880, XFO-884, XFO-893, XFO-270, XFO-280, XFO-399, XFO-501AV, XFO-515B, XFO-809), a 10% active silicone emulsion (e.g., XFO-10S, XFO-220), a 30% active silicone emulsion (e.g., XFO-30S, XFO-225), a 100% active silicone compound (e.g., XFO-100S), a non-ionic surfactant (e.g., XFO-313, I-FLO 3K, I-FLO 6K), a non-ionic surfactant in oil (e.g., XFO-FG2), or a polyol blend (e.g., XFO-635D, XFO-645D, XFO-FD92), a food-grade, silicone emulsion from Dow Chemical (e.g., XIAMETER ACP-1920, XIAMETER AFE-1510, XIAMETER AFE-0010, XIAMETER AFE-1520, XIAMETER AFE-1530, XIAMETER AFE-0300, XIAMETER AFE-0100, XIAMETER ACP-1500), a food-grade, non-silicone defoamer, poloxamers, polyoxyethylene block copolymer surfactant (e.g., Pluronic® L101), fatty alcohols, zwitterionic surfactants, polyglycerol esters, sorbitan esters, lecithins, alkylammonium salts, alkyl phenol ethoxylates, or a combination of the above to reduce surface tension and increase the spreading and wetting properties of the forest fire retardant composition 100 and/or 200.

The weight percent of the surfactant, relative to the amount of the retardant compound in the composition 100, is about 0.05% to about 5.0%, preferably about 0.1% to about 4.5%, more preferably about 0.2% to about 4.0%, and specifically about 0.3% to about 3.5%. For example, the weight percent of the surfactant, relative to the amount of the retardant compound in the composition 100, is about 0.4% to about 3.0%.

The weight percent of the surfactant, relative to the amount of the retardant compound in the composition 200, is about 0.05% to about 5.0%, preferably about 0.1% to about 4.5%, more preferably about 0.2% to about 4.0%, and specifically about 0.3% to about 3.5%. For example, the weight percent of the surfactant, relative to the amount of the retardant compound in the composition 200, is about 0.4% to about 3.0%.

The composition 100 and/or 200 may also include adjuvants including but not limited to triethanolamine, propylene glycol, propylene carbonate, RJ-7033, RJ-7077, Silwet HS-312, Silwet HS-604, Silwet 625, Silwet 641, Silwet PD, XFO-10S FG Silicone, XFO-305 FG, KFO 200, poloxamers (i.e. nonionic triblock copolymers composed of a central hydrophobic chain of polyoxypropylene (poly(propylene oxide)) flanked by two hydrophilic chains of polyoxyethylene (poly(ethylene oxide))), P104, PE 3100, PE6800, polyethylene glycol, or polypropylene glycol, or a combination of the above.

The weight percent of the adjuvant, relative to the amount of the retardant compound in the composition 100, is about 0.05% to about 5.0%, preferably about 0.1% to about 4.5%, more preferably about 0.2% to about 4.0%, and specifically about 0.3% to about 3.5%. For example, the weight percent of the adjuvant, relative to the amount of the retardant compound in the composition 100, is about 0.4% to about 3.0%.

The weight percent of the adjuvant, relative to the amount of the retardant compound in the composition 200, is about 0.05% to about 5.0%, preferably about 0.1% to about 4.5%, more preferably about 0.2% to about 4.0%, and specifically about 0.3% to about 3.5%. For example, the weight percent of the adjuvant, relative to the amount of the retardant compound in the composition 200, is about 0.4% to about 3.0%.

The composition 100 and/or 200 may be uncolored (i.e., clear, natural colored, or free of colorants), or it may be colored using a colorant. The colorant may be a fugitive colorant, a non-fugitive colorant, or a combination of the two. The composition 100 and/or 200 has a first hue which is a color, i.e., either colorless or a color which blends with the normal vegetation and/or ground in the drop zone. This first hue may be grey or white or a combination of the two. The colorant initially colors the composition 100 and/or 200 to a second hue which contrasts with the hue of the ground vegetation. The colorant may be a fugitive component such as a dye or a dye which is dispersed in a matrix (i.e., a pigment), which fades over time and under ambient field conditions to a colorless or less highly colored hue. The colorant may be a mixture of an organic pigment (e.g., a fluorescent pigment) and inorganic pigment (e.g., iron oxide, titania, and/or titanium dioxide). Preferably the colorant is one that is compatible with the fire retardant salts described herein. The fugitive colorant may fade over time with exposure to sunlight. The fugitive colorant may also be a fast fade fugitive colorant that is designed to last a few hours to a few weeks, for example.

Several fugitive component dyes and pigments can be used as a colorant. The colorant may be a dye(s) and/or a pigment(s). For example, many water-soluble dyes fade rapidly and there are so-called fluorescent pigments (fluorescent dyes encapsulated in a resin integument or dispersed in a thermoplastic as an emulsion) which are suspended in forest fire retardant compositions and which also fade rapidly to provide a fugitive effect. The colorant may be an agricultural, pesticide, or food-grade dye or combinations of such dyes that are red, pink, claret, and/or cerise. Examples of fugitive dyes and pigments include, but are not limited to, C.I. Basic Red I dye, 6BL dye, Basic Violet II dye, C.I. Basic Violet 11:1 (tetrachlorozincate), C.I. Basic Red 1:1, Basic Yellow 40, acid fuchsin, basic fuchsin, new fuchsin, acid red 1, acid red 4, acid red 8, acid red 18, acid red 27, acid red 37, acid red 88, acid red 97, acid red 114, acid red 151, acid red 183, acid red 183, fast red violet 1B base, solvent red, Rhodamine B, Rhodamine 6G, Rhodamine 123, Rhodamine 110 chloride, erythrosine B, Basacryl red, Phloxine B, rose Bengal, direct red 80, direct red 80, Sudan red 7B, Congo red, neutral red, Fluorescent Red Mega 480, Fluorescent red 610, Fluorescent red 630, Fluorescent Red Mega 520, Pylaklor Red S-361, Pylaklor Scarlet LX-6364A Pylam Bright Red LX-1895 Pylam Coral LX-1801, FD&C Red #3, FD&C Red #4, FD&C Red #40, FD&C Red #4 Lake, D&C Red #33, D&C Red #33 Lake, and encapsulated-dye pigments which are available commercially, e.g., the "AX" series pigments, supplied by Day-Glo Color Corp., Cleveland, Ohio. The dye may be Liquitint 564 ($\lambda$=564 nm) or Liquitint Agro Pink 564 ($\lambda$=564 nm) from Milliken & Company (Spartanburg, SC). The colorant may also be an organic pigment such as a fluorescent pigment. The fluorescent pigment may be Day-Glo Aurora pink or another pink, red, orange, or crimson (or a combination of the four) fluorescent pigment dispersion. The fluorescent pigment may be UV sensitive and/or be substantially free of formaldehyde and/or have a Lab color spacing of "L" in a range from about 34 to about 89, "a" in a range from about 18 to about 83, and "b" in a range from about −61 to about 56, based on the International Commission of Illumination LAB color space model.

The colorant may be a colorant from Greenville Colorants (New Brunswick, NJ) or Milliken & Company (Spartanburg, SC). For example, the colorant is a colorant that is compatible for use with the fire retardant salts described herein, such as colorants used in magnesium chloride dust-control and road-stabilization formulations, or in magnesium chloride de-icing formulations. The colorant may be Elcomine Scarlet NAS, Elcomine Scarlaet NAS EX, or Iron Oxide GC-110P from Greenville Colorants. The colorant may be a combination of Liquitint 564 and Iron Oxide GC-110P.

The colorant of the composition 100 and/or 200 may be a dye or include encapsulated-dye fugitive pigments without ultraviolet absorbers. Compared to water soluble dyes, encapsulated-dye pigments are less likely to permanently stain the normal vegetation and/or ground in the drop zone. The fugitive component is present in an amount which provides a color (second hues) to the forest fire retardant composition 100 and/or 200 which is contrasts with the color of the vegetation and/or ground in the drop zone (normally green, blue-green and/or brown). Advantageously, the second hue is red, orange or pink. The color of the dye may be red, orange, purple, or pink or any combination of the four. Preferably, the dye is one that is compatible with the fire retardant salts described herein. Alternatively, the composition 100 and/or 200 may be colorless if no colorant is added.

The colorant may also include a non-fugitive component, i.e., a component which is insoluble in the carrier liquid and which, if colored, does not necessarily fade after aerial application of the forest fire retardant composition 100 and/or 200. The non-fugitive component of the colorant is present in an amount sufficient to improve the aerial visibility of the composition when it is first applied to the vegetation. However, the non-fugitive component is present in less than an amount which prevents the composition from thereafter fading a neutral color. The colorant may be a combination of the fugitive and non-fugitive components. The non-fugitive component in the forest fire retardant composition 100 and/or 200 may be iron oxide ($Fe_2O_3$ and/or $Fe_3O_4$). The iron oxide may be present in combination with the fugitive colorant described above and titanium dioxide or it may be present alone. The weight of the non-fugitive colorant may contain a minimum of at least 12 grams of the non-fugitive colorant in accordance with Specification 5100-304d (Jan. 7, 2020), which is hereby incorporated by reference in its entirety.

The weight percent of colorant (e.g., fluorescent pigment), relative to the amount of the retardant compound in the composition 100, is about 0.1% to about 15.0%, preferably about 0.2% to about 12.0%, more preferably about 0.3% to about 10.0%, and more specifically about 0.4% to about 8.0%. For example, the weight percent of colorant, relative to the amount of the retardant compound in the composition 100, is about 0.5% to about 5.0%.

The weight percent of colorant (e.g., fluorescent pigment), relative to the amount of the retardant compound in the composition 200, is about 0.1% to about 15.0%, preferably about 0.2% to about 12.0%, more preferably about 0.3% to about 10.0%, and more specifically about 0.4% to about 8.0%. For example, the weight percent of colorant, relative to the amount of the retardant compound in the composition 200, is about 0.5% to about 5.0%.

The composition 100 and/or 200 may also include an inorganic pigment. The inorganic pigment may act as a colorant. The inorganic pigment may include but is not limited to Iron Oxide, titanium dioxide, magnesium hydroxide, cobalt blue, cerulean blue, malachite, earth green, raw umber, raw sienna, iron black, or burnt sienna. The Iron Oxide may act as an opacifier. The titanium dioxide may act as a pigment, for example, to provide a white pigment. The titanium dioxide may also act as a photo-responsive material to create opacity by scattering light or by protecting the components of the forest fire retardant composition 100 and/or 200 from UV degradation.

The weight percent of inorganic pigment, relative to the amount of the retardant compound in the composition 100, is about 0.02% to about 4.0%, preferably about 0.04% to about 3.5%, more preferably about 0.06% to about 3.0%, and more specifically about 0.08% to about 2.5%. For example, the weight percent of inorganic pigment, relative to the amount of the retardant compound in the composition 100, is about 0.1% to about 2.0%.

The weight percent of inorganic pigment, relative to the amount of the retardant compound in the composition 200, is about 0.02% to about 4.0%, preferably about 0.04% to about 3.5%, more preferably about 0.06% to about 3.0%, and more specifically about 0.08% to about 2.5%. For example, the weight percent of inorganic pigment, relative to the amount of the retardant compound in the composition 200, is about 0.1% to about 2.0%.

The weight percent of total colorant, relative to the amount of the retardant compound in the composition 100, is about 0.1% to about 30.0%, preferably about 0.2% to about 28.0%, more preferably about 0.3% to about 25.0%, and more specifically about 0.4% to about 20.0%. For example, the weight percent of total colorant, relative to the amount of the retardant compound in the composition 100, is about 0.5% to about 18.0%.

The weight percent of total colorant, relative to the amount of the retardant compound in the composition 200, is about 0.1% to about 30.0%, preferably about 0.2% to about 28.0%, more preferably about 0.3% to about 25%, and more specifically about 0.4% to about 20.0%. For example, the weight percent of total colorant, relative to the amount of the retardant compound in the composition 200, is about 0.5% to about 18.0%.

The composition 100 and/or 200 may also include a glow-in-the-dark additive. The glow-in-the-dark additive improves the visibility of the fire retardant composition during periods of darkness. Nighttime visibility of the composition is improved, for example, to the naked human eye and/or using imaging equipment such as goggles. The glow-in-the-dark additive may include one or more of a fluorescent or phosphorescent material. The glow-in-the-dark additive can include one or more phosphorescent additives that imparts photoluminescence properties to the forest fire retardant composition 100 and/or 200. The phosphorescent additive may exhibit fluorescence and/or phosphorescence. The phosphorescent additive may be charged with sunlight or artificial lighting, such as UV radiation or Fluorescent lighting. The phosphorescent additive may emit light in the visible light region or in the ultraviolet region. Alternatively, the phosphorescent additive may emit light in the near infrared region and be visualized using infrared goggles. Examples of the phosphorescent additive include LumiNova, LumiNova Green (G), LumiNova G PS-2, LumiNova Blue Green (BG), a zinc sulfide pigment, doped zinc oxide, doped calcium sulfide, strontium aluminate, or mixtures thereof. The amount of the glow-in-the-dark additive, relative to the amount of composition 100 and/or 200 is about 100 g/1000 L to about 1000 g/1000 L, preferably about 200 g/1000 L to about 800 g/1000 L, and more preferably about 300 g/1000 L to about 700 g/1000 L. For example, the amount of the glow-in-the-dark additive, relative to the amount of composition 100 and/or 200 is about 350 g/1000 L to about 550 g/1000 L.

The glow-in the-dark additive may also include one or more fluorophores. The fluorophore(s) may exhibit fluorescence and/or phosphorescence. The fluorophore(s) may be visible in the near infrared region (i.e., 700 nm-1700 nm wavelength of light). Visualization can be achieved using near infrared goggles. Examples of fluorophores include CH1055 (4,8-Bis(2-(4-(bis(4-(2-carboxyethyl)phenyl) amino)phenyl)-5H-[1,2,5]thiadiazolo[3,4-f]benzo[c][1,2,5] thiadiazole), as well as Cy7 or Cy7.5, or mixtures thereof. Glow-in-the-dark additives that exhibit fluorescence include fluorescent pigments described above.

The composition 100 and/or 200 may optionally include other ingredients, such as spoilage inhibitors, anti-caking agents, flow conditioners, anti-foaming agents, foaming agents, stability additives, biocide, thickening agents, surfactants, adjuvants, corrosion inhibitors other than those of the corrosion inhibiting system, opacifiers, additional coloring agents, liquid carrier, dedusters, and water. The deduster may include an oil, for example mineral oil. The weight percent of mineral oil, relative to the amount of the retardant compound in the composition 100 and/or 200, is about 0.1% to about 2.5%, preferably about 0.2% to about 2.25%, more preferably about 0.3% to about 2.0%, and more specifically about 0.4% to about 1.75%. For example, the weight percent of mineral oil, relative to the amount of the retardant compound in the composition 100 and/or 200, is about 0.5% to about 1.5%.

Formation of the Dry Concentrate 101

The dry components of the forest fire retardant composition 100 are batch mixed in a tumbler to form a dry concentrate 101. Alternatively, the dry components may be continuously mixed. In one embodiment the organic amine (e.g., triethanolamine), corrosion inhibitor, and water may be added as a pack to the dry concentrate 101. The pack may include water to assist with mixing the components of the dry concentrate. In another embodiment the pack may also include the colorant. In another embodiment the salt(s) may be mixed with water and then dehydrated before being added to the dry concentrate 101. The resulting dehydrated salt mixture may include a mixture of sodium ammonium hydrates including sodium ammonium tetrahydrate, for example. The dry concentrate 101 is then stored, substantially in the absence of air and/or external moisture, in a sealed bag having a plastic liner and/or moisture barrier. For example, each sealed bag can contain about 2,000 pounds of the dry concentrate 101 during storage and shipment to the point of use (e.g., airfield). Alternatively, the dry concentrate 101 may be stored in lined one-ton tote sacks or super sacks. Air-sealed bags with a plastic liner supplied by Semi-Bulk Systems Inc. (St. Louis, MO) can be used. Alternatively, an air-permeable moisture barrier can be used, such as a barrier made of a silicone material. The dry concentrate 101 is substantially free of water. The dry concentrate 101 is chemically stable under normal temperatures and pressures. The dry concentrate 101 should be protected from exposure to humidity and moisture on moisture-proof air pallets or under a water-resistant tarp during storage. The dry concentrate 101 may be supplied as part of a kit that includes a sealed container substantially in the absence of air and/or external moisture (e.g., air-sealed bag, air-permeable moisture sealed bag, tote sack, super sack) and instructions for using the dry concentrate 101 to form the final diluted product 103 (described below). In the case where the final diluted product 103 is to be applied on a localized scale by homeowners or local officials, for example, the kit may contain a tank for mixing and applying the final diluted product 103 (e.g., a 1-2 gallon hand-held or 4 gallon backpack or 5 gallon cart-style container with an applicator wand and/or hose, or a 15-25 gallon tank capable of being mounted on or pulled behind an all-terrain vehicle or truck), and instructions for using the dry concentrate 101 to form and apply the final diluted product 103.

Forming the Intermediate Liquid Concentrate 102

The liquid concentrate 102 may be formed by the addition of water or other solvent to the dry concentrate 101. The water may be tap water or water from other convenient water sources. Alternatively, the liquid concentrate 102 may be formed upon absorption of moisture by the dry concentrate 101 if the dry concentrate 101 is deliquescent.

The dry concentrate 101 is first mixed to disperse the thickening agent(s) in the dry blend before any liquid additions. The dry concentrate 101 is agitated to prevent clumping of the dry components when batch mixed with water or other solvent to form the liquid concentrate 102. Alternatively, the liquid concentrate 102 may be prepared using continuous mixing equipment. Alternatively, the water or other solvent may be added by spraying onto a ribbon of well-mixed dry ingredients. For example, the water or other solvent could be sprayed onto the dry components while traveling across a conveyor belt. Once mixed, the liquid concentrate 102 is then stored, substantially in the absence of air, in a sealed container. For example, the sealed container for storage and shipment to the point of use (e.g., airfield) may be a 1,000 L tote, a 5-gallon pail or a 55-gallon drum. The liquid concentrate 102 is chemically stable under normal temperatures and pressures.

The liquid concentrate 102 may be supplied as part of a kit that includes a sealed container for storage and shipment substantially in the absence of air and/or external moisture (e.g., 1,000 L tote, a 5-gallon pail or a 55-gallon drum) and instructions for using the liquid concentrate 102 to form the final diluted product 103 (described below). In the case where the final diluted product 103 is to be applied on a localized scale by homeowners or local officials, for example, the kit may contain a tank for mixing and applying the final diluted product 103 (e.g., a 1-2 gallon hand-held or 4 gallon backpack or 5 gallon cart-style container with an applicator wand and/or hose, or a 15-25 gallon tank capable of being mounted on or pulled behind an all-terrain vehicle or truck), and instructions for using the liquid concentrate 102 to form and apply the final diluted product 103.

Forming the Final Diluted Product 103

The final diluted product 103 is formed either directly from the dry concentrate 101 by mixing the dry concentrate 101 with water or by mixing the liquid concentrate 102 with water. The dry concentrate 101 or the liquid concentrate 102 is shipped to the point of use (e.g., airfield), where it is diluted with water or other solvent to form the final diluted product 103. The dry concentrate 101 is added slowly into room temperature (or cooler) water with stirring. The water may be tap water or water from other convenient water sources. The product is mixed using the current mixing equipment available to the USFS.

The reaction exhibits a low exotherm and a good mix ratio. The product is stirred for about 2-30 minutes depending on the mixing technology and the scale. The final diluted product 103 can also be prepared on a commercial batch scale by combining the dry concentrate 101 with a measured amount of water in an appropriate mix vessel such as an agitated mix tank. Alternatively, the final diluted product 103 may be prepared on a commercial batch scale using continuous mixing equipment. The rate of addition of solid concentrate to water should be controlled to assure efficient mixing of the concentrate and the water. Alternately, a continuous process may be conducted by introducing the dry concentrate 101 into a water stream via a vacuum eductor system. Downstream mixing should be accomplished to avoid product settling in the receiving tank, or the receiving tank itself should be vigorously circulated to facilitate solution and adequate hydration of the dry concentrate 101.

The final diluted composition 103 can also be batch mixed by feeding the dry concentrate 101 into a well-circulated mix-batch tank. Alternatively, the final diluted composition 103 may be mixed using continuous mixing equipment. Mix tank agitation may be provided via an overhead mechanical stirring apparatus or alternatively by a circulation pump sized to provide turbulent mixing. Alternatively, a venturi-type vacuum eductor mixer or an in-line high-shear mixer can be used. For batch mixing, the mix water is agitated or circulated to provide efficient mixing, then a one-ton sack of dry concentrate 101 is added slowly, typically by suspending the sack over the mix tank (via a fork lift or by other manner), and opening the discharge spout on the sack to allow product to flow out of the sack into the mix solution. The addition rate should be controlled to avoid settling of the solid concentrate in the mix tank. The final diluted product 103 is in a form suitable to fight forest fires via aerial- or ground-based application.

The dry concentrate 101 may be diluted with water so that the final diluted product 103 has a retardant compound (e.g. salt) weight percent of about 2% to about 70%, preferably about 5% to about 40%, more preferably about 7% to about 30%. For example, the concentration of retardant compound (e.g., salt) in final diluted product 103 is about 8% to about 25%.

The liquid concentrate 102 may be diluted with water so that the final diluted product 103 has a retardant compound (e.g. salt) weight percent of about 2% to about 70%, preferably about 5% to about 40%, more preferably about 7% to about 30%. For example, the concentration of retardant compound (e.g., salt) in final diluted product 103 is about 8% to about 25%.

The final diluted product 103 is a long-term forest fire retardant with improved aerial visibility for either a direct or indirect attack. The resulting final diluted product 103 is an opaque reddish and/or pinkish and/or orangish suspension that resists settling. The final diluted product 103 should be mixed approximately every 7-10 days to ensure uniform density. The viscosity of the final diluted product 103 can be adjusted to accommodate a variety of aircrafts by adjusting the amounts of thickening agent(s) added to the mixture. The final diluted product 103 may be a low, medium, or high viscosity long term retardant. The viscosity may be in the range of 150-400 cP, 401 cP to 800 cP, or >801 cP, for a low, medium, or high viscosity long term retardant, respectively. The final diluted product 103 may alternatively be a high viscosity long term retardant through the addition of more thickening agent. Alternatively, the final diluted product 103 may be a low viscosity long term retardant through the use of less thickening agent. Once blended with water, the final diluted product 103 is a homogeneous, stable fluid that requires only infrequent stirring. The final diluted product 103 is hydrated into a stable mixture in 20 minutes, without the use of special equipment.

Forming the Liquid Concentrate 201

The components of the forest fire retardant composition 200 are batch mixed to form a liquid concentrate 201. Alternatively, the forest fire retardant composition 200 may be mixed using continuous mixing equipment. The mixing should be controlled to ensure that all of the dry components are adequately dispersed to ensure that the formulation is maintained. The water in the liquid concentrate 201 may be tap water or water from other convenient water sources. The liquid concentrate 201 is chemically stable under normal temperatures and pressures. Once mixed, the liquid concentrate 201 is then stored, substantially in the absence of air and/or external moisture, in a sealed container. The liquid concentrate 201 should be protected from exposure to humidity and moisture. For example, the sealed container for storage and shipment to the point of use (e.g., airfield) may be a 1,000 L tote, a 5-gallon pail or a 55-gallon drum. The liquid concentrate 201 is chemically stable under normal temperatures and pressures.

The liquid concentrate 201 may be supplied as part of a kit that includes a sealed container for storage and shipment, substantially in the absence of air and/or external moisture, (e.g., 1,000 L tote, a 5-gallon pail or a 55-gallon drum) and instructions for using the liquid concentrate 201 to form the final diluted product 202 (described below). Air-sealed bags with a plastic liner supplied by Semi-Bulk Systems Inc. (St. Louis, MO) can be used. Alternatively, an air-permeable moisture barrier can be used, such as a barrier made of a silicone material. In the case where the final diluted product 202 is to be applied on a localized scale by homeowners or local officials, for example, the kit may contain a tank for mixing and applying the final diluted product 202 (e.g., a 1-2 gallon hand-held or 4 gallon backpack or 5 gallon cart-style container with an applicator wand and/or hose, or a 15-25 gallon tank capable of being mounted on or pulled behind an all-terrain vehicle or truck), and instructions for using the liquid concentrate 201 to form and apply the final diluted product 202.

Forming the Final Diluted Product 202

The final diluted product 202 is formed by mixing the liquid concentrate 201 with water. The liquid concentrate 201 is shipped to the point of use (e.g., airfield), where it is diluted with water or other solvent to form the final diluted product 202. The water may be tap water or water from other convenient water sources. The product is mixed using the current mixing equipment available to the USFS. The liquid concentrate 201 is very miscible in water and special mixing precautions are not necessary other than to limit splash escaping the mixing vessel. The tank contents should be circulated via a centrifugal pump or another stirring means to ensure uniform mixing.

The reaction has a low exotherm and a good mix ratio. The product is stirred for about 20-30 minutes before being allowed to stand to develop a stable viscosity and ensure a uniform mixture. The final diluted product 202 can also be prepared on a commercial batch scale by combining the liquid concentrate 201 with a measured amount of water in an appropriate mix vessel such as an agitated mix tank. Alternatively, the final diluted composition 202 may be prepared on a commercial batch scale using continuous mixing equipment. The rate of addition of liquid concentrate to water should be controlled to assure efficient mixing of the concentrate and the water. The final diluted product 202 forms a stable suspension and should be stirred after standing to eliminate any settling of the components.

The final diluted composition 202 can also be batch mixed by feeding the liquid concentrate 201 into a well-circulated mix-batch tank. Alternatively, the final diluted composition 202 may be mixed using continuous mixing equipment. Mix tank agitation may be provided via an overhead mechanical stirring apparatus or alternatively by a circulation pump sized to provide turbulent mixing. Alternatively, a venturi-type vacuum eductor mixer or an in-line high-shear mixer can be used. The final diluted product 202 is in a form suitable to fight forest fires via aerial- or ground-based application.

In the final diluted product 202, the weight percent of retardant compound (e.g., salt) is about 2% to about 70%, preferably about 5% to about 40%, more preferably about 7% to about 30%. For example, the concentration of retardant compound (e.g., salt) in final diluted product 202 is about 8% to about 15%, and specifically about 9.5%±2%.

The final diluted product 202 is a long-term forest fire retardant with improved aerial visibility for either a direct or indirect attack. The resulting final diluted product 202 is an opaque pink or red-purple suspension that resists settling. The final diluted product 202 should be mixed approximately every 7-10 days to ensure uniform density. The viscosity of the final diluted product 202 can be adjusted to accommodate a variety of aircrafts by adjusting the amounts of thickening agent(s) added to the mixture. The final diluted product 202 may be a may be a low, medium, or high viscosity long term retardant. The viscosity may be in the range of 150-400 cP, 401 cP to 800 cP, or >801 cP, for a low, medium, or high viscosity long term retardant, respectively. Once blended with water, the final diluted product 202 is a homogeneous, stable fluid that requires only infrequent stirring. The final diluted product 202 is hydrated into a stable mixture in 20 minutes, without the use of special equipment.

EXAMPLES

Example 1

In Example 1, a dry concentrate was prepared containing the amounts of ingredients listed in Table 2 below. The values in Table 2 can be varied by ±0.01%, or ±0.05%, or ±0.1%, or ±0.5%, or ±1.0%, or ±1.5%, or ±2%, or ±2.5%, or 3.0%, or 3.5%, or 4.0%, or ±4.5%, or 5.0%.

TABLE 2

Dry Concentrate according to Example 1

| Ingredient | Weight Percent of Each Ingredient in Dry Concentrate |
|---|---|
| Potassium Acetate ($CH_3CO_2K$) | 93.24% |
| Buffering agent | 2.56% |
| Thickening agent | 1.63% |
| Fluorescent Pigment | 1.17% |
| Corrosion Inhibitor (approximately 40% water) | 0.93% |
| Surfactant | 0.47% |
| Water | 0.00% |
| Total Weight of Dry Concentrate | 100% |

In Example 1, the final diluted product 103 was prepared by mixing approximately 2.28 pounds of the dry concentrate in 1 gallon of water. The amounts of the ingredients in the Example 1 final diluted product 103 are listed in Table 3 below. The values in Table 3 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 1 final diluted product 103 is about 10% to 30% by weight in water, preferably about 12% to 28%, more preferably about 14% to 26%. For example, the weight percent of salt in the Example 1 final diluted product 103 is about 20%±1.0%.

TABLE 3

Final Diluted Product according to Example 1

| Ingredient | Weight Percent of Each Ingredient in Final Diluted Product |
|---|---|
| Potassium Acetate ($CH_3CO_2K$) | 20% |
| Buffering agent | 0.55% |
| Thickening agent | 0.35% |
| Fluorescent Pigment | 0.25% |
| Corrosion Inhibitor (approximately 40% water) | 0.20% |
| Surfactant | 0.10% |
| Water | 78.55% |
| Total Weight of Final Diluted Product | 100% |

The density of the final diluted product 103 of Example 1 may be in the range of about 0.8 g/mL to about 1.3 g/mL, for example about 1.0 g/mL to about 1.2 g/mL. The pH of the final diluted product 103 of Example 1 may be in the range of about 6.0 to about 7.0, for example about 6.48. The viscosity of the final diluted product 103 of Example 1 may be in the range of about 250 cP to about 350 cP, for example about 321 cP.

Example 2

In Example 2, a dry concentrate was prepared containing the amounts of ingredients listed in Table 4 below. The values in Table 4 can be varied by ±0.01%, or ±0.05%, or ±0.1%, or ±0.5%, or ±1.0%, or ±1.5%, or ±2%, or ±2.5%, or 3.0%, or 3.5%, or 4.0%, or ±4.5%, or 5.0%.

TABLE 4

Dry Concentrate according to Example 2

| Ingredient | Weight Percent of Each Ingredient in Dry Concentrate |
|---|---|
| Potassium Acetate ($CH_3CO_2K$) | 92.86% |
| Buffering agent | 1.79% |
| Thickening agent | 2.08% |
| Fluorescent Pigment | 1.49% |
| Corrosion Inhibitor (approximately 40% water) | 1.19% |
| Surfactant | 0.60% |
| Water | 0.00% |
| Total Weight of Dry Concentrate | 100% |

In Example 2, the final diluted product 103 was prepared by mixing approximately 1.69 pounds of the dry concentrate in 1 gallon of water. The amounts of the ingredients in the Example 2 final diluted product 103 are listed in Table 5 below. The values in Table 5 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 2 final diluted product 103 is about 5% to 25% by weight in water, preferably about 6% to 23%, more preferably about 7% to 20%. For example, the weight percent of salt in the Example 2 final diluted product 103 is about 15.6%±1.0%.

TABLE 5

Final Diluted Product according to Example 2

| Ingredient | Weight Percent of Each Ingredient in Final Diluted Product |
|---|---|
| Potassium Acetate ($CH_3CO_2K$) | 15.60% |
| Buffering agent | 0.30% |
| Thickening agent | 0.35% |
| Fluorescent Pigment | 0.25% |
| Corrosion Inhibitor (approximately 40% water) | 0.20% |
| Surfactant | 0.10% |
| Water | 83.20% |
| Total Weight of Final Diluted Product | 100% |

The density of the final diluted product 103 of Example 2 may be in the range of about 0.8 g/mL to about 1.3 g/mL, for example about 1.0 g/mL to about 1.2 g/mL. The pH of the final diluted product 103 of Example 2 may be in the range of about 6.0 to about 7.0, for example about 6.55. The viscosity of the final diluted product 103 of Example 2 may be in the range of about 250 cP to about 350 cP, for example about 321 cP.

Example 3

In Example 3, a dry concentrate was prepared containing the amounts of ingredients listed in Table 6 below. The values in Table 6 can be varied by ±0.01%, or ±0.05%, or ±0.1%, or ±0.5%, or ±1.0%, or ±1.5%, or ±2%, or ±2.5%, or 3.0%, or 3.5%, or 4.0%, or ±4.5%, or 5.0%.

TABLE 6

Dry Concentrate according to Example 3

| Ingredient | Weight Percent of Each Ingredient in Dry Concentrate |
|---|---|
| Potassium Acetate ($CH_3CO_2K$) | 90.09% |
| Buffering agent | 1.80% |
| Thickening agent | 3.15% |
| Fluorescent Pigment | 2.25% |
| Corrosion Inhibitor (approximately 40% water) | 1.80% |
| Surfactant | 0.90% |
| Water | 0.00% |
| Total Weight of Dry Concentrate | 100% |

In Example 3, the final diluted product 103 was prepared by mixing approximately 1.04 pounds of the dry concentrate in 1 gallon of water. The amounts of the ingredients in the Example 3 final diluted product 103 are listed in Table 7 below. The values in Table 7 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 3 final diluted product 103 is about 5% to 20% by weight in water, preferably about 6% to 18%, more preferably about 7% to 16%. For example, the weight percent of salt in the Example 3 final diluted product 103 is about 10%±1.0%.

TABLE 7

| Final Diluted Product according to Example 3 | |
|---|---|
| Ingredient | Weight Percent of Each Ingredient in Final Diluted Product |
| Potassium Acetate ($CH_3CO_2K$) | 10.00% |
| Buffering agent | 0.20% |
| Thickening agent | 0.35% |
| Fluorescent Pigment | 0.25% |
| Corrosion Inhibitor (approximately 40% water) | 0.20% |
| Surfactant | 0.10% |
| Water | 88.90% |
| Total Weight of Final Diluted Product | 100% |

The density of the final diluted product 103 of Example 3 may be in the range of about 0.8 g/mL to about 1.3 g/mL, for example about 1.0 g/mL to about 1.2 g/mL. The pH of the final diluted product 103 of Example 3 may be in the range of about 6.0 to about 7.0, for example about 6.41. The viscosity of the final diluted product 103 of Example 3 may be in the range of about 250 cP to about 350 cP, for example about 291 cP.

Example 4

In Example 4, a liquid concentrate was prepared containing the amounts of ingredients listed in Table 8 below. The values in Table 8 can be varied by ±0.01%, or ±0.05%, or ±0.1%, or ±0.5%, or ±1.0%, or ±1.5%, or ±2%, or ±2.5%, or 3.0%, or 3.5%, or 4.0%, or ±4.5%, or ±5.0%.

TABLE 8

| Liquid Concentrate according to Example 4 | |
|---|---|
| Ingredient | Weight Percent of Each Ingredient in Liquid Concentrate |
| Potassium Acetate ($CH_3CO_2K$) | 65.00% |
| Buffering agent | 0.65% |
| Thickening agent | 1.60% |
| Fluorescent Pigment | 1.60% |
| Corrosion Inhibitor (approximately 40% water) | 1.30% |
| Surfactant | 0.65% |
| Water | 29.20% |
| Total Weight of Liquid Concentrate | 100% |

In Example 4, the final diluted product 202 was prepared by mixing approximately 1.52 pounds of the liquid concentrate in 1 gallon of water. The amounts of the ingredients in the Example 4 final diluted product 202 are listed in Table 9 below. The values in Table 9 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 4 final diluted product 202 is about 5% to 20% by weight in water, preferably about 6% to 18%, more preferably about 7% to 16%. For example, the weight percent of salt in the Example 4 final diluted product 202 is about 10.8%±1.0%.

TABLE 9

| Final Diluted Product according to Example 4 | |
|---|---|
| Ingredient | Weight Percent of Each Ingredient in Final Diluted Product |
| Potassium Acetate ($CH_3CO_2K$) | 10.83% |
| Buffering agent | 0.11% |
| Thickening agent | 0.27% |
| Fluorescent Pigment | 0.27% |
| Corrosion Inhibitor (approximately 40% water) | 0.22% |
| Surfactant | 0.11% |
| Water | 88.20% |
| Total Weight of Final Diluted Product | 100% |

The density of the final diluted product 202 of Example 4 may be in the range of about 0.8 g/mL to about 1.3 g/mL, for example about 0.9 g/mL to about 1.2 g/mL. The pH of the final diluted product 103 of Example 4 may be in the range of about 6.2 to about 7.2, for example about 6.8. The viscosity of the final diluted product 103 of Example 4 may be in the range of about 150 cP to about 250 cP, for example about 166 cP.

Example 5

In Example 5, a liquid concentrate was prepared containing the amounts of ingredients listed in Table 10 below. The values in Table 10 can be varied by ±0.01%, or ±0.05%, or ±0.1%, or ±0.5%, or ±1.0%, or ±1.5%, or ±2%, or 2.5%, or 3.0%, or 3.5%, or 4.0%, or ±4.5%, or 5.0%.

TABLE 10

| Liquid Concentrate according to Example 5 | |
|---|---|
| Ingredient | Weight Percent of Each Ingredient in Liquid Concentrate |
| Potassium Acetate ($CH_3CO_2K$) | 60.00% |
| Buffering agent | 0.60% |
| Thickening agent | 6.60% |
| Fluorescent Pigment | 1.50% |
| Corrosion Inhibitor (approximately 40% water) | 1.20% |
| Surfactant | 0.60% |
| Water | 29.50% |
| Total Weight of Liquid Concentrate | 100% |

In Example 5, the final diluted product 202 was prepared by mixing approximately 1.67 pounds of the liquid concentrate in 1 gallon of water. The amounts of the ingredients in the Example 5 final diluted product 202 are listed in Table 11 below. The values in Table 11 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 5 final diluted product 202 is about 5% to 20% by weight in water, preferably about 6% to 18%, more preferably about 7% to 16%. For example, the weight percent of salt in the Example 5 final diluted product 202 is about 10%±1.0%.

TABLE 11

| Final Diluted Product according to Example 5 | |
|---|---|
| Ingredient | Weight Percent of Each Ingredient in Final Diluted Product |
| Potassium Acetate ($CH_3CO_2K$) | 10.00% |
| Buffering agent | 0.10% |
| Thickening agent | 1.10% |
| Fluorescent Pigment | 0.25% |
| Corrosion Inhibitor (approximately 40% water) | 0.20% |
| Surfactant | 0.10% |
| Water | 88.25% |
| Total Weight of Final Diluted Product | 100% |

The density of the final diluted product 202 of Example 5 may be in the range of about 0.8 g/mL to about 1.3 g/mL, for example about 0.9 g/mL to about 1.2 g/mL. The pH of the final diluted product 103 of Example 5 may be in the range of about 6.5 to about 7.5, for example about 7.22. The viscosity of the final diluted product 103 of Example 5 may be in the range of about 150 cP to about 250 cP, for example about 193 cP.

Example 6

In Example 6, a dry concentrate was prepared containing the amounts of ingredients listed in Table 12 below. The values in Table 12 can be varied by ±0.01%, or ±0.05%, or ±0.1%, or ±0.5%, or ±1.0%, or ±1.5%, or ±2%, or 2.5%, or 3.0%, or 3.5%, or 4.0%, or ±4.5%, or ±5.0%.

TABLE 12

| Dry Concentrate according to Example 6 | |
|---|---|
| Ingredient | Weight Percent of Each Ingredient in Dry Concentrate |
| Potassium Acetate ($CH_3CO_2K$) | 91.32% |
| Thickening agent | 2.74% |
| Fluorescent Pigment | 2.28% |
| Corrosion Inhibitor (approximately 40% water) | 1.83% |
| Corrosion Inhibitor | 0.91% |
| Surfactant | 0.91% |
| Water | 0.00% |
| Total Weight of Dry Concentrate | 100% |

In Example 6, the final diluted product 103 was prepared by mixing approximately 1.03 pounds of the dry concentrate in 1 gallon of water. The amounts of the ingredients in the Example 6 final diluted product 103 are listed in Table 13 below. The values in Table 13 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 6 final diluted product 103 is about 5% to 25% by weight in water, preferably about 6% to 23%, more preferably about 7% to 20%. For example, the weight percent of salt in the Example 6 final diluted product 103 is about 10.0%±1.0%.

TABLE 13

| Final Diluted Product according to Example 6 | |
|---|---|
| Ingredient | Weight Percent of Each Ingredient in Final Diluted Product |
| Potassium Acetate ($CH_3CO_2K$) | 10.00% |
| Thickening agent | 0.30% |
| Fluorescent Pigment | 0.25% |
| Corrosion Inhibitor (approximately 40% water) | 0.20% |
| Corrosion Inhibitor | 0.10% |
| Surfactant | 0.10% |
| Water | 89.05% |
| Total Weight of Final Diluted Product | 100% |

The density of the final diluted product 103 of Example 6 may be in the range of about 0.8 g/mL to about 1.3 g/mL, for example about 0.9 g/mL to about 1.1 g/mL. The pH of the final diluted product 103 of Example 6 may be in the range of about 8.0 to about 9.0, for example about 8.6. The viscosity of the final diluted product 103 of Example 6 may be in the range of about 200 cP to about 300 cP, for example about 256 cP.

Example 7

In Example 7, a dry concentrate was prepared containing the amounts of ingredients listed in Table 14 below. The values in Table 14 can be varied by ±0.01%, or ±0.05%, or ±0.1%, or ±0.5%, or ±1.0%, or ±1.5%, or ±2%, or 2.5%, or 3.0%, or 3.5%, or 4.0%, or ±4.5%, or 5.0%.

TABLE 14

| Dry Concentrate according to Example 7 | |
|---|---|
| Ingredient | Weight Percent of Each Ingredient in Dry Concentrate |
| Potassium Acetate ($CH_3CO_2K$) | 83.68% |
| DAP | 8.37% |
| Thickening agent | 2.51% |
| Fluorescent Pigment | 2.09% |
| Corrosion Inhibitor (approximately 40% water) | 1.67% |
| Corrosion Inhibitor | 0.84% |
| Surfactant | 0.84% |
| Water | 0.00% |
| Total Weight of Dry Concentrate | 100% |

In Example 7, the final diluted product 103 was prepared by mixing approximately 1.13 pounds of the dry concentrate in 1 gallon of water. The amounts of the ingredients in the Example 7 final diluted product 103 are listed in Table 15 below. The values in Table 15 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 7 final diluted product 103 is about 5% to 25% by weight in water, preferably about 6% to 23%, more preferably about 7% to 20%. For example, the weight percent of salt in the Example 7 final diluted product 103 is about 11.0%±1.0%.

TABLE 15

| Final Diluted Product according to Example 7 | |
|---|---|
| Ingredient | Weight Percent of Each Ingredient in Final Diluted Product |
| Potassium Acetate ($CH_3CO_2K$) | 10.00% |
| DAP | 1.00% |
| Thickening agent | 0.30% |
| Fluorescent Pigment | 0.25% |
| Corrosion Inhibitor (approximately 40% water) | 0.20% |
| Corrosion Inhibitor | 0.10% |
| Surfactant | 0.10% |
| Water | 88.05% |
| Total Weight of Final Diluted Product | 100% |

The density of the final diluted product 103 of Example 7 may be in the range of about 0.8 g/mL to about 1.3 g/mL, for example about 0.9 g/mL to about 1.1 g/mL. The pH of the final diluted product 103 of Example 7 may be in the range of about 7.5 to about 8.5, for example about 8.2. The viscosity of the final diluted product 103 of Example 7 may be in the range of about 200 cP to about 300 cP, for example about 221.5 cP.

Example 8

In Example 8, a dry concentrate was prepared containing the amounts of ingredients listed in Table 16 below. The values in Table 16 can be varied by ±0.01%, or ±0.05%, or ±0.1%, or ±0.5%, or ±1.0%, or ±1.5%, or ±2%, or 2.5%, or 3.0%, or 3.5%, or 4.0%, or ±4.5%, or 5.0%.

TABLE 16

| Dry Concentrate according to Example 8 | |
|---|---|
| Ingredient | Weight Percent of Each Ingredient in Dry Concentrate |
| Potassium Acetate ($CH_3CO_2K$) | 77.22% |
| DAP | 15.44% |
| Thickening agent | 2.32% |
| Fluorescent Pigment | 1.93% |
| Corrosion Inhibitor (approximately 40% water) | 1.54% |
| Corrosion Inhibitor | 0.77% |
| Surfactant | 0.77% |
| Water | 0.00% |
| Total Weight of Dry Concentrate | 100% |

In Example 8, the final diluted product 103 was prepared by mixing approximately 1.24 pounds of the dry concentrate in 1 gallon of water. The amounts of the ingredients in the Example 8 final diluted product 103 are listed in Table 17 below. The values in Table 17 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 8 final diluted product 103 is about 5% to 25% by weight in water, preferably about 6% to 23%, more preferably about 7% to 20%. For example, the weight percent of salt in the Example 8 final diluted product 103 is about 12.0%±1.0%.

TABLE 17

| Final Diluted Product according to Example 8 | |
|---|---|
| Ingredient | Weight Percent of Each Ingredient in Final Diluted Product |
| Potassium Acetate ($CH_3CO_2K$) | 10.00% |
| DAP | 2.00% |
| Thickening agent | 0.30% |
| Fluorescent Pigment | 0.25% |
| Corrosion Inhibitor (approximately 40% water) | 0.20% |
| Corrosion Inhibitor | 0.10% |
| Surfactant | 0.10% |
| Water | 87.05% |
| Total Weight of Final Diluted Product | 100% |

The density of the final diluted product 103 of Example 8 may be in the range of about 0.8 g/mL to about 1.3 g/mL, for example about 0.9 g/mL to about 1.1 g/mL. The pH of the final diluted product 103 of Example 8 may be in the range of about 7.5 to about 8.5, for example about 8.1. The viscosity of the final diluted product 103 of Example 8 may be in the range of about 200 cP to about 300 cP, for example about 245 cP.1

Example 9

In Example 9, a dry concentrate was prepared containing the amounts of ingredients listed in Table 18 below. The values in Table 18 can be varied by ±0.01%, or ±0.05%, or ±0.1%, or ±0.5%, or ±1.0%, or ±1.5%, or ±2%, or 2.5%, or 3.0%, or 3.5%, or 4.0%, or ±4.5%, or 5.0%.

TABLE 18

| Dry Concentrate according to Example 9 | |
|---|---|
| Ingredient | Weight Percent of Each Ingredient in Dry Concentrate |
| $KHCO_3$ | 91.32% |
| Thickening agent | 2.74% |
| Fluorescent Pigment | 2.28% |
| Corrosion Inhibitor (approximately 40% water) | 1.83% |
| Corrosion Inhibitor | 0.91% |
| Surfactant | 0.91% |
| Water | 0.00% |
| Total Weight of Dry Concentrate | 100% |

In Example 9, the final diluted product 103 was prepared by mixing approximately 1.03 pounds of the dry concentrate in 1 gallon of water. The amounts of the ingredients in the Example 9 final diluted product 103 are listed in Table 19 below. The values in Table 19 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 9 final diluted product 103 is about 5% to 25% by weight in water, preferably about 6% to 23%, more preferably about 7% to 20%. For example, the weight percent of salt in the Example 9 final diluted product 103 is about 10.0%±1.0%.

TABLE 19

Final Diluted Product according to Example 9

| Ingredient | Weight Percent of Each Ingredient in Final Diluted Product |
|---|---|
| $KHCO_3$ | 10.00% |
| Thickening agent | 0.30% |
| Fluorescent Pigment | 0.25% |
| Corrosion Inhibitor (approximately 40% water) | 0.20% |
| Corrosion Inhibitor | 0.10% |
| Surfactant | 0.10% |
| Water | 89.05% |
| Total Weight of Final Diluted Product | 100% |

The density of the final diluted product 103 of Example 9 may be in the range of about 0.8 g/mL to about 1.3 g/mL, for example about 0.9 g/mL to about 1.1 g/mL. The pH of the final diluted product 103 of Example 9 may be in the range of about 7.5 to about 8.5, for example about 8.1. The viscosity of the final diluted product 103 of Example 9 may be in the range of about 200 cP to about 300 cP, for example about 239 cP.

Example 10

In Example 10, a dry concentrate was prepared containing the amounts of ingredients listed in Table 20 below. The values in Table 20 can be varied by ±0.01%, or ±0.05%, or ±0.1%, or ±0.5%, or ±1.0%, or ±1.5%, or ±2%, or 2.5%, or 3.0%, or 3.5%, or 4.0%, or ±4.5%, or ±5.0%.

TABLE 20

Dry Concentrate according to Example 10

| Ingredient | Weight Percent of Each Ingredient in Dry Concentrate |
|---|---|
| Potassium acetate | 77.22% |
| $KHCO_3$ | 15.44% |
| Thickening agent | 2.32% |
| Fluorescent Pigment | 1.93% |
| Corrosion Inhibitor (approximately 40% water) | 1.54% |
| Corrosion Inhibitor | 0.77% |
| Surfactant | 0.77% |
| Water | 0.00% |
| Total Weight of Dry Concentrate | 100% |

In Example 10, the final diluted product 103 was prepared by mixing approximately 1.24 pounds of the dry concentrate in 1 gallon of water. The amounts of the ingredients in the Example 10 final diluted product 103 are listed in Table 21 below. The values in Table 21 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 10 final diluted product 103 is about 5% to 25% by weight in water, preferably about 6% to 23%, more preferably about 7% to 20%. For example, the weight percent of salt in the Example 10 final diluted product 103 is about 12.0%±1.0%.

TABLE 21

Final Diluted Product according to Example 10

| Ingredient | Weight Percent of Each Ingredient in Final Diluted Product |
|---|---|
| Potassium acetate | 10.00% |
| $KHCO_3$ | 2.00% |
| Thickening agent | 0.30% |
| Fluorescent Pigment | 0.25% |
| Corrosion Inhibitor (approximately 40% water) | 0.20% |
| Corrosion Inhibitor | 0.10% |
| Surfactant | 0.10% |
| Water | 87.05% |
| Total Weight of Final Diluted Product | 100% |

The density of the final diluted product 103 of Example 10 may be in the range of about 0.8 g/mL to about 1.3 g/mL, for example about 0.9 g/mL to about 1.1 g/mL. The pH of the final diluted product 103 of Example 10 may be in the range of about 8.0 to about 9.0, for example about 8.3. The viscosity of the final diluted product 103 of Example 10 may be in the range of about 200 cP to about 300 cP, for example about 245 cP.

Example 11

In Example 11, a dry concentrate was prepared containing the amounts of ingredients listed in Table 22 below. The values in Table 22 can be varied by ±0.01%, or ±0.05%, or ±0.1%, or ±0.5%, or ±1.0%, or ±1.5%, or ±2%, or 2.5%, or 3.0%, or 3.5%, or 4.0%, or ±4.5%, or 5.0%.

TABLE 22

Dry Concentrate according to Example 11

| Ingredient | Weight Percent of Each Ingredient in Dry Concentrate |
|---|---|
| Dipotassium phosphate | 92.44% |
| Thickening agent | 2.52% |
| Fluorescent Pigment | 2.10% |
| Corrosion Inhibitor (approximately 40% water) | 1.68% |
| Corrosion Inhibitor | 0.42% |
| Surfactant | 0.84% |
| Water | 0.00% |
| Total Weight of Dry Concentrate | 100% |

In Example 11, the final diluted product 103 was prepared by mixing approximately 1.13 pounds of the dry concentrate in 1 gallon of water. The amounts of the ingredients in the Example 11 final diluted product 103 are listed in Table 23 below. The values in Table 23 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 11 final diluted product 103 is about 5% to 25% by weight in water, preferably about 6% to 23%, more preferably about 7% to 20%. For example, the weight percent of salt in the Example 11 final diluted product 103 is about 11.0%±1.0%.

TABLE 23

| Final Diluted Product according to Example 11 | |
|---|---|
| Ingredient | Weight Percent of Each Ingredient in Final Diluted Product |
| Dipotassium phosphate | 11.00% |
| Thickening agent | 0.30% |
| Fluorescent Pigment | 0.25% |
| Corrosion Inhibitor (approximately 40% water) | 0.20% |
| Corrosion Inhibitor | 0.05% |
| Surfactant | 0.10% |
| Water | 88.10% |
| Total Weight of Final Diluted Product | 100% |

The density of the final diluted product 103 of Example 11 may be in the range of about 0.8 g/mL to about 1.4 g/mL, for example about 0.9 g/mL to about 1.2 g/mL. The pH of the final diluted product 103 of Example 11 may be in the range of about 8.5 to about 9.5, for example about 8.98. The viscosity of the final diluted product 103 of Example 11 may be in the range of about 200 cP to about 300 cP, for example about 242 cP.

Example 12

In Example 12, a dry concentrate was prepared containing the amounts of ingredients listed in Table 24 below. The values in Table 24 can be varied by ±0.01%, or ±0.05%, or ±0.1%, or ±0.5%, or ±1.0%, or ±1.5%, or ±2%, or 2.5%, or 3.0%, or 3.5%, or 4.0%, or ±4.5%, or ±5.0%.

TABLE 24

| Dry Concentrate according to Example 12 | |
|---|---|
| Ingredient | Weight Percent of Each Ingredient in Dry Concentrate |
| Dipotassium phosphate | 84.03% |
| Monopotassium phosphate | 8.40% |
| Thickening agent | 2.52% |
| Fluorescent Pigment | 2.10% |
| Corrosion Inhibitor (approximately 40% water) | 1.68% |
| Corrosion Inhibitor | 0.42% |
| Surfactant | 0.84% |
| Water | 0.00% |
| Total Weight of Dry Concentrate | 100% |

In Example 12, the final diluted product 103 was prepared by mixing approximately 1.13 pounds of the dry concentrate in 1 gallon of water. The amounts of the ingredients in the Example 12 final diluted product 103 are listed in Table 25 below. The values in Table 25 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 12 final diluted product 103 is about 5% to 25% by weight in water, preferably about 6% to 23%, more preferably about 7% to 20%. For example, the weight percent of salt in the Example 12 final diluted product 103 is about 11.0%±1.0%.

TABLE 25

| Final Diluted Product according to Example 12 | |
|---|---|
| Ingredient | Weight Percent of Each Ingredient in Final Diluted Product |
| Dipotassium phosphate | 10.00% |
| Monopotassium phosphate | 1.00% |
| Thickening agent | 0.30% |
| Fluorescent Pigment | 0.25% |
| Corrosion Inhibitor (approximately 40% water) | 0.20% |
| Corrosion Inhibitor | 0.05% |
| Surfactant | 0.10% |
| Water | 88.10% |
| Total Weight of Final Diluted Product | 100% |

The density of the final diluted product 103 of Example 12 may be in the range of about 0.8 g/mL to about 1.3 g/mL, for example about 0.9 g/mL to about 1.2 g/mL. The pH of the final diluted product 103 of Example 12 may be in the range of about 7.0 to about 8.0, for example about 7.69. The viscosity of the final diluted product 103 of Example 12 may be in the range of about 200 cP to about 300 cP, for example about 256 cP.

Example 13

In Example 13, a dry concentrate was prepared containing the amounts of ingredients listed in Table 26 below. The values in Table 26 can be varied by ±0.01%, or ±0.05%, or ±0.1%, or ±0.5%, or ±1.0%, or ±1.5%, or ±2%, or 2.5%, or 3.0%, or 3.5%, or 4.0%, or ±4.5%, or 5.0%.

TABLE 26

| Dry Concentrate according to Example 13 | |
|---|---|
| Ingredient | Weight Percent of Each Ingredient in Dry Concentrate |
| Potassium Acetate | 85.47% |
| Corrosion Inhibitor | 6.84% |
| Thickening agent | 2.56% |
| Fluorescent Pigment | 2.14% |
| Corrosion Inhibitor (approximately 40% water) | 1.71% |
| Corrosion Inhibitor | 0.43% |
| Surfactant | 0.85% |
| Water | 0.00% |
| Total Weight of Dry Concentrate | 100% |

In Example 13, the final diluted product 103 was prepared by mixing approximately 1.11 pounds of the dry concentrate in 1 gallon of water. The amounts of the ingredients in the Example 13 final diluted product 103 are listed in Table 27 below. The values in Table 27 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 13 final diluted product 103 is about 5% to 25% by weight in water, preferably about 6% to 23%, more preferably about 7% to 20%. For example, the weight percent of salt in the Example 13 final diluted product 103 is about 10.0%±1.0%.

TABLE 27

| Final Diluted Product according to Example 13 | |
|---|---|
| Ingredient | Weight Percent of Each Ingredient in Final Diluted Product |
| Potassium Acetate | 10.00% |
| Corrosion Inhibitor | 0.80% |
| Thickening agent | 0.30% |
| Fluorescent Pigment | 0.25% |
| Corrosion Inhibitor (approximately 40% water) | 0.20% |
| Corrosion Inhibitor | 0.05% |
| Surfactant | 0.10% |
| Water | 88.30% |
| Total Weight of Final Diluted Product | 100% |

The density of the final diluted product 103 of Example 13 may be in the range of about 0.8 g/mL to about 1.3 g/mL, for example about 0.9 g/mL to about 1.1 g/mL. The pH of the final diluted product 103 of Example 13 may be in the range of about 8.0 to about 9.0, for example about 8.49. The viscosity of the final diluted product 103 of Example 13 may be in the range of about 200 cP to about 300 cP, for example about 229 cP.

Example 14

In Example 14, a dry concentrate was prepared containing the amounts of ingredients listed in Table 28 below. The values in Table 28 can be varied by ±0.01%, or ±0.05%, or ±0.1%, or ±0.5%, or ±1.0%, or ±1.5%, or ±2%, or 2.5%, or 3.0%, or 3.5%, or 4.0%, or ±4.5%, or 5.0%.

TABLE 28

| Dry Concentrate according to Example 14 | |
|---|---|
| Ingredient | Weight Percent of Each Ingredient in Dry Concentrate |
| Potassium Acetate | 85.76% |
| Corrosion Inhibitor | 6.53% |
| Thickening agent | 2.57% |
| Fluorescent Pigment | 2.14% |
| Corrosion Inhibitor (approximately 40% water) | 1.72% |
| Corrosion Inhibitor | 0.43% |
| Surfactant | 0.86% |
| Water | 0.00% |
| Total Weight of Dry Concentrate | 100% |

In Example 14, the final diluted product 103 was prepared by mixing approximately 1.10 pounds of the dry concentrate in 1 gallon of water. The amounts of the ingredients in the Example 14 final diluted product 103 are listed in Table 29 below. The values in Table 29 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 14 final diluted product 103 is about 5% to 25% by weight in water, preferably about 6% to 23%, more preferably about 7% to 20%. For example, the weight percent of salt in the Example 14 final diluted product 103 is about 10.0%±1.0%.

TABLE 29

| Final Diluted Product according to Example 14 | |
|---|---|
| Ingredient | Weight Percent of Each Ingredient in Final Diluted Product |
| Potassium Acetate | 10.00% |
| Corrosion Inhibitor | 0.76% |
| Thickening agent | 0.30% |
| Fluorescent Pigment | 0.25% |
| Corrosion Inhibitor (approximately 40% water) | 0.20% |
| Corrosion Inhibitor | 0.05% |
| Surfactant | 0.10% |
| Water | 88.34% |
| Total Weight of Final Diluted Product | 100% |

The density of the final diluted product 103 of Example 14 may be in the range of about 0.8 g/mL to about 1.3 g/mL, for example about 0.9 g/mL to about 1.1 g/mL. The pH of the final diluted product 103 of Example 14 may be in the range of about 6.5 to about 7.5, for example about 7.1. The viscosity of the final diluted product 103 of Example 14 may be in the range of about 200 cP to about 300 cP, for example about 224 cP.

Example 15

In Example 15, a dry concentrate was prepared containing the amounts of ingredients listed in Table 30 below. The values in Table 30 can be varied by ±0.01%, or ±0.05%, or ±0.1%, or ±0.5%, or ±1.0%, or ±1.5%, or ±2%, or 2.5%, or 3.0%, or 3.5%, or 4.0%, or ±4.5%, or 5.0%.

TABLE 30

| Dry Concentrate according to Example 15 | |
|---|---|
| Ingredient | Weight Percent of Each Ingredient in Dry Concentrate |
| Potassium oxalate, monohydrate | 92.44% |
| Thickening agent | 2.52% |
| Fluorescent Pigment | 2.10% |
| Corrosion Inhibitor (approximately 40% water) | 1.68% |
| Corrosion Inhibitor | 0.42% |
| Surfactant | 0.84% |
| Water | 0.00% |
| Total Weight of Dry Concentrate | 100% |

In Example 15, the final diluted product 103 was prepared by mixing approximately 1.13 pounds of the dry concentrate in 1 gallon of water. The amounts of the ingredients in the Example 15 final diluted product 103 are listed in Table 31 below. The values in Table 31 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 15 final diluted product 103 is about 5% to 25% by weight in water, preferably about 6% to 23%, more preferably about 7% to 20%. For example, the weight percent of salt in the Example 15 final diluted product 103 is about 11.0%±1.0%.

TABLE 31

| Final Diluted Product according to Example 15 | |
|---|---|
| Ingredient | Weight Percent of Each Ingredient in Final Diluted Product |
| Potassium oxalate, monohydrate | 11.00% |
| Thickening agent | 0.30% |
| Fluorescent Pigment | 0.25% |
| Corrosion Inhibitor (approximately 40% water) | 0.20% |
| Corrosion Inhibitor | 0.05% |
| Surfactant | 0.10% |
| Water | 88.10% |
| Total Weight of Final Diluted Product | 100% |

The density of the final diluted product 103 of Example 15 may be in the range of about 0.8 g/mL to about 1.3 g/mL, for example about 0.9 g/mL to about 1.2 g/mL. The pH of the final diluted product 103 of Example 15 may be in the range of about 8.0 to about 9.0, for example about 8.8. The viscosity of the final diluted product 103 of Example 15 may be in the range of about 200 cP to about 300 cP, for example about 240 cP.

Example 16

In Example 16, a dry concentrate was prepared containing the amounts of ingredients listed in Table 32 below. The values in Table 32 can be varied by ±0.01%, or ±0.05%, or ±0.1%, or ±0.5%, or ±1.0%, or ±1.5%, or ±2%, or 2.5%, or 3.0%, or 3.5%, or 4.0%, or ±4.5%, or ±5.0%.

TABLE 32

| Dry Concentrate according to Example 16 | |
|---|---|
| Ingredient | Weight Percent of Each Ingredient in Dry Concentrate |
| Potassium Lactate | 91.74% |
| Thickening agent | 2.75% |
| Fluorescent Pigment | 2.29% |
| Corrosion Inhibitor (approximately 40% water) | 1.83% |
| Corrosion Inhibitor | 0.46% |
| Surfactant | 0.92% |
| Water | 0.00% |
| Total Weight of Dry Concentrate | 100% |

In Example 16, the final diluted product 103 was prepared by mixing approximately 1.02 pounds of the dry concentrate in 1 gallon of water. The amounts of the ingredients in the Example 16 final diluted product 103 are listed in Table 33 below. The values in Table 33 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 16 final diluted product 103 is about 5% to 25% by weight in water, preferably about 6% to 23%, more preferably about 7% to 20%. For example, the weight percent of salt in the Example 16 final diluted product 103 is about 10.0%±1.0%.

TABLE 33

| Final Diluted Product according to Example 16 | |
|---|---|
| Ingredient | Weight Percent of Each Ingredient in Final Diluted Product |
| Potassium Lactate | 10.00% |
| Thickening agent | 0.30% |
| Fluorescent Pigment | 0.25% |
| Corrosion Inhibitor (approximately 40% water) | 0.20% |
| Corrosion Inhibitor | 0.05% |
| Surfactant | 0.10% |
| Water | 89.10% |
| Total Weight of Final Diluted Product | 100% |

The density of the final diluted product 103 of Example 16 may be in the range of about 0.8 g/mL to about 1.3 g/mL, for example about 0.9 g/mL to about 1.2 g/mL. The pH of the final diluted product 103 of Example 16 may be in the range of about 8.0 to about 9.0, for example about 8.6. The viscosity of the final diluted product 103 of Example 16 may be in the range of about 200 cP to about 300 cP, for example about 228 cP.

Example 17

In Example 17, a dry concentrate was prepared containing the amounts of ingredients listed in Table 34 below. The values in Table 34 can be varied by ±0.01%, or ±0.05%, or ±0.1%, or ±0.5%, or ±1.0%, or ±1.5%, or ±2%, or 2.5%, or 3.0%, or 3.5%, or 4.0%, or ±4.5%, or 5.0%.

TABLE 34

| Dry Concentrate according to Example 17 | |
|---|---|
| Ingredient | Weight Percent of Each Ingredient in Dry Concentrate |
| Potassium Formate | 91.74% |
| Thickening agent | 2.75% |
| Fluorescent Pigment | 2.29% |
| Corrosion Inhibitor (approximately 40% water) | 1.83% |
| Corrosion Inhibitor | 0.46% |
| Surfactant | 0.92% |
| Water | 0.00% |
| Total Weight of Dry Concentrate | 100% |

In Example 17, the final diluted product 103 was prepared by mixing approximately 1.02 pounds of the dry concentrate in 1 gallon of water. The amounts of the ingredients in the Example 17 final diluted product 103 are listed in Table 35 below. The values in Table 35 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 17 final diluted product 103 is about 5% to 25% by weight in water, preferably about 6% to 23%, more preferably about 7% to 20%. For example, the weight percent of salt in the Example 17 final diluted product 103 is about 10.0%±1.0%.

TABLE 35

| Final Diluted Product according to Example 17 | |
|---|---|
| Ingredient | Weight Percent of Each Ingredient in Final Diluted Product |
| Potassium Formate | 10.00% |
| Thickening agent | 0.30% |
| Fluorescent Pigment | 0.25% |
| Corrosion Inhibitor (approximately 40% water) | 0.20% |
| Corrosion Inhibitor | 0.05% |
| Surfactant | 0.10% |
| Water | 89.10% |
| Total Weight of Final Diluted Product | 100% |

The density of the final diluted product 103 of Example 17 may be in the range of about 0.8 g/mL to about 1.3 g/mL, for example about 0.9 g/mL to about 1.2 g/mL. The pH of the final diluted product 103 of Example 17 may be in the range of about 8.0 to about 9.0, for example about 8.6. The viscosity of the final diluted product 103 of Example 17 may be in the range of about 200 cP to about 300 cP, for example about 223 cP.

Example 18

In Example 18, a dry concentrate was prepared containing the amounts of ingredients listed in Table 36 below. The values in Table 36 can be varied by ±0.01%, or ±0.05%, or ±0.1%, or ±0.5%, or ±1.0%, or ±1.5%, or ±2%, or 2.5%, or 3.0%, or 3.5%, or 4.0%, or ±4.5%, or 5.0%.

TABLE 36

| Dry Concentrate according to Example 18 | |
|---|---|
| Ingredient | Weight Percent of Each Ingredient in Dry Concentrate |
| Potassium carbonate | 91.32% |
| Thickening agent | 2.74% |
| Fluorescent Pigment | 2.28% |
| Corrosion Inhibitor (approximately 40% water) | 1.83% |
| Corrosion Inhibitor | 0.91% |
| Surfactant | 0.91% |
| Water | 0.00% |
| Total Weight of Dry Concentrate | 100% |

In Example 18, the final diluted product 103 was prepared by mixing approximately 1.03 pounds of the dry concentrate in 1 gallon of water. The amounts of the ingredients in the Example 18 final diluted product 103 are listed in Table 37 below. The values in Table 37 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 18 final diluted product 103 is about 5% to 25% by weight in water, preferably about 6% to 23%, more preferably about 7% to 20%. For example, the weight percent of salt in the Example 18 final diluted product 103 is about 10.0%±1.0%.

TABLE 37

| Final Diluted Product according to Example 18 | |
|---|---|
| Ingredient | Weight Percent of Each Ingredient in Final Diluted Product |
| Potassium carbonate | 10.00% |
| Thickening agent | 0.30% |
| Fluorescent Pigment | 0.25% |
| Corrosion Inhibitor (approximately 40% water) | 0.20% |
| Corrosion Inhibitor | 0.10% |
| Surfactant | 0.10% |
| Water | 89.05% |
| Total Weight of Final Diluted Product | 100% |

The density of the final diluted product 103 of Example 18 may be in the range of about 0.8 g/mL to about 1.3 g/mL, for example about 0.9 g/mL to about 1.1 g/mL. The pH of the final diluted product 103 of Example 18 may be in the range of about 11.0 to about 12.0, for example about 11.8. The viscosity of the final diluted product 103 of Example 18 may be in the range of about 200 cP to about 300 cP, for example about 210 cP.

Example 19

In Example 19, a dry concentrate was prepared containing the amounts of ingredients listed in Table 38 below. The values in Table 38 can be varied by ±0.01%, or ±0.05%, or ±0.1%, or ±0.5%, or ±1.0%, or ±1.5%, or ±2%, or 2.5%, or 3.0%, or 3.5%, or 4.0%, or ±4.5%, or 5.0%.

TABLE 38

| Dry Concentrate according to Example 19 | |
|---|---|
| Ingredient | Weight Percent of Each Ingredient in Dry Concentrate |
| Potassium carbonate | 45.66% |
| Potassium bicarbonate | 45.66% |
| Thickening agent | 2.74% |
| Fluorescent Pigment | 2.28% |
| Corrosion Inhibitor (approximately 40% water) | 1.83% |
| Corrosion Inhibitor | 0.91% |
| Surfactant | 0.91% |
| Water | 0.00% |
| Total Weight of Dry Concentrate | 100% |

In Example 19, the final diluted product 103 was prepared by mixing approximately 1.03 pounds of the dry concentrate in 1 gallon of water. The amounts of the ingredients in the Example 19 final diluted product 103 are listed in Table 39 below. The values in Table 39 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 19 final diluted product 103 is about 5% to 25% by weight in water, preferably about 6% to 23%, more preferably about 7% to 20%. For example, the weight percent of salt in the Example 19 final diluted product 103 is about 10.0%±1.0%.

TABLE 39

| Final Diluted Product according to Example 19 | |
|---|---|
| Ingredient | Weight Percent of Each Ingredient in Final Diluted Product |
| Potassium carbonate | 5.00% |
| Potassium bicarbonate | 5.00% |
| Thickening agent | 0.30% |
| Fluorescent Pigment | 0.25% |
| Corrosion Inhibitor (approximately 40% water) | 0.20% |
| Corrosion Inhibitor | 0.10% |
| Surfactant | 0.10% |
| Water | 89.05% |
| Total Weight of Final Diluted Product | 100% |

The density of the final diluted product 103 of Example 19 may be in the range of about 0.8 g/mL to about 1.3 g/mL, for example about 0.9 g/mL to about 1.1 g/mL. The pH of the final diluted product 103 of Example 19 may be in the range of about 9.5 to about 10.5, for example about 9.8. The viscosity of the final diluted product 103 of Example 19 may be in the range of about 200 cP to about 300 cP, for example about 217 cP.

Example 20

In Example 20, a liquid concentrate was prepared containing the amounts of ingredients listed in Table 40 below. The values in Table 40 can be varied by ±0.01%, or ±0.05%, or ±0.1%, or ±0.5%, or ±1.0%, or ±1.5%, or ±2%, or 2.5%, or 3.0%, or 3.5%, or 4.0%, or ±4.5%, or 5.0%.

TABLE 40

| Liquid Concentrate according to Example 20 | |
|---|---|
| Ingredient | Weight Percent of Each Ingredient in Liquid Concentrate |
| Potassium Formate | 53.49% |
| Thickening agent | 1.34% |
| Fluorescent Pigment | 0.00% |
| Corrosion Inhibitor (approximately 40% water) | 1.07% |
| Corrosion Inhibitor | 0.53% |
| Surfactant | 0.53% |
| Water | 43.03% |
| Total Weight of Liquid Concentrate | 100% |

In Example 20, the final diluted product 202 was prepared by mixing approximately 1.92 pounds of the liquid concentrate in 1 gallon of water. The amounts of the ingredients in the Example 20 final diluted product 202 are listed in Table 41 below. The values in Table 41 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 20 final diluted product 202 is about 5% to 25% by weight in water, preferably about 6% to 23%, more preferably about 7% to 20%. For example, the weight percent of salt in the Example 20 final diluted product 202 is about 10.0%±1.0%.

TABLE 41

| Final Diluted Product according to Example 20 | |
|---|---|
| Ingredient | Weight Percent of Each Ingredient in Final Diluted Product |
| Potassium Formate | 10.00% |
| Thickening agent | 0.25% |
| Fluorescent Pigment | 0.00% |
| Corrosion Inhibitor (approximately 40% water) | 0.20% |
| Corrosion Inhibitor | 0.10% |
| Surfactant | 0.10% |
| Water | 89.35% |
| Total Weight of Final Diluted Product | 100% |

The density of the final diluted product 202 of Example 20 may be in the range of about 0.8 g/mL to about 1.3 g/mL, for example about 0.9 g/mL to about 1.1 g/mL. The pH of the final diluted product 202 of Example 20 may be in the range of about 8.0 to about 9.0, for example about 8.5. The viscosity of the final diluted product 202 of Example 20 may be in the range of about 100 cP to about 200 cP, for example about 160 cP.

Example 21

In Example 21, a dry concentrate was prepared containing the amounts of ingredients listed in Table 42 below. The values in Table 42 can be varied by ±0.01%, or ±0.05%, or ±0.1%, or ±0.5%, or ±1.0%, or ±1.5%, or ±2%, or 2.5%, or 3.0%, or 3.5%, or 4.0%, or ±4.5%, or ±5.0%.

TABLE 42

| Dry Concentrate according to Example 21 | |
|---|---|
| Ingredient | Weight Percent of Each Ingredient in Dry Concentrate |
| Potassium acetate | 87.11% |
| Thickening agent | 6.97% |
| Fluorescent Pigment | 2.18% |
| Inorganic Pigment | 0.52% |
| Corrosion Inhibitor (approximately 40% water) | 1.92% |
| Corrosion Inhibitor | 0.44% |
| Surfactant | 0.87% |
| Water | 0.00% |
| Total Weight of Dry Concentrate | 100% |

In Example 21, the final diluted product 103 was prepared by mixing approximately 1.08 pounds of the dry concentrate in 1 gallon of water. The amounts of the ingredients in the Example 21 final diluted product 103 are listed in Table 43 below. The values in Table 43 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 21 final diluted product 103 is about 5% to 25% by weight in water, preferably about 6% to 23%, more preferably about 7% to 20%. For example, the weight percent of salt in the Example 21 final diluted product 103 is about 10.0%±1.0%.

TABLE 43

| Final Diluted Product according to Example 21 | |
|---|---|
| Ingredient | Weight Percent of Each Ingredient in Final Diluted Product |
| Potassium acetate | 10.00% |
| Thickening agent | 0.80% |
| Fluorescent Pigment | 0.25% |
| Inorganic Pigment | 0.06% |
| Corrosion Inhibitor (approximately 40% water) | 0.22% |
| Corrosion Inhibitor | 0.05% |
| Surfactant | 0.10% |
| Water | 88.52% |
| Total Weight of Final Diluted Product | 100% |

The density of the final diluted product 103 of Example 21 may be in the range of about 0.8 g/mL to about 1.3 g/mL, for example about 0.9 g/mL to about 1.1 g/mL. The pH of the final diluted product 103 of Example 21 may be in the range of about 8.0 to about 9.0, for example about 8.6. The viscosity of the final diluted product 103 of Example 21 may be in the range of about 200 cP to about 300 cP, for example about 214 cP.

Example 22

In Example 22, a dry concentrate was prepared containing the amounts of ingredients listed in Table 44 below. The values in Table 44 can be varied by ±0.01%, or ±0.05%, or ±0.1%, or ±0.5%, or ±1.0%, or ±1.5%, or ±2%, or 2.5%, or 3.0%, or 3.5%, or 4.0%, or ±4.5%, or 5.0%.

TABLE 44

| Dry Concentrate according to Example 22 | |
|---|---|
| Ingredient | Weight Percent of Each Ingredient in Dry Concentrate |
| Potassium acetate | 45.87% |
| Potassium formate | 45.87% |
| Thickening agent | 2.75% |
| Fluorescent Pigment | 2.29% |
| Corrosion Inhibitor (approximately 40% water) | 1.83% |
| Corrosion Inhibitor | 0.46% |
| Surfactant | 0.92% |
| Water | 0.00% |
| Total Weight of Dry Concentrate | 100% |

In Example 22, the final diluted product 103 was prepared by mixing approximately 1.02 pounds of the dry concentrate in 1 gallon of water. The amounts of the ingredients in the Example 22 final diluted product 103 are listed in Table 45 below. The values in Table 45 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 22 final diluted product 103 is about 5% to 25% by weight in water, preferably about 6% to 23%, more preferably about 7% to 20%. For example, the weight percent of salt in the Example 22 final diluted product 103 is about 10.0%±1.0%.

TABLE 45

| Final Diluted Product according to Example 22 | |
|---|---|
| Ingredient | Weight Percent of Each Ingredient in Final Diluted Product |
| Potassium acetate | 5.00% |
| Potassium formate | 5.00% |
| Thickening agent | 0.30% |
| Fluorescent Pigment | 0.25% |
| Corrosion Inhibitor (approximately 40% water) | 0.20% |
| Corrosion Inhibitor | 0.05% |
| Surfactant | 0.10% |
| Water | 89.10% |
| Total Weight of Final Diluted Product | 100% |

The density of the final diluted product 103 of Example 22 may be in the range of about 0.8 g/mL to about 1.3 g/mL, for example about 0.9 g/mL to about 1.2 g/mL. The pH of the final diluted product 103 of Example 22 may be in the range of about 8.0 to about 9.0, for example about 8.7. The viscosity of the final diluted product 103 of Example 22 may be in the range of about 200 cP to about 300 cP, for example about 225 cP.

Example 23

In Example 23, a dry concentrate was prepared containing the amounts of ingredients listed in Table 46 below. The values in Table 46 can be varied by ±0.01%, or ±0.05%, or ±0.1%, or ±0.5%, or ±1.0%, or ±1.5%, or ±2%, or 2.5%, or 3.0%, or 3.5%, or 4.0%, or ±4.5%, or 5.0%.

TABLE 46

| Dry Concentrate according to Example 23 | |
|---|---|
| Ingredient | Weight Percent of Each Ingredient in Dry Concentrate |
| Potassium acetate | 45.87% |
| Monopotassium phosphate | 45.87% |
| Thickening agent | 2.75% |
| Fluorescent Pigment | 2.29% |
| Corrosion Inhibitor (approximately 40% water) | 1.83% |
| Corrosion Inhibitor | 0.46% |
| Surfactant | 0.92% |
| Water | 0.00% |
| Total Weight of Dry Concentrate | 100% |

In Example 23, the final diluted product 103 was prepared by mixing approximately 1.02 pounds of the dry concentrate in 1 gallon of water. The amounts of the ingredients in the Example 23 final diluted product 103 are listed in Table 47 below. The values in Table 47 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 23 final diluted product 103 is about 5% to 25% by weight in water, preferably about 6% to 23%, more preferably about 7% to 20%. For example, the weight percent of salt in the Example 23 final diluted product 103 is about 10.0%±1.0%.

TABLE 47

| Final Diluted Product according to Example 23 | |
|---|---|
| Ingredient | Weight Percent of Each Ingredient in Final Diluted Product |
| Potassium acetate | 5.00% |
| Monopotassium phosphate | 5.00% |
| Thickening agent | 0.30% |
| Fluorescent Pigment | 0.25% |
| Corrosion Inhibitor (approximately 40% water) | 0.20% |
| Corrosion Inhibitor | 0.05% |
| Surfactant | 0.10% |
| Water | 89.10% |
| Total Weight of Final Diluted Product | 100% |

The density of the final diluted product 103 of Example 23 may be in the range of about 0.8 g/mL to about 1.3 g/mL, for example about 0.9 g/mL to about 1.2 g/mL. The pH of the final diluted product 103 of Example 23 may be in the range of about 5.0 to about 6.0, for example about 5.9. The viscosity of the final diluted product 103 of Example 23 may be in the range of about 200 cP to about 300 cP, for example about 227 cP.

Example 24

In Example 24, a dry concentrate was prepared containing the amounts of ingredients listed in Table 48 below. The values in Table 48 can be varied by ±0.01%, or ±0.05%, or ±0.1%, or ±0.5%, or ±1.0%, or ±1.5%, or ±2%, or 2.5%, or 3.0%, or 3.5%, or 4.0%, or ±4.5%, or 5.0%.

TABLE 48

| Dry Concentrate according to Example 24 | |
|---|---|
| Ingredient | Weight Percent of Each Ingredient in Dry Concentrate |
| Dipotassium phosphate | 8.40% |
| Monopotassium phosphate | 84.03% |
| Thickening agent | 2.52% |
| Fluorescent Pigment | 2.10% |
| Corrosion Inhibitor (approximately 40% water) | 1.68% |
| Corrosion Inhibitor | 0.42% |
| Surfactant | 0.84% |
| Water | 0.00% |
| Total Weight of Dry Concentrate | 100% |

In Example 24, the final diluted product 103 was prepared by mixing approximately 1.13 pounds of the dry concentrate in 1 gallon of water. The amounts of the ingredients in the Example 24 final diluted product 103 are listed in Table 49 below. The values in Table 49 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 24 final diluted product 103 is about 5% to 25% by weight in water, preferably about 6% to 23%, more preferably about 7% to 20%. For example, the weight percent of salt in the Example 24 final diluted product 103 is about 11.0%±1.0%.

TABLE 49

| Final Diluted Product according to Example 24 | |
|---|---|
| Ingredient | Weight Percent of Each Ingredient in Final Diluted Product |
| Dipotassium phosphate | 1.00% |
| Monopotassium phosphate | 10.00% |
| Thickening agent | 0.30% |
| Fluorescent Pigment | 0.25% |
| Corrosion Inhibitor (approximately 40% water) | 0.20% |
| Corrosion Inhibitor | 0.05% |
| Surfactant | 0.10% |
| Water | 88.10% |
| Total Weight of Final Diluted Product | 100% |

The density of the final diluted product 103 of Example 24 may be in the range of about 0.8 g/mL to about 1.3 g/mL, for example about 0.9 g/mL to about 1.2 g/mL. The pH of the final diluted product 103 of Example 24 may be in the range of about 5.0 to about 6.0, for example about 5.4. The viscosity of the final diluted product 103 of Example 24 may be in the range of about 200 cP to about 300 cP, for example about 239 cP.

Example 25

In Example 25, a dry concentrate was prepared containing the amounts of ingredients listed in Table 50 below. The values in Table 50 can be varied by ±0.01%, or ±0.05%, or ±0.1%, or ±0.5%, or ±1.0%, or ±1.5%, or ±2%, or 2.5%, or 3.0%, or 3.5%, or 4.0%, or ±4.5%, or 5.0%.

TABLE 50

| Dry Concentrate according to Example 25 | |
|---|---|
| Ingredient | Weight Percent of Each Ingredient in Dry Concentrate |
| Monopotassium phosphate | 92.44% |
| Thickening agent | 2.52% |
| Fluorescent Pigment | 2.10% |
| Corrosion Inhibitor (approximately 40% water) | 1.68% |
| Corrosion Inhibitor | 0.42% |
| Surfactant | 0.84% |
| Water | 0.00% |
| Total Weight of Dry Concentrate | 100% |

In Example 25, the final diluted product 103 was prepared by mixing approximately 1.13 pounds of the dry concentrate in 1 gallon of water. The amounts of the ingredients in the Example 25 final diluted product 103 are listed in Table 51 below. The values in Table 51 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 25 final diluted product 103 is about 5% to 25% by weight in water, preferably about 6% to 23%, more preferably about 7% to 20%. For example, the weight percent of salt in the Example 25 final diluted product 103 is about 11.0%±1.0%.

TABLE 51

| Final Diluted Product according to Example 25 | |
|---|---|
| Ingredient | Weight Percent of Each Ingredient in Final Diluted Product |
| Monopotassium phosphate | 11.00% |
| Thickening agent | 0.30% |
| Fluorescent Pigment | 0.25% |
| Corrosion Inhibitor (approximately 40% water) | 0.20% |
| Corrosion Inhibitor | 0.05% |
| Surfactant | 0.10% |
| Water | 88.10% |
| Total Weight of Final Diluted Product | 100% |

The density of the final diluted product 103 of Example 25 may be in the range of about 0.8 g/mL to about 1.3 g/mL, for example about 0.9 g/mL to about 1.2 g/mL. The pH of the final diluted product 103 of Example 25 may be in the range of about 4.5 to about 5.5, for example about 4.5. The viscosity of the final diluted product 103 of Example 25 may be in the range of about 200 cP to about 300 cP, for example about 239 cP.

Example 26

In Example 26, a dry concentrate was prepared containing the amounts of ingredients listed in Table 52 below. The values in Table 52 can be varied by ±0.01%, or ±0.05%, or ±0.1%, or ±0.5%, or ±1.0%, or ±1.5%, or ±2%, or 2.5%, or 3.0%, or 3.5%, or 4.0%, or ±4.5%, or ±5.0%.

TABLE 52

| Dry Concentrate according to Example 26 | |
|---|---|
| Ingredient | Weight Percent of Each Ingredient in Dry Concentrate |
| Monopotassium phosphate | 18.35% |
| Potassium formate | 73.39% |
| Thickening agent | 2.75% |
| Fluorescent Pigment | 2.29% |
| Corrosion Inhibitor (approximately 40% water) | 1.83% |
| Corrosion Inhibitor | 0.46% |
| Surfactant | 0.92% |
| Water | 0.00% |
| Total Weight of Dry Concentrate | 100% |

In Example 26, the final diluted product 103 was prepared by mixing approximately 1.02 pounds of the dry concentrate in 1 gallon of water. The amounts of the ingredients in the Example 26 final diluted product 103 are listed in Table 53 below. The values in Table 53 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 26 final diluted product 103 is about 5% to 25% by weight in water, preferably about 6% to 23%, more preferably about 7% to 20%. For example, the weight percent of salt in the Example 26 final diluted product 103 is about 10.0%±1.0%.

TABLE 53

| Final Diluted Product according to Example 26 | |
|---|---|
| Ingredient | Weight Percent of Each Ingredient in Final Diluted Product |
| Monopotassium phosphate | 2.00% |
| Potassium formate | 8.00% |
| Thickening agent | 0.30% |
| Fluorescent Pigment | 0.25% |
| Corrosion Inhibitor (approximately 40% water) | 0.20% |
| Corrosion Inhibitor | 0.05% |
| Surfactant | 0.10% |
| Water | 89.10% |
| Total Weight of Final Diluted Product | 100% |

The density of the final diluted product 103 of Example 26 may be in the range of about 0.8 g/mL to about 1.3 g/mL, for example about 0.9 g/mL to about 1.2 g/mL. The pH of the final diluted product 103 of Example 26 may be in the range of about 5.5 to about 6.5, for example about 5.8. The viscosity of the final diluted product 103 of Example 26 may be in the range of about 150 cP to about 250 cP, for example about 214 cP.

Example 27

In Example 27, a dry concentrate was prepared containing the amounts of ingredients listed in Table 54 below. The values in Table 54 can be varied by ±0.01%, or ±0.05%, or ±0.1%, or ±0.5%, or ±1.0%, or ±1.5%, or ±2%, or 2.5%, or 3.0%, or 3.5%, or 4.0%, or ±4.5%, or ±5.0%.

TABLE 54

| Dry Concentrate according to Example 27 | |
|---|---|
| Ingredient | Weight Percent of Each Ingredient in Dry Concentrate |
| Monopotassium phosphate | 18.35% |
| Potassium acetate | 73.39% |
| Thickening agent | 2.75% |
| Fluorescent Pigment | 2.29% |
| Corrosion Inhibitor (approximately 40% water) | 1.83% |
| Corrosion Inhibitor | 0.46% |
| Surfactant | 0.92% |
| Water | 0.00% |
| Total Weight of Dry Concentrate | 100% |

In Example 27, the final diluted product 103 was prepared by mixing approximately 1.02 pounds of the dry concentrate in 1 gallon of water. The amounts of the ingredients in the Example 27 final diluted product 103 are listed in Table 55 below. The values in Table 55 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 27 final diluted product 103 is about 5% to 25% by weight in water, preferably about 6% to 23%, more preferably about 7% to 20%. For example, the weight percent of salt in the Example 27 final diluted product 103 is about 10.0%±1.0%.

TABLE 55

| Final Diluted Product according to Example 27 | |
|---|---|
| Ingredient | Weight Percent of Each Ingredient in Final Diluted Product |
| Monopotassium phosphate | 2.00% |
| Potassium acetate | 8.00% |
| Thickening agent | 0.30% |
| Fluorescent Pigment | 0.25% |
| Corrosion Inhibitor (approximately 40% water) | 0.20% |
| Corrosion Inhibitor | 0.05% |
| Surfactant | 0.10% |
| Water | 89.10% |
| Total Weight of Final Diluted Product | 100% |

The density of the final diluted product 103 of Example 27 may be in the range of about 0.8 g/mL to about 1.3 g/mL, for example about 0.9 g/mL to about 1.2 g/mL. The pH of the final diluted product 103 of Example 27 may be in the range of about 6.0 to about 7.0, for example about 6.3. The viscosity of the final diluted product 103 of Example 27 may be in the range of about 150 cP to about 250 cP, for example about 220 cP.

Example 28

In Example 28, a dry concentrate was prepared containing the amounts of ingredients listed in Table 56 below. The values in Table 56 can be varied by ±0.01%, or ±0.05%, or ±0.1%, or ±0.5%, or ±1.0%, or ±1.5%, or ±2%, or 2.5%, or 3.0%, or 3.5%, or 4.0%, or ±4.5%, or 5.0%.

TABLE 56

| Dry Concentrate according to Example 28 | |
|---|---|
| Ingredient | Weight Percent of Each Ingredient in Dry Concentrate |
| Potassium formate | 22.94% |
| Potassium acetate | 68.81% |
| Thickening agent | 2.75% |
| Fluorescent Pigment | 2.29% |
| Corrosion Inhibitor (approximately 40% water) | 1.83% |
| Corrosion Inhibitor | 0.46% |
| Surfactant | 0.92% |
| Water | 0.00% |
| Total Weight of Dry Concentrate | 100% |

In Example 28, the final diluted product 103 was prepared by mixing approximately 1.02 pounds of the dry concentrate in 1 gallon of water. The amounts of the ingredients in the Example 28 final diluted product 103 are listed in Table 57 below. The values in Table 57 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 28 final diluted product 103 is about 5% to 25% by weight in water, preferably about 6% to 23%, more preferably about 7% to 20%. For example, the weight percent of salt in the Example 28 final diluted product 103 is about 10.0%±1.0%.

TABLE 57

| Final Diluted Product according to Example 28 | |
|---|---|
| Ingredient | Weight Percent of Each Ingredient in Final Diluted Product |
| Potassium formate | 2.50% |
| Potassium acetate | 7.50% |
| Thickening agent | 0.30% |
| Fluorescent Pigment | 0.25% |
| Corrosion Inhibitor (approximately 40% water) | 0.20% |
| Corrosion Inhibitor | 0.05% |
| Surfactant | 0.10% |
| Water | 89.10% |
| Total Weight of Final Diluted Product | 100% |

The density of the final diluted product 103 of Example 28 may be in the range of about 0.8 g/mL to about 1.3 g/mL, for example about 0.9 g/mL to about 1.2 g/mL. The pH of the final diluted product 103 of Example 28 may be in the range of about 8.0 to about 9.0, for example about 8.7. The viscosity of the final diluted product 103 of Example 28 may be in the range of about 150 cP to about 250 cP, for example about 213 cP.

Example 29

In Example 29, a dry concentrate was prepared containing the amounts of ingredients listed in Table 58 below. The values in Table 58 can be varied by ±0.01%, or ±0.05%, or ±0.1%, or ±0.5%, or ±1.0%, or ±1.5%, or ±2%, or 2.5%, or 3.0%, or 3.5%, or 4.0%, or ±4.5%, or 5.0%.

TABLE 58

| Dry Concentrate according to Example 29 | |
|---|---|
| Ingredient | Weight Percent of Each Ingredient in Dry Concentrate |
| Potassium formate | 68.81% |
| Potassium acetate | 22.94% |
| Thickening agent | 2.75% |
| Fluorescent Pigment | 2.29% |
| Corrosion Inhibitor (approximately 40% water) | 1.83% |
| Corrosion Inhibitor | 0.46% |
| Surfactant | 0.92% |
| Water | 0.00% |
| Total Weight of Dry Concentrate | 100% |

In Example 29, the final diluted product 103 was prepared by mixing approximately 1.02 pounds of the dry concentrate in 1 gallon of water. The amounts of the ingredients in the Example 29 final diluted product 103 are listed in Table 59 below. The values in Table 59 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 29 final diluted product 103 is about 5% to 25% by weight in water, preferably about 6% to 23%, more preferably about 7% to 20%. For example, the weight percent of salt in the Example 29 final diluted product 103 is about 10.0%±1.0%.

TABLE 59

| Final Diluted Product according to Example 29 | |
|---|---|
| Ingredient | Weight Percent of Each Ingredient in Final Diluted Product |
| Potassium formate | 7.50% |
| Potassium acetate | 2.50% |
| Thickening agent | 0.30% |
| Fluorescent Pigment | 0.25% |
| Corrosion Inhibitor (approximately 40% water) | 0.20% |
| Corrosion Inhibitor | 0.05% |
| Surfactant | 0.10% |
| Water | 89.10% |
| Total Weight of Final Diluted Product | 100% |

The density of the final diluted product 103 of Example 29 may be in the range of about 0.8 g/mL to about 1.3 g/mL, for example about 0.9 g/mL to about 1.2 g/mL. The pH of the final diluted product 103 of Example 29 may be in the range of about 8.0 to about 9.0, for example about 8.7. The viscosity of the final diluted product 103 of Example 29 may be in the range of about 150 cP to about 250 cP, for example about 215 cP.

Example 30

In Example 30, a dry concentrate was prepared containing the amounts of ingredients listed in Table 60 below. The values in Table 60 can be varied by ±0.01%, or ±0.05%, or ±0.1%, or ±0.5%, or ±1.0%, or ±1.5%, or ±2%, or 2.5%, or 3.0%, or 3.5%, or 4.0%, or ±4.5%, or 5.0%.

TABLE 60

| Dry Concentrate according to Example 30 | |
|---|---|
| Ingredient | Weight Percent of Each Ingredient in Dry Concentrate |
| Potassium acetate | 88.89% |
| Thickening agent | 5.56% |
| Fluorescent Pigment | 2.22% |
| Inorganic Colorant | 0.22% |
| Corrosion Inhibitor (approximately 40% water) | 1.78% |
| Corrosion Inhibitor | 0.44% |
| Surfactant | 0.89% |
| Water | 0.00% |
| Total Weight of Dry Concentrate | 100% |

In Example 30, the final diluted product 103 was prepared by mixing approximately 1.06 pounds of the dry concentrate in 1 gallon of water. The amounts of the ingredients in the Example 30 final diluted product 103 are listed in Table 61 below. The values in Table 61 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 30 final diluted product 103 is about 5% to 25% by weight in water, preferably about 6% to 23%, more preferably about 7% to 20%. For example, the weight percent of salt in the Example 30 final diluted product 103 is about 10.0%±1.0%.

TABLE 61

| Final Diluted Product according to Example 30 | |
|---|---|
| Ingredient | Weight Percent of Each Ingredient in Final Diluted Product |
| Potassium acetate | 10.00% |
| Thickening agent | 0.63% |
| Fluorescent Pigment | 0.25% |
| Inorganic Colorant | 0.03% |
| Corrosion Inhibitor (approximately 40% water) | 0.20% |
| Corrosion Inhibitor | 0.05% |
| Surfactant | 0.10% |
| Water | 88.75% |
| Total Weight of Final Diluted Product | 100% |

The density of the final diluted product 103 of Example 30 may be in the range of about 0.8 g/mL to about 1.3 g/mL, for example about 0.9 g/mL to about 1.2 g/mL. The pH of the final diluted product 103 of Example 30 may be in the range of about 8.0 to about 9.0, for example about 8.6. The viscosity of the final diluted product 103 of Example 30 may be in the range of about 600 cP to about 700 cP, for example about 638 cP.

Example 31

In Example 31, a dry concentrate was prepared containing the amounts of ingredients listed in Table 62 below. The values in Table 62 can be varied by ±0.01%, or ±0.05%, or ±0.1%, or ±0.5%, or ±1.0%, or ±1.5%, or ±2%, or 2.5%, or 3.0%, or 3.5%, or 4.0%, or ±4.5%, or 5.0%.

TABLE 62

| Dry Concentrate according to Example 31 | |
|---|---|
| Ingredient | Weight Percent of Each Ingredient in Dry Concentrate |
| Potassium acetate | 90.29% |
| Thickening agent | 4.06% |
| Fluorescent Pigment | 2.26% |
| Inorganic Colorant | 0.23% |
| Corrosion Inhibitor (approximately 40% water) | 1.81% |
| Corrosion Inhibitor | 0.45% |
| Surfactant | 0.90% |
| Water | 0.00% |
| Total Weight of Dry Concentrate | 100% |

In Example 31, the final diluted product 103 was prepared by mixing approximately 1.04 pounds of the dry concentrate in 1 gallon of water. The amounts of the ingredients in the Example 31 final diluted product 103 are listed in Table 63 below. The values in Table 63 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 31 final diluted product 103 is about 5% to 25% by weight in water, preferably about 6% to 23%, more preferably about 7% to 20%. For example, the weight percent of salt in the Example 31 final diluted product 103 is about 10.0%±1.0%.

TABLE 63

| Final Diluted Product according to Example 31 | |
|---|---|
| Ingredient | Weight Percent of Each Ingredient in Final Diluted Product |
| Potassium acetate | 10.00% |
| Thickening agent | 0.45% |
| Fluorescent Pigment | 0.25% |
| Inorganic Colorant | 0.03% |
| Corrosion Inhibitor (approximately 40% water) | 0.20% |
| Corrosion Inhibitor | 0.05% |
| Surfactant | 0.10% |
| Water | 88.93% |
| Total Weight of Final Diluted Product | 100% |

The density of the final diluted product 103 of Example 31 may be in the range of about 0.8 g/mL to about 1.3 g/mL, for example about 0.9 g/mL to about 1.2 g/mL. The pH of the final diluted product 103 of Example 31 may be in the range of about 8.0 to about 9.0, for example about 8.7. The viscosity of the final diluted product 103 of Example 31 may be in the range of about 150 cP to about 250 cP, for example about 221 cP.

Example 32

In Example 32, a dry concentrate was prepared containing the amounts of ingredients listed in Table 64 below. The values in Table 64 can be varied by ±0.01%, or ±0.05%, or ±0.1%, or ±0.5%, or ±1.0%, or ±1.5%, or ±2%, or 2.5%, or 3.0%, or 3.5%, or 4.0%, or ±4.5%, or ±5.0%.

TABLE 64

| Dry Concentrate according to Example 32 | |
|---|---|
| Ingredient | Weight Percent of Each Ingredient in Dry Concentrate |
| Potassium acetate | 91.41% |
| Thickening agent | 1.44% |
| Thickening agent | 1.44% |
| Fluorescent Pigment | 2.29% |
| Inorganic Colorant | 0.23% |
| Corrosion Inhibitor (approximately 40% water) | 1.83% |
| Corrosion Inhibitor | 0.46% |
| Surfactant | 0.91% |
| Water | 0.00% |
| Total Weight of Dry Concentrate | 100% |

In Example 32, the final diluted product 103 was prepared by mixing approximately 1.03 pounds of the dry concentrate in 1 gallon of water. The amounts of the ingredients in the Example 32 final diluted product 103 are listed in Table 65 below. The values in Table 65 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 32 final diluted product 103 is about 5% to 25% by weight in water, preferably about 6% to 23%, more preferably about 7% to 20%. For example, the weight percent of salt in the Example 32 final diluted product 103 is about 10.0%±1.0%.

TABLE 65

| Final Diluted Product according to Example 32 | |
|---|---|
| Ingredient | Weight Percent of Each Ingredient in Final Diluted Product |
| Potassium acetate | 10.00% |
| Thickening agent | 0.16% |
| Thickening agent | 0.16% |
| Fluorescent Pigment | 0.25% |
| Inorganic Colorant | 0.03% |
| Corrosion Inhibitor (approximately 40% water) | 0.20% |
| Corrosion Inhibitor | 0.05% |
| Surfactant | 0.10% |
| Water | 89.06% |
| Total Weight of Final Diluted Product | 100% |

The density of the final diluted product 103 of Example 32 may be in the range of about 0.8 g/mL to about 1.3 g/mL, for example about 0.9 g/mL to about 1.2 g/mL. The pH of the final diluted product 103 of Example 32 may be in the range of about 8.5 to about 9.5, for example about 8.8. The viscosity of the final diluted product 103 of Example 32 may be in the range of about 800 cP to about 900 cP, for example about 874 cP.

Example 33

In Example 33, a dry concentrate was prepared containing the amounts of ingredients listed in Table 66 below. The values in Table 66 can be varied by ±0.01%, or ±0.05%, or ±0.1%, or ±0.5%, or ±1.0%, or ±1.5%, or ±2%, or 2.5%, or 3.0%, or 3.5%, or 4.0%, or ±4.5%, or 5.0%.

TABLE 66

| Dry Concentrate according to Example 33 | |
|---|---|
| Ingredient | Weight Percent of Each Ingredient in Dry Concentrate |
| Potassium acetate | 93.90% |
| Thickening agent | 2.82% |
| Fluorescent Pigment | 2.35% |
| Surfactant | 0.94% |
| Water | 0.00% |
| Total Weight of Dry Concentrate | 100% |

In Example 33, the final diluted product 103 was prepared by mixing approximately 0.99 pounds of the dry concentrate in 1 gallon of water. The amounts of the ingredients in the Example 33 final diluted product 103 are listed in Table 67 below. The values in Table 67 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 33 final diluted product 103 is about 5% to 25% by weight in water, preferably about 6% to 23%, more preferably about 7% to 20%. For example, the weight percent of salt in the Example 33 final diluted product 103 is about 10.0%±1.0%.

TABLE 67

| Final Diluted Product according to Example 33 | |
|---|---|
| Ingredient | Weight Percent of Each Ingredient in Final Diluted Product |
| Potassium acetate | 10.00% |
| Thickening agent | 0.30% |
| Fluorescent Pigment | 0.25% |
| Surfactant | 0.10% |
| Water | 89.35% |
| Total Weight of Final Diluted Product | 100% |

The density of the final diluted product 103 of Example 33 may be in the range of about 0.8 g/mL to about 1.3 g/mL, for example about 0.9 g/mL to about 1.2 g/mL. The pH of the final diluted product 103 of Example 33 may be in the range of about 7.5 to about 8.5, for example about 8.2. The viscosity of the final diluted product 103 of Example 33 may be in the range of about 150 cP to about 250 cP, for example about 203 cP.

Example 34

In Example 34, a dry concentrate was prepared containing the amounts of ingredients listed in Table 68 below. The values in Table 68 can be varied by ±0.01%, or ±0.05%, or ±0.1%, or ±0.5%, or ±1.0%, or ±1.5%, or ±2%, or 2.5%, or 3.0%, or 3.5%, or 4.0%, or ±4.5%, or 5.0%.

TABLE 68

| Dry Concentrate according to Example 34 | |
|---|---|
| Ingredient | Weight Percent of Each Ingredient in Dry Concentrate |
| Potassium acetate | 91.74% |
| Thickening agent | 2.75% |
| Fluorescent Pigment | 2.29% |
| Corrosion Inhibitor | 2.29% |
| Surfactant | 0.92% |
| Water | 0.00% |
| Total Weight of Dry Concentrate | 100% |

In Example 34, the final diluted product 103 was prepared by mixing approximately 1.02 pounds of the dry concentrate in 1 gallon of water. The amounts of the ingredients in the Example 34 final diluted product 103 are listed in Table 69 below. The values in Table 69 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 34 final diluted product 103 is about 5% to 25% by weight in water, preferably about 6% to 23%, more preferably about 7% to 20%. For example, the weight percent of salt in the Example 34 final diluted product 103 is about 10.0%±1.0%.

TABLE 69

| Final Diluted Product according to Example 34 | |
|---|---|
| Ingredient | Weight Percent of Each Ingredient in Final Diluted Product |
| Potassium acetate | 10.00% |
| Thickening agent | 0.30% |
| Fluorescent Pigment | 0.25% |
| Corrosion Inhibitor | 0.25% |
| Surfactant | 0.10% |
| Water | 89.10% |
| Total Weight of Final Diluted Product | 100% |

The density of the final diluted product 103 of Example 34 may be in the range of about 0.8 g/mL to about 1.3 g/mL, for example about 0.9 g/mL to about 1.2 g/mL. The pH of the final diluted product 103 of Example 34 may be in the range of about 7.5 to about 8.5, for example about 7.9. The viscosity of the final diluted product 103 of Example 34 may be in the range of about 150 cP to about 250 cP, for example about 210 cP.

Example 35

In Example 35, a dry concentrate was prepared containing the amounts of ingredients listed in Table 70 below. The values in Table 70 can be varied by ±0.01%, or ±0.05%, or ±0.1%, or ±0.5%, or ±1.0%, or ±1.5%, or ±2%, or 2.5%, or 3.0%, or 3.5%, or 4.0%, or ±4.5%, or ±5.0%.

TABLE 70

| Dry Concentrate according to Example 35 | |
|---|---|
| Ingredient | Weight Percent of Each Ingredient in Dry Concentrate |
| Potassium acetate | 91.74% |
| Thickening agent | 2.75% |
| Fluorescent Pigment | 2.29% |
| Corrosion Inhibitor | 2.29% |
| Surfactant | 0.92% |
| Water | 0.00% |
| Total Weight of Dry Concentrate | 100% |

In Example 35, the final diluted product 103 was prepared by mixing approximately 1.02 pounds of the dry concentrate in 1 gallon of water. The amounts of the ingredients in the Example 35 final diluted product 103 are listed in Table 71 below. The values in Table 71 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 35 final diluted product 103 is about 5% to 25% by weight in water, preferably about 6% to 23%, more preferably about 7% to 20%. For example, the weight percent of salt in the Example 35 final diluted product 103 is about 10.0%±1.0%.

TABLE 71

| Final Diluted Product according to Example 35 | |
|---|---|
| Ingredient | Weight Percent of Each Ingredient in Final Diluted Product |
| Potassium acetate | 10.00% |
| Thickening agent | 0.30% |
| Fluorescent Pigment | 0.25% |
| Corrosion Inhibitor | 0.25% |
| Surfactant | 0.10% |
| Water | 89.10% |
| Total Weight of Final Diluted Product | 100% |

The density of the final diluted product 103 of Example 35 may be in the range of about 0.8 g/mL to about 1.3 g/mL, for example about 0.9 g/mL to about 1.2 g/mL. The pH of the final diluted product 103 of Example 35 may be in the range of about 7.5 to about 8.5, for example about 7.9. The viscosity of the final diluted product 103 of Example 35 may be in the range of about 150 cP to about 250 cP, for example about 211 cP.

Example 36

In Example 36, a dry concentrate was prepared containing the amounts of ingredients listed in Table 72 below. The values in Table 72 can be varied by ±0.01%, or ±0.05%, or ±0.1%, or ±0.5%, or ±1.0%, or ±1.5%, or ±2%, or 2.5%, or 3.0%, or 3.5%, or 4.0%, or ±4.5%, or 5.0%.

TABLE 72

| Dry Concentrate according to Example 36 | |
|---|---|
| Ingredient | Weight Percent of Each Ingredient in Dry Concentrate |
| Potassium acetate | 79.68% |
| Thickening agent | 1.99% |
| Fluorescent Pigment | 1.99% |
| Corrosion Inhibitor | 15.94% |
| Surfactant | 0.40% |
| Water | 0.00% |
| Total Weight of Dry Concentrate | 100% |

In Example 36, the final diluted product 103 was prepared by mixing approximately 1.20 pounds of the dry concentrate in 1 gallon of water. The amounts of the ingredients in the Example 36 final diluted product 103 are listed in Table 73 below. The values in Table 73 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 36 final diluted product 103 is about 5% to 25% by weight in water, preferably about 6% to 23%, more preferably about 7% to 20%. For example, the weight percent of salt in the Example 36 final diluted product 103 is about 10.0%±1.0%.

TABLE 73

| Final Diluted Product according to Example 36 | |
|---|---|
| Ingredient | Weight Percent of Each Ingredient in Final Diluted Product |
| Potassium acetate | 10.00% |
| Thickening agent | 0.25% |
| Fluorescent Pigment | 0.25% |
| Corrosion Inhibitor | 2.00% |
| Surfactant | 0.05% |
| Water | 87.45% |
| Total Weight of Final Diluted Product | 100% |

The density of the final diluted product 103 of Example 36 may be in the range of about 0.8 g/mL to about 1.3 g/mL, for example about 0.9 g/mL to about 1.2 g/mL. The pH of the final diluted product 103 of Example 36 may be in the range of about 8.0 to about 9.0, for example about 8.35. The viscosity of the final diluted product 103 of Example 36 may be in the range of about 100 cP to about 300 cP, for example about 166 cP.

Example 37

In Example 37, a dry concentrate was prepared containing the amounts of ingredients listed in Table 74 below. The values in Table 74 can be varied by ±0.01%, or ±0.05%, or ±0.1%, or ±0.5%, or ±1.0%, or ±1.5%, or ±2%, or 2.5%, or 3.0%, or 3.5%, or 4.0%, or ±4.5%, or ±5.0%.

TABLE 74

| Dry Concentrate according to Example 37 | |
|---|---|
| Ingredient | Weight Percent of Each Ingredient in Dry Concentrate |
| Potassium bicarbonate | 46.08% |
| Dipotassium phosphate | 46.08% |
| Thickening agent | 2.30% |
| Fluorescent Pigment | 2.30% |
| Corrosion Inhibitor | 1.84% |
| Corrosion Inhibitor | 0.92% |
| Surfactant | 0.46% |
| Water | 0.00% |
| Total Weight of Dry Concentrate | 100% |

In Example 37, the final diluted product 103 was prepared by mixing approximately 1.02 pounds of the dry concentrate in 1 gallon of water. The amounts of the ingredients in the Example 37 final diluted product 103 are listed in Table 75 below. The values in Table 75 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 37 final diluted product 103 is about 5% to 25% by weight in water, preferably about 6% to 23%, more preferably about 7% to 20%. For example, the weight percent of salt in the Example 37 final diluted product 103 is about 10.0%±1.0%.

TABLE 75

| Final Diluted Product according to Example 37 | |
|---|---|
| Ingredient | Weight Percent of Each Ingredient in Final Diluted Product |
| Potassium bicarbonate | 5.00% |
| Dipotassium phosphate | 5.00% |
| Thickening agent | 0.25% |
| Fluorescent Pigment | 0.25% |
| Corrosion Inhibitor | 0.20% |
| Corrosion Inhibitor | 0.10% |
| Surfactant | 0.05% |
| Water | 89.15% |
| Total Weight of Final Diluted Product | 100% |

The density of the final diluted product 103 of Example 37 may be in the range of about 0.8 g/mL to about 1.3 g/mL, for example about 0.9 g/mL to about 1.2 g/mL. The pH of the final diluted product 103 of Example 37 may be in the range of about 8.0 to about 9.0, for example about 8.5. The viscosity of the final diluted product 103 of Example 37 may be in the range of about 150 cP to about 300 cP, for example about 189 cP.

Example 38

In Example 38, a dry concentrate was prepared containing the amounts of ingredients listed in Table 76 below. The values in Table 76 can be varied by ±0.01%, or ±0.05%, or ±0.1%, or ±0.5%, or ±1.0%, or ±1.5%, or ±2%, or 2.5%, or 3.0%, or 3.5%, or 4.0%, or ±4.5%, or ±5.0%.

TABLE 76

| Dry Concentrate according to Example 38 | |
|---|---|
| Ingredient | Weight Percent of Each Ingredient in Dry Concentrate |
| Potassium bicarbonate | 65.12% |
| Dipotassium phosphate | 27.91% |
| Thickening agent | 2.33% |
| Fluorescent Pigment | 2.33% |
| Corrosion Inhibitor | 1.86% |
| Surfactant | 0.47% |
| Water | 0.00% |
| Total Weight of Dry Concentrate | 100% |

In Example 38, the final diluted product 103 was prepared by mixing approximately 1.01 pounds of the dry concentrate in 1 gallon of water. The amounts of the ingredients in the Example 38 final diluted product 103 are listed in Table 77 below. The values in Table 77 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 38 final diluted product 103 is about 5% to 25% by weight in water, preferably about 6% to 23%, more preferably about 7% to 20%. For example, the weight percent of salt in the Example 38 final diluted product 103 is about 10.0%±1.0%.

TABLE 77

| Final Diluted Product according to Example 38 | |
|---|---|
| Ingredient | Weight Percent of Each Ingredient in Final Diluted Product |
| Potassium bicarbonate | 7.00% |
| Dipotassium phosphate | 3.00% |
| Thickening agent | 0.25% |
| Fluorescent Pigment | 0.25% |
| Corrosion Inhibitor | 0.20% |
| Surfactant | 0.05% |
| Water | 89.25% |
| Total Weight of Final Diluted Product | 100% |

The density of the final diluted product 103 of Example 38 may be in the range of about 0.8 g/mL to about 1.3 g/mL, for example about 0.9 g/mL to about 1.2 g/mL. The pH of the final diluted product 103 of Example 38 may be in the range of about 8.0 to about 9.0, for example about 8.6. The viscosity of the final diluted product 103 of Example 38 may be in the range of about 150 cP to about 300 cP, for example about 190 cP.

Example 39

In Example 39, a dry concentrate was prepared containing the amounts of ingredients listed in Table 78 below. The values in Table 78 can be varied by ±0.01%, or ±0.05%, or ±0.1%, or ±0.5%, or ±1.0%, or ±1.5%, or ±2%, or 2.5%, or 3.0%, or 3.5%, or 4.0%, or ±4.5%, or 5.0%.

TABLE 78

| Dry Concentrate according to Example 39 | |
|---|---|
| Ingredient | Weight Percent of Each Ingredient in Dry Concentrate |
| Potassium Acetate | 91.16% |
| Thickening agent | 2.73% |
| Fluorescent Pigment | 2.28% |
| Corrosion Inhibitor | 1.82% |
| Corrosion Inhibitor | 0.64% |
| Oil | 0.91% |
| Surfactant | 0.46% |
| Water | 0.00% |
| Total Weight of Dry Concentrate | 100% |

In Example 39, the final diluted product 103 was prepared by mixing approximately 1.03 pounds of the dry concentrate in 1 gallon of water. The amounts of the ingredients in the Example 39 final diluted product 103 are listed in Table 79 below. The values in Table 79 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 39 final diluted product 103 is about 5% to 25% by weight in water, preferably about 6% to 23%, more preferably about 7% to 20%. For example, the weight percent of salt in the Example 39 final diluted product 103 is about 10.0%±1.0%.

TABLE 79

| Final Diluted Product according to Example 39 | |
|---|---|
| Ingredient | Weight Percent of Each Ingredient in Final Diluted Product |
| Potassium Acetate | 10.00% |
| Thickening agent | 0.30% |
| Fluorescent Pigment | 0.25% |
| Corrosion Inhibitor | 0.20% |
| Corrosion Inhibitor | 0.07% |
| Oil | 0.10% |
| Surfactant | 0.05% |
| Water | 89.03% |
| Total Weight of Final Diluted Product | 100% |

The density of the final diluted product 103 of Example 39 may be in the range of about 0.8 g/mL to about 1.3 g/mL, for example about 0.9 g/mL to about 1.2 g/mL. The pH of the final diluted product 103 of Example 39 may be in the range of about 8.5 to about 9.5, for example about 8.99. The viscosity of the final diluted product 103 of Example 39 may be in the range of about 150 cP to about 300 cP, for example about 226 cP.

Example 40

In Example 40, a dry concentrate was prepared containing the amounts of ingredients listed in Table 80 below. The values in Table 80 can be varied by ±0.01%, or ±0.05%, or ±0.1%, or ±0.5%, or ±1.0%, or ±1.5%, or ±2%, or 2.5%, or 3.0%, or 3.5%, or 4.0%, or ±4.5%, or 5.0%.

TABLE 80

| Dry Concentrate according to Example 40 | |
|---|---|
| Ingredient | Weight Percent of Each Ingredient in Dry Concentrate |
| Potassium bicarbonate | 64.52% |
| Dipotassium phosphate | 27.65% |
| Thickening agent | 2.30% |
| Fluorescent Pigment | 2.30% |
| Corrosion Inhibitor | 1.84% |
| Corrosion Inhibitor | 0.92% |
| Surfactant | 0.46% |
| Water | 0.00% |
| Total Weight of Dry Concentrate | 100% |

In Example 40, the final diluted product 103 was prepared by mixing approximately 1.02 pounds of the dry concentrate in 1 gallon of water. The amounts of the ingredients in the Example 40 final diluted product 103 are listed in Table 81 below. The values in Table 81 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 40 final diluted product 103 is about 5% to 25% by weight in water, preferably about 6% to 23%, more preferably about 7% to 20%. For example, the weight percent of salt in the Example 40 final diluted product 103 is about 10.0%±1.0%.

TABLE 81

| Final Diluted Product according to Example 40 | |
|---|---|
| Ingredient | Weight Percent of Each Ingredient in Final Diluted Product |
| Potassium bicarbonate | 7.00% |
| Dipotassium phosphate | 3.00% |
| Thickening agent | 0.25% |
| Fluorescent Pigment | 0.25% |
| Corrosion Inhibitor | 0.20% |
| Corrosion Inhibitor | 0.10% |
| Surfactant | 0.05% |
| Water | 89.15% |
| Total Weight of Final Diluted Product | 100% |

The density of the final diluted product 103 of Example 40 may be in the range of about 0.8 g/mL to about 1.3 g/mL, for example about 0.9 g/mL to about 1.2 g/mL. The pH of the final diluted product 103 of Example 40 may be in the range of about 8.0 to about 9.0, for example about 8.45. The viscosity of the final diluted product 103 of Example 40 may be in the range of about 150 cP to about 300 cP, for example about 187 cP.

Example 41

In Example 41, a dry concentrate was prepared containing the amounts of ingredients listed in Table 82 below. The values in Table 82 can be varied by ±0.01%, or ±0.05%, or ±0.1%, or ±0.5%, or ±1.0%, or ±1.5%, or ±2%, or 2.5%, or 3.0%, or 3.5%, or 4.0%, or ±4.5%, or ±5.0%.

TABLE 82

| Dry Concentrate according to Example 41 | |
|---|---|
| Ingredient | Weight Percent of Each Ingredient in Dry Concentrate |
| Potassium bicarbonate | 87.95% |
| Dipotassium phosphate | 4.40% |
| Thickening agent | 2.64% |
| Fluorescent Pigment | 2.20% |
| Corrosion Inhibitor | 1.76% |
| Corrosion Inhibitor | 0.62% |
| Surfactant | 0.44% |
| Water | 0.00% |
| Total Weight of Dry Concentrate | 100% |

In Example 41, the final diluted product 103 was prepared by mixing approximately 1.03 pounds of the dry concentrate in 1 gallon of water. The amounts of the ingredients in the Example 41 final diluted product 103 are listed in Table 83 below. The values in Table 83 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 41 final diluted product 103 is about 5% to 25% by weight in water, preferably about 6% to 23%, more preferably about 7% to 20%. For example, the weight percent of salt in the Example 41 final diluted product 103 is about 10.5%±1.0%.

TABLE 83

| Final Diluted Product according to Example 41 | |
|---|---|
| Ingredient | Weight Percent of Each Ingredient in Final Diluted Product |
| Potassium bicarbonate | 10.00% |
| Dipotassium phosphate | 0.50% |
| Thickening agent | 0.30% |
| Fluorescent Pigment | 0.25% |
| Corrosion Inhibitor | 0.20% |
| Corrosion Inhibitor | 0.07% |
| Surfactant | 0.05% |
| Water | 88.63% |
| Total Weight of Final Diluted Product | 100% |

The density of the final diluted product 103 of Example 41 may be in the range of about 0.8 g/mL to about 1.3 g/mL, for example about 0.9 g/mL to about 1.2 g/mL. The pH of the final diluted product 103 of Example 41 may be in the range of about 8.0 to about 9.0, for example about 8.68. The viscosity of the final diluted product 103 of Example 41 may be in the range of about 200 cP to about 400 cP, for example about 254 cP.

Example 42

In Example 42, a dry concentrate was prepared containing the amounts of ingredients listed in Table 84 below. The values in Table 84 can be varied by ±0.01%, or ±0.05%, or ±0.1%, or ±0.5%, or ±1.0%, or ±1.5%, or ±2%, or 2.5%, or 3.0%, or 3.5%, or 4.0%, or ±4.5%, or 5.0%.

TABLE 84

| Dry Concentrate according to Example 42 | |
|---|---|
| Ingredient | Weight Percent of Each Ingredient in Dry Concentrate |
| MAP | 86.56% |
| Tripotassium citrate | 4.56% |
| Corrosion Inhibitor | 2.73% |
| Thickening agent | 3.19% |
| Fluorescent Pigment | 2.28% |
| Inorganic pigment | 0.23% |
| Surfactant | 0.46% |
| Water | 0.00% |
| Total Weight of Dry Concentrate | 100% |

In Example 42, the final diluted product 103 was prepared by mixing approximately 1.03 pounds of the dry concentrate in 1 gallon of water. The amounts of the ingredients in the Example 42 final diluted product 103 are listed in Table 85 below. The values in Table 85 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 42 final diluted product 103 is about 5% to 25% by weight in water, preferably about 6% to 23%, more preferably about 7% to 20%. For example, the weight percent of salt in the Example 42 final diluted product 103 is about 10.0%±1.0%.

TABLE 85

| Final Diluted Product according to Example 42 | |
|---|---|
| Ingredient | Weight Percent of Each Ingredient in Final Diluted Product |
| MAP | 9.50% |
| Tripotassium citrate | 0.50% |
| Corrosion Inhibitor | 0.30% |
| Thickening agent | 0.35% |
| Fluorescent Pigment | 0.25% |
| Inorganic pigment | 0.03% |
| Surfactant | 0.05% |
| Water | 89.03% |
| Total Weight of Final Diluted Product | 100% |

The density of the final diluted product 103 of Example 42 may be in the range of about 0.8 g/mL to about 1.3 g/mL, for example about 0.9 g/mL to about 1.2 g/mL. The pH of the final diluted product 103 of Example 42 may be in the range of about 4.0 to about 6.0, for example about 5.0. The viscosity of the final diluted product 103 of Example 42 may be in the range of about 200 cP to about 400 cP, for example about 245 cP.

Example 43

In Example 43, a dry concentrate was prepared containing the amounts of ingredients listed in Table 86 below. The values in Table 86 can be varied by ±0.01%, or ±0.05%, or ±0.1%, or ±0.5%, or ±1.0%, or ±1.5%, or ±2%, or 2.5%, or 3.0%, or 3.5%, or 4.0%, or ±4.5%, or 5.0%.

TABLE 86

| Dry Concentrate according to Example 43 | |
|---|---|
| Ingredient | Weight Percent of Each Ingredient in Dry Concentrate |
| MAP | 72.89% |
| Tripotassium citrate | 18.22% |
| Corrosion Inhibitor | 2.73% |
| Thickening agent | 3.19% |
| Fluorescent Pigment | 2.28% |
| Inorganic pigment | 0.23% |
| Surfactant | 0.46% |
| Water | 0.00% |
| Total Weight of Dry Concentrate | 100% |

In Example 43, the final diluted product 103 was prepared by mixing approximately 1.03 pounds of the dry concentrate in 1 gallon of water. The amounts of the ingredients in the Example 43 final diluted product 103 are listed in Table 87 below. The values in Table 87 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 43 final diluted product 103 is about 5% to 25% by weight in water, preferably about 6% to 23%, more preferably about 7% to 20%. For example, the weight percent of salt in the Example 43 final diluted product 103 is about 10.0%±1.0%.

TABLE 87

| Final Diluted Product according to Example 43 | |
|---|---|
| Ingredient | Weight Percent of Each Ingredient in Final Diluted Product |
| MAP | 8.00% |
| Tripotassium citrate | 2.00% |
| Corrosion Inhibitor | 0.30% |
| Thickening agent | 0.35% |
| Fluorescent Pigment | 0.25% |
| Inorganic pigment | 0.03% |
| Surfactant | 0.05% |
| Water | 89.03% |
| Total Weight of Final Diluted Product | 100% |

The density of the final diluted product 103 of Example 43 may be in the range of about 0.8 g/mL to about 1.3 g/mL, for example about 0.9 g/mL to about 1.2 g/mL. The pH of the final diluted product 103 of Example 43 may be in the range of about 5.0 to about 7.0, for example about 5.6. The viscosity of the final diluted product 103 of Example 43 may be in the range of about 200 cP to about 400 cP, for example about 262 cP.

Example 44

In Example 44, a dry concentrate was prepared containing the amounts of ingredients listed in Table 88 below. The values in Table 88 can be varied by ±0.01%, or ±0.05%, or ±0.1%, or ±0.5%, or ±1.0%, or ±1.5%, or ±2%, or 2.5%, or 3.0%, or 3.5%, or 4.0%, or ±4.5%, or 5.0%.

TABLE 88

| Dry Concentrate according to Example 44 | |
|---|---|
| Ingredient | Weight Percent of Each Ingredient in Dry Concentrate |
| MAP | 8.35% |
| Tripotassium citrate | 83.51% |
| Corrosion Inhibitor | 2.51% |
| Thickening agent | 2.92% |
| Fluorescent Pigment | 2.09% |
| Inorganic pigment | 0.21% |
| Surfactant | 0.42% |
| Water | 0.00% |
| Total Weight of Dry Concentrate | 100% |

In Example 44, the final diluted product 103 was prepared by mixing approximately 1.14 pounds of the dry concentrate in 1 gallon of water. The amounts of the ingredients in the Example 44 final diluted product 103 are listed in Table 89 below. The values in Table 89 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 44 final diluted product 103 is about 5% to 25% by weight in water, preferably about 6% to 23%, more preferably about 7% to 20%. For example, the weight percent of salt in the Example 44 final diluted product 103 is about 11.0%±1.0%.

TABLE 89

| Final Diluted Product according to Example 44 | |
|---|---|
| Ingredient | Weight Percent of Each Ingredient in Final Diluted Product |
| MAP | 1.00% |
| Tripotassium citrate | 10.00% |
| Corrosion Inhibitor | 0.30% |
| Thickening agent | 0.35% |
| Fluorescent Pigment | 0.25% |
| Inorganic pigment | 0.03% |
| Surfactant | 0.05% |
| Water | 88.03% |
| Total Weight of Final Diluted Product | 100% |

The density of the final diluted product 103 of Example 44 may be in the range of about 0.8 g/mL to about 1.3 g/mL, for example about 0.9 g/mL to about 1.2 g/mL. The pH of the final diluted product 103 of Example 44 may be in the range of about 6.5 to about 7.5, for example about 6.9. The viscosity of the final diluted product 103 of Example 44 may be in the range of about 200 cP to about 400 cP, for example about 267 cP.

Example 45

In Example 45, a dry concentrate was prepared containing the amounts of ingredients listed in Table 90 below. The values in Table 90 can be varied by ±0.01%, or ±0.05%, or ±0.1%, or ±0.5%, or ±1.0%, or ±1.5%, or ±2%, or 2.5%, or 3.0%, or 3.5%, or 4.0%, or ±4.5%, or 5.0%.

TABLE 90

| Dry Concentrate according to Example 45 | |
|---|---|
| Ingredient | Weight Percent of Each Ingredient in Dry Concentrate |
| $MgCl_2$ anhydrous | 46.00% |
| Potassium acetate | 46.00% |
| Thickening agent | 2.76% |
| Fluorescent Pigment | 2.30% |
| Corrosion inhibitor | 2.48% |
| Surfactant | 0.46% |
| Water | 0.00% |
| Total Weight of Dry Concentrate | 100% |

In Example 45, the final diluted product 103 was prepared by mixing approximately 1.01 pounds of the dry concentrate in 1 gallon of water. The amounts of the ingredients in the Example 45 final diluted product 103 are listed in Table 91 below. The values in Table 91 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 45 final diluted product 103 is about 5% to 25% by weight in water, preferably about 6% to 23%, more preferably about 7% to 20%. For example, the weight percent of salt in the Example 44 final diluted product 103 is about 10.0%±1.0%.

TABLE 91

Final Diluted Product according to Example 45

| Ingredient | Weight Percent of Each Ingredient in Final Diluted Product |
|---|---|
| $MgCl_2$ anhydrous | 5.00% |
| Potassium acetate | 5.00% |
| Thickening agent | 0.30% |
| Fluorescent Pigment | 0.25% |
| Corrosion inhibitor | 0.27% |
| Surfactant | 0.05% |
| Water | 89.13% |
| Total Weight of Final Diluted Product | 100% |

The density of the final diluted product 103 of Example 45 may be in the range of about 0.8 g/mL to about 1.3 g/mL, for example about 0.9 g/mL to about 1.2 g/mL. The pH of the final diluted product 103 of Example 45 may be in the range of about 8.5 to about 9.5, for example about 9.1. The viscosity of the final diluted product 103 of Example 45 may be in the range of about 200 cP to about 400 cP, for example about 223 cP.

Example 46

In Example 46, a dry concentrate was prepared containing the amounts of ingredients listed in Table 92 below. The values in Table 92 can be varied by ±0.01%, or ±0.05%, or ±0.1%, or ±0.5%, or ±1.0%, or ±1.5%, or ±2%, or 2.5%, or 3.0%, or 3.5%, or 4.0%, or ±4.5%, or 5.0%.

TABLE 92

Dry Concentrate according to Example 46

| Ingredient | Weight Percent of Each Ingredient in Dry Concentrate |
|---|---|
| $MgCl_2$ anhydrous | 9.20% |
| Potassium acetate | 82.80% |
| Thickening agent | 2.76% |
| Fluorescent Pigment | 2.30% |
| Corrosion inhibitor | 2.48% |
| Surfactant | 0.46% |
| Water | 0.00% |
| Total Weight of Dry Concentrate | 100% |

In Example 46, the final diluted product 103 was prepared by mixing approximately 1.01 pounds of the dry concentrate in 1 gallon of water. The amounts of the ingredients in the Example 46 final diluted product 103 are listed in Table 93 below. The values in Table 93 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 46 final diluted product 103 is about 5% to 25% by weight in water, preferably about 6% to 23%, more preferably about 7% to 20%. For example, the weight percent of salt in the Example 46 final diluted product 103 is about 10.0%±1.0%.

TABLE 93

Final Diluted Product according to Example 46

| Ingredient | Weight Percent of Each Ingredient in Final Diluted Product |
|---|---|
| $MgCl_2$ anhydrous | 1.00% |
| Potassium acetate | 9.00% |
| Thickening agent | 0.30% |
| Fluorescent Pigment | 0.25% |
| Corrosion inhibitor | 0.27% |
| Surfactant | 0.05% |
| Water | 89.13% |
| Total Weight of Final Diluted Product | 100% |

The density of the final diluted product 103 of Example 46 may be in the range of about 0.8 g/mL to about 1.3 g/mL, for example about 0.9 g/mL to about 1.2 g/mL. The pH of the final diluted product 103 of Example 46 may be in the range of about 8.5 to about 9.5, for example about 9.2. The viscosity of the final diluted product 103 of Example 46 may be in the range of about 150 cP to about 400 cP, for example about 209 cP.

Example 47

In Example 47, a dry concentrate was prepared containing the amounts of ingredients listed in Table 94 below. The values in Table 94 can be varied by ±0.01%, or ±0.05%, or ±0.1%, or ±0.5%, or ±1.0%, or ±1.5%, or ±2%, or 2.5%, or 3.0%, or 3.5%, or 4.0%, or ±4.5%, or 5.0%.

TABLE 94

Dry Concentrate according to Example 47

| Ingredient | Weight Percent of Each Ingredient in Dry Concentrate |
|---|---|
| $MgCl_2$ anhydrous | 64.40% |
| Potassium acetate | 27.60% |
| Thickening agent | 2.76% |
| Fluorescent Pigment | 2.30% |
| Corrosion inhibitor | 2.48% |
| Surfactant | 0.46% |
| Water | 0.00% |
| Total Weight of Dry Concentrate | 100% |

In Example 47, the final diluted product 103 was prepared by mixing approximately 1.02 pounds of the dry concentrate in 1 gallon of water. The amounts of the ingredients in the Example 47 final diluted product 103 are listed in Table 95 below. The values in Table 95 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 47 final diluted product 103 is about 5% to 25% by weight in water, preferably about 6% to 23%, more preferably about 7% to 20%. For example, the weight percent of salt in the Example 47 final diluted product 103 is about 10.0%±1.0%.

TABLE 95

| Final Diluted Product according to Example 47 | |
|---|---|
| Ingredient | Weight Percent of Each Ingredient in Final Diluted Product |
| $MgCl_2$ anhydrous | 7.00% |
| Potassium acetate | 3.00% |
| Thickening agent | 0.30% |
| Fluorescent Pigment | 0.25% |
| Corrosion inhibitor | 0.27% |
| Surfactant | 0.05% |
| Water | 89.13% |
| Total Weight of Final Diluted Product | 100% |

The density of the final diluted product 103 of Example 47 may be in the range of about 0.8 g/mL to about 1.3 g/mL, for example about 0.9 g/mL to about 1.2 g/mL. The pH of the final diluted product 103 of Example 47 may be in the range of about 8.0 to about 9.0, for example about 8.6. The viscosity of the final diluted product 103 of Example 47 may be in the range of about 150 cP to about 400 cP, for example about 218 cP.

Methods of Use

The forest fire retardant compositions of Examples 1-47 may be long-term forest fire retardants and meet one or more of the requirements specified by the Forest Service for long-term fire retardants in Specification 5100-304d (Jan. 7, 2020). For example, the final diluted composition 103 and/or 202 of Examples 1-47 preferably have a viscosity of between about 150 to about 400 cP, or between about 401 to about 800 cP, or between about 801 and about 1500 cP. The final diluted composition 103 and/or 202 of Examples 1-47 preferably have an aluminum corrosion of less than about 2.0 mils/year, preferably less than about 1.0 mils/year, and more preferably less than about 0.5 mils/year. The final diluted composition 103 and/or 202 of Examples 1-47 may also preferably have a steel/iron corrosion of less than about 5.0 mils/year, preferably less than about 4.0 mils/year, more preferably less than about 3.0 mils/year. The final diluted composition 103 and/or 202 of Examples 1-47 may also preferably have a brass corrosion of less than about 5.0 mils/year, preferably less than about 4.0 mils/year, more preferably less than about 3.0 mils/year. The final diluted composition 103 and/or 202 of Examples 1-47 may also preferably have a magnesium corrosion of less than about 4.0 mils/year, preferably less than about 3.0 mils/year, more preferably less than about 2.0 mils/year. The dry concentrates 101 and/or liquid concentrates 102 of Examples 1-47 preferably have a $LC_{50}$ value of greater than about 200 mg/L, preferably greater than about 400 mg/L, more preferably greater than about 1000 mg/L, more preferably greater than 1500 mg/L.

The forest fire retardant compositions of Examples 1-47 may be used to suppress, retard, or contain a forest fire. The forest fire retardant compositions of Examples 1-47 may form a protective char layer, thereby interfering with the burning process by reducing the amount of energy available for the spread of fire through energy absorption. The forest fire retardant compositions of Examples 1-47 are also deliquescent, absorbing sufficient moisture from the air to form an aqueous solution. The critical relative humidity of potassium salts disclosed herein are listed in Table 96 below. The values in Table 96 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%.

TABLE 96

| Critical Relative Humidity | |
|---|---|
| Retardant Compound | Critical Relative Humidity |
| Potassium Acetate | 23% |
| Potassium formate | 16% |
| Potassium carbonate | 44% |
| Potassium Phosphate | 80% |
| Magnesium Chloride hexahydrate | 32% |

The larger the difference between the relative humidity of the atmosphere and the critical relative humidity, the faster the water is rehydrated. Generally, the relative humidity on a wildland fire is lowest during the day and recovers during the night. In moderate burning condition, the nighttime relative humidity recovery will rise to 50%-70%. When the critical relative humidity of a retardant formulation is lower than the relative humidity the retardant will absorb moisture from the environment. This is an environmental condition that can occur at night or in early mornings on wildfires, thereby allowing the forest fire retardant compositions of Examples 1-47 to absorb moisture from the air and pull it in to the fuel bed leading to its improved forest fire retardant capabilities. In some embodiments hydrates may form, wherein water molecules are coordinate to salt species in the retardant. As a flame front of a wildfire approaches the retardant, water in the fuels and retardant (both free and coordinated) will be driven off in the form of water vapor. This evaporation process both absorbs energy and cools the flame front and also will dilute the combustion gas near the flame front.

The forest fire retardant compositions of Examples 1-47 may also rely on a vapor phase radical quenching process. The vapor phase radical quenching process reduces combustion radicals in the flame front. By quenching combustion radicals, the system is cooled and the flames are suppressed. The potassium radicals quench combustion radicals normally active in the rapid chain reaction that occurs in the flame front. Thus, the potassium radicals quench the chemical reaction occurring within the flame and either extinguish the fire or slow the spread of the fire such that there is increased escape time or increased time to attempt other means of fire extinction.

In some embodiments the fire retardant compositions of examples 1-47 may also result in an intumescent mechanism, whereby the reactions at the flame front cause a significant char to form, which separates the flame from the underlying fuel and slows the rate of heat transfer.

Direct Attack

In a direct attack, the final diluted composition 103 and/or 202 is applied on the flame front. The final diluted composition 103 and/or 202 is a thickened water retardant which contains water to cool and suppress the fire. Under heat attack from a wildland fire, water in the retardant composition will evaporate to cool and dilute the gases in the flame front, potassium radicals will be released and participate in radical deactivation of the combustion plasma, and for some embodiments a significant char will be formed that will insulate the fuels from the flame front and slow heat transfer. The combination of these mechanisms will result in extinguishing or significant slowing of wildfire in the treated areas.

Indirect Attack

In an indirect attack, the final diluted composition 103 and/or 202 is applied in fire containment lines at a significant distance from the fire line. The indirect fire lines are built, and the fire is allowed to burn into them. The long-term fire retardant must be effective even after the water in the composition has evaporated. In an indirect attack, the final diluted composition 103 and/or 202 is applied to vegetation. The final diluted composition 103 and/or 202 may be hygroscopic and self-rehydrating. As the water in the final diluted composition 103 and/or 202 evaporates, the salt concentration increases until it reaches its saturation level. In some embodiments, when fire the retardant composition dries the fire retardant salts will form salt hydrate complexes wherein water molecules are coordinated to the salt species. Coordinated water in these salt hydrates will need to be driven off by heat, which will result in cooling and dilution of the flame front should a wildfire approach.

Field Handling and Measurement

The forest fire retardant composition of Examples 1-3, 6-19, and 21-47 can be delivered to the field either as the dry concentrate 101, liquid concentrate 102, or as the final diluted composition 103 and/or 202. The forest fire retardant composition of Example 4-5 and 20 can be delivered to the field either as the liquid concentrate 201 or as the final diluted composition 202. The final diluted compositions 103 and/or 202 of Examples 1-47 can be tested prior to application in the field to confirm proper salt content and/or proper N/P molar ratio. A refractometer can be used to test the salt content. Density can also be used to determine the salt content.

Field Mixing Procedures and Ratios

Batch preparation of final diluted composition 202 may be accomplished by slowly feeding the liquid concentrate into a well-stirred mix tank containing a predetermined amount of water. Mix tank agitation may be provided via an overhead mechanical stirring apparatus or alternatively by a circulation pump sized to provide turbulent mixing. Stir until the concentrate is uniformly mixed into the water. Alternatively, the final diluted composition 202 may be mixed using continuous mixing equipment.

Aerial Application

The final diluted composition 103 and/or 202 may be deposited via aerial application from an airplane or helicopter. The airplane may be a fixed-wing multi-engine aircraft, a fixed-wing single engine airtanker (SEAT), a large airtanker (LAT), a very large airtanker (VLAT), or an unmanned aircraft system (UAS). The helicopter may be a fixed-tank helicopter (HF) or it may be a helicopter bucket (HB). The final diluted composition 103 and/or 202 may be deposited in an indirect attack to build a retardant line before a forest fire or directly to a forest fire via aerial application.

In a preferred embodiment, the forest fire retardant compositions of Examples 1-47 may be applied at a coverage level from 1 (gal/100 $ft^2$) to greater than 6 (gal/100 $ft^2$) per USFS guidance as indicated in the USFS Coverage Levels, Ann Suter, Wildland Fire Chemical Systems—MTDC revised Nov. 2, 2006 (available at https://www.fs.fed.us/rm/fire/pubs/pdfpubs/user_gd/ug-06.pdf), which is hereby incorporated by reference in its entirety. For example, the forest fire retardant compositions of Examples 1-47 may be applied at a coverage level 4 Alternatively, the forest fire retardant compositions of Examples 1-47 may be applied at a coverage level of 1, 2, or 3. Alternatively, the forest fire retardant compositions of Examples 1-47 may be applied at a coverage level or 6 or greater than 6.

Ground Application

The final diluted composition 103 and/or 202 may be deposited via ground application from a truck or ground engine (G), sprayers carried by off-road vehicles, garden sprayers, or back-pack style sprayers. The final diluted composition 103 and/or 202 may be deposited in an indirect attack to build a retardant line or protect fuels and structure before a forest fire or it may be deposited directly to a forest fire via ground application.

Clean Up Procedure

The dry concentrate 101 can be cleaned by broom and/or vacuum. The dry concentrate 101 should be kept dry during cleaning to minimize color staining that may occur when the dye is hydrated. When the dry concentrate 101 is exposed to water, the product can be cleaned with the use of a granular chemical absorbent material, or if proper drainage is available, by rinsing surfaces clean with adequate amounts of water. Dye coloration may be removed from surfaces by treatment with liquid or dry detergent. The final diluted composition 103 can be cleaned with soap or liquid detergent and water. The color of the dye can be neutralized by sodium hypochlorite or washed with liquid detergent.

The liquid concentrate 201 can be cleaned by flushing with water and capturing the rinse in a tank or disposal container via drains. The liquid concentrate 201 and the final diluted composition 202 can be cleaned with soap or liquid detergent and water. The color of the dye can be neutralized by a bleaching agent such as sodium hypochlorite or washed with liquid detergent.

Corrosion Testing

In a preferred embodiment, the final diluted composition 103 and/or 202 would meet the corrosion specifications of Specification 5100-304d (Jan. 7, 2020) for aluminum, steel, and brass. For example, in a preferred embodiment the aluminum corrosion is less than about 2.0 mils/year, preferably less than about 1.0 mils/year, and more preferably less than about 0.5 mils/year. In a preferred embodiment, the steel corrosion is less than about 5.0 mils/year, preferably less than about 4.0 mils/year, more preferably less than about 3.0 mils/year. In a preferred embodiment, the brass corrosion is less than about 5.0 mils/year, preferably less than about 4.0 mils/year, more preferably less than about 3.0 mils/year.

In another embodiment, diluted composition 103 and/or 202 would meet the corrosion specifications of Specification 5100-304d (Jan. 7, 2020) for magnesium (only required for fixed tank helicopter applications). For example, the magnesium corrosion is less than about 4.0 mils/year, preferably less than about 3.0 mils/year, more preferably less than about 2.0 mils/year.

Toxicity Testing

In a preferred embodiment, the forest fire retardant compositions of Examples 1-47 would exhibit low toxicity under the USDA Forest Service Standard Test Procedure STP-1.5-Fish Toxicity (available at https://www.fs.usda.gov/rm/fire/wfcs/tests/stp01_5.htm) and the U.S. Environmental Protection Agency, Office of Prevention, Pesticides, and Toxic Substances. Fish Acute Toxicity Test, Freshwater and Marine; 850.1075, both incorporated herein by reference in its entirety. For example, in a preferred embodiment the $LC_{50}$ values for the forest fire retardant compositions of Examples 1-47 is greater than about 200 mg/L, preferably greater than about 400 mg/L, more preferably greater than about 1000 mg/L, more preferably greater than 1500 mg/L.

Combustion Retarding Effectiveness Testing

In a preferred embodiment, the final diluted composition 103 and/or 202 would meet the required retarding salt concentration specifications of Specification 5100-304d Section 3.6.2 (Jan. 7, 2020) in any burn tests. For example, the final diluted composition 103 and/or 202 exhibits a reduction index greater or equal to the reduction index of 10.6% diammonium phosphate (DAP).

CONCLUSION

All parameters, dimensions, materials, and configurations described herein are meant to be exemplary and the actual parameters, dimensions, materials, and/or configurations will depend upon the specific application or applications for which the inventive teachings is/are used. It is to be understood that the foregoing embodiments are presented primarily by way of example and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein.

In addition, any combination of two or more such features, systems, articles, materials, kits, and/or methods, if such features, systems, articles, materials, kits, and/or methods are not mutually inconsistent, is included within the inventive scope of the present disclosure. Other substitutions, modifications, changes, and omissions may be made in the design, operating conditions and arrangement of respective elements of the exemplary implementations without departing from the scope of the present disclosure. The use of a numerical range does not preclude equivalents that fall outside the range that fulfill the same function, in the same way, to produce the same result.

Also, various inventive concepts may be embodied as one or more methods, of which at least one example has been provided. The acts performed as part of the method may in some instances be ordered in different ways. Accordingly, in some inventive implementations, respective acts of a given method may be performed in an order different than specifically illustrated, which may include performing some acts simultaneously (even if such acts are shown as sequential acts in illustrative embodiments).

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

In the claims, as well as in the specification, any ingredient listed in an open-ended list of ingredients shall not be negated or avoided by the addition of water or other solvent or reactant that might cause a chemical change to such ingredient. Thus, for example, even though it is known that an anhydrous salt becomes hydrated in the presence of water, the inventors hereby act as their own lexicographers, so that any composition "including" or "comprising" an "anhydrous" salt is intended to cover both a dry composition substantially free of water in which the salt has substantially no water of hydration, as well as any wet composition formed by the addition of water which causes the anhydrous salt to become hydrated (or to undergo some other change). Both before and after the addition of water or other ingredient, the composition shall be regarded, for purposes of the specification and claims, as comprising an "anhydrous" salt irrespective of any hydration, solvation, or other change caused by the addition of water or other ingredient. The same applies for any ingredient recited in an open-ended list which might be chemically changed by the addition of water or other ingredient to the open-ended list.

The invention claimed is:

1. A forest fire retardant composition, comprising:

a retardant compound comprising potassium bicarbonate;

a corrosion inhibitor for at least one of iron, brass, aluminum, or magnesium, present in the composition in an amount having a weight percent of about 0.05% to about 25% relative to the weight of the retardant compound in the composition;

a thickening agent, present in the composition in an amount having a weight percent of about 0.4% to about 25% relative to the weight of the retardant compound in the composition; and a colorant, present in the composition in an amount having a weight percent of about 0.3% to about 10% relative to the weight of the retardant compound in the composition;

wherein the potassium bicarbonate is present in the composition in an amount having a weight percent of about 45% to about 99.5% relative to the total weight of the composition.

2. The composition of claim 1, wherein the retardant compound further comprises at least one of dipotassium phosphate, diammonium phosphate, diammonium orthophosphate, disodium phosphate, disodium phosphate hydrate, sodium tripolyphosphate, or trisodium phosphate.

3. The composition of claim 1, wherein the retardant compound further comprises at least one of potassium acetate or potassium acetate hydrate.

4. The composition of claim 1, wherein the corrosion inhibitor comprises at least one of an azole, an alkyl amine, iron pyrophosphate, or disodium molybdate.

5. The composition of claim 1, wherein the thickening agent comprises at least one of a polyurethane, a polyvinyl alcohol, an acrylic polymer, a gum, a cellulosic, a sulfonate, a saccharide, a clay, an organosilicone, or a protein.

6. The composition of claim 1, wherein the thickening agent comprises at least one polysaccharide gum.

7. The composition of claim 1, wherein the colorant comprises at least one a red dye, an orange dye, a purple dye, a pink dye, Iron Oxide, Iron Oxide Black, or a fluorescent pigment.

8. The composition of claim 1, further comprising a buffering agent.

9. The composition of claim 8, wherein the buffering agent is present in the composition in a weight percent of about 1.0% to about 30% relative to the weight of the retardant compound in the composition.

10. The composition of claim 8, wherein the buffering agent comprises at least one of an organic amine, a strong acid, a weak acid, a strong base, a weak base, triethanolamine ($C_6H_{15}NO_3$), low freeze grade triethanolamine, diethanolamine, monoethanolamine, tris(hydroxymethyl) aminomethane, N,N,N',N'-Tetrakis(2-hydroxyethyl)ethylenediamine, tris(hydroxymethyl)aminomethane, tris(hydroxymethyl)aminomethane hydrochloride, ethylenediamine tetraacetic acid, ethylene diamine, piperidine, pyrrolidine, DABCO, N-methyl pyrrolidine, N-methylpyrrolidone, quinuclidine, diisoropryopylamine, diisopropylmethylamine, methyl piperidine, N-[tris(hydroxymethyl) methyl]glycine, 3-dimethylamino-1-propanol, or 3-(diethylamino)-1,2, propanediol, monosodium phosphate, disodium phosphate, disodium phosphate hydrate(s), trisodium phosphate, monopotassium phosphate, dipotassium phosphate, dipotassium phosphate hydrate(s), tripotassium phosphate, tripotassium phosphate hydrate(s), monoammonium phosphate, diammonium phosphate, triammonium phosphate, triammonium phosphate hydrate(s), sodium ammonium phosphate, sodium ammonium phosphate hydrate, monopotassium citrate ($KH_2C_6H_5O_7$), potassium gluconate ($C_6H_{11}KO_7$), dipotassium citrate ($C_6H_6K_2O_7$), tripotassium citrate ($K_3C_6H_5O_7$), or tripotassium citrate monohydrate ($K_3C_6H_5O_7(H_2O)_l$).

11. The composition of claim 1, further comprising at least one of a spoilage inhibitor, an anti-caking agent, a flow conditioner, an anti-foaming agent, a foaming agent, a stability additive, a biocide, a second thickening agent, a surfactant, an adjuvant, a second corrosion inhibitor, an opacifier, a second colorant, a liquid carrier, or a deduster.

12. The composition of claim 1, wherein the composition is a dry concentrate having no more than about 3% by weight of water relative to the total weight of the dry concentrate.

13. The composition of claim 12, wherein the potassium bicarbonate is present in the dry concentrate in an amount having a weight percent of about 64% to about 98.5% relative to the total weight of the dry concentrate.

14. A final diluted product formed by diluting the composition of claim 1 with water;

wherein:

the final diluted product is intended for use to suppress, retard, or contain forest fires; and the retardant compound is present in the final diluted product in an amount having a weight percent of about 4% to about 30% relative to the total weight of the final diluted product.

15. The composition of claim 14, wherein:

the final diluted product is a long-term fire retardant;

the long-term fire retardant has a viscosity between 150 cP and 1500 cP; and the long-term fire retardant does not exceed a corrosion rate of 2.0 mils-per-year for aluminum, 5.0 mils-per-year for iron, and 5.0 mils-per-year for brass.

16. The composition of claim 15, wherein the long-term fire retardant does not exceed a corrosion rate of 4.0 mils-per-year for magnesium.

17. The composition of claim 15, wherein the viscosity is between 150 cP and 400 cP.

18. The composition of claim 15, wherein the viscosity is between 401 cP and 800 cP.

19. The composition of claim 15, wherein the viscosity is between 801 cP and 1500 cP.

20. A method of combating a forest fire, the method comprising:

depositing, via aerial or ground-based application, the forest fire retardant composition of claim 14, wherein the step of depositing comprises at least one of (a) a direct attack on the forest fire or (b) an indirect attack before the forest fire.

21. The method of claim 20, wherein the step of depositing is performed via aerial application from an airplane or helicopter.

22. The method of claim 20, wherein the step of depositing is performed via ground application from a truck.

23. The method of claim 20, wherein the retardant compound further comprises at least one of dipotassium phosphate, diammonium phosphate, diammonium orthophosphate, disodium phosphate, disodium phosphate hydrate, sodium tripolyphosphate, or trisodium phosphate.

24. The method of claim 20, wherein the retardant compound further comprises at least one of one of potassium acetate or potassium acetate hydrate.

25. The method of claim 20, wherein the forest fire retardant composition further comprises a buffering agent.

26. The method of claim 20, wherein:

the forest fire retardant composition comprises a long-term fire retardant;

the long-term fire retardant has a viscosity between 150 cP and 1500 cP; and the long-term fire retardant does not exceed a corrosion rate of 2.0 mils-per-year for aluminum, 5.0 mils-per-year for iron, and 5.0 mils-per-year for brass.

27. The method of claim 26, wherein the long-term fire retardant does not exceed a corrosion rate of 4.0 mils-per-year for magnesium.

28. The method of claim 26, wherein the viscosity is between 150 cP and 400 cP.

29. The method of claim 26, wherein the viscosity is between 401 cP and 800 cP.

30. The method of claim 26, wherein the viscosity is between 801 cP and 1500 cP.

* * * * *